US012691693B2

(12) United States Patent
Yamamoto et al.

(10) Patent No.: US 12,691,693 B2
(45) Date of Patent: Jul. 28, 2026

(54) MEDIUM PROCESSING APPARATUS AND IMAGE FORMING SYSTEM INCORPORATING SAME

(71) Applicants: Takashi Yamamoto, Kanagawa (JP); Keisuke Sugiyama, Kanagawa (JP); Kei Sasaki, Kanagawa (JP); Kazuki Seto, Kanagawa (JP); Shohei Saito, Kanagawa (JP); Sachika Tamaki, Kanagawa (JP); Kohta Abe, Kanagawa (JP)

(72) Inventors: Takashi Yamamoto, Kanagawa (JP); Keisuke Sugiyama, Kanagawa (JP); Kei Sasaki, Kanagawa (JP); Kazuki Seto, Kanagawa (JP); Shohei Saito, Kanagawa (JP); Sachika Tamaki, Kanagawa (JP); Kohta Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 18/605,128

(22) Filed: Mar. 14, 2024

(65) Prior Publication Data

US 2024/0316953 A1 Sep. 26, 2024

(30) Foreign Application Priority Data

Mar. 23, 2023 (JP) ................................ 2023-047016
Feb. 7, 2024 (JP) ................................ 2024-017267

(51) Int. Cl.
*B41J 11/00* (2006.01)
*B41J 25/00* (2006.01)
(Continued)

(52) U.S. Cl.
CPC ......... *B41J 11/0015* (2013.01); *B41J 25/001* (2013.01); *G03G 15/0867* (2013.01);
(Continued)

(58) Field of Classification Search
CPC ..... B41J 11/0015; B41J 25/001; B65H 35/00; B65H 37/04; B65H 37/06; B65H 45/20;
(Continued)

(56) References Cited

U.S. PATENT DOCUMENTS 4,540,458 A 9/1985 Baughman et al.
7,461,836 B2 * 12/2008 Moring .................. B41F 13/68
270/41
(Continued)

FOREIGN PATENT DOCUMENTS

CN 209666630 U 11/2019
JP 2014-201432 A 10/2014
(Continued)

OTHER PUBLICATIONS

JP 2017013930 A machine translation (Year: 2025).*
(Continued)

*Primary Examiner* — Stephen D Meier
*Assistant Examiner* — Thomas Ray Knief
(74) *Attorney, Agent, or Firm* — Harness, Dickey & Pierce, P.L.C.

(57) ABSTRACT

A medium processing apparatus includes a liquid applier, a post-processing device, a liquid storage unit, a mover, and a liquid supplier. The liquid applier applies liquid to at least one medium. The post-processing device performs a given process on a bundle of media including the at least one medium on which the liquid is applied by the liquid applier. The liquid storage unit stores the liquid to be supplied to the liquid applier. The mover causes the liquid applier to move in a reciprocating direction orthogonal to the conveyance direction. The liquid supplier supplies the liquid from the liquid storage unit to the liquid applier and includes an extensible member having an elastic cylindrical part on at
(Continued)

least a part of the liquid supplier. The extensible member extends in the reciprocating direction of the mover.

10 Claims, 39 Drawing Sheets

(51) Int. Cl.
*G03G 15/00* (2006.01)
*G03G 15/08* (2006.01)

(52) U.S. Cl.
CPC ..... *G03G 15/0887* (2013.01); *G03G 15/6544* (2013.01); *G03G 2215/0487* (2013.01)

(58) Field of Classification Search
CPC ............... B65H 45/30; G03G 15/0867; G03G 15/0887; G03G 15/6538; G03G 15/6544; G03G 2215/0487; B42B 5/00; B42C 1/12; B42C 19/02
See application file for complete search history.

(56) References Cited

U.S. PATENT DOCUMENTS

| | | | |
|---|---|---|---|
| 2014/0219747 A1 | 8/2014 | Takahashi et al. | |
| 2015/0251869 A1* | 9/2015 | Taguchi | B65H 45/18 412/37 |
| 2018/0339484 A1 | 11/2018 | Takahashi et al. | |
| 2022/0297434 A1 | 9/2022 | Morino et al. | |
| 2022/0394145 A1 | 12/2022 | Seto et al. | |
| 2023/0234322 A1 | 7/2023 | Fukuchi et al. | |
| 2023/0234804 A1 | 7/2023 | Suzuki et al. | |
| 2023/0241859 A1 | 8/2023 | Saito et al. | |
| 2023/0271804 A1 | 8/2023 | Abe et al. | |
| 2023/0294950 A1 | 9/2023 | Ibuka et al. | |
| 2023/0399191 A1 | 12/2023 | Akamatsu et al. | |
| 2023/0416040 A1 | 12/2023 | Sasaki et al. | |

FOREIGN PATENT DOCUMENTS

| | | | |
|---|---|---|---|
| JP | 6057167 B2 | | 1/2017 |
| JP | 2017013930 A | * | 1/2017 |
| JP | 2019-010810 A | | 1/2019 |
| JP | 2022145449 A | | 10/2022 |

OTHER PUBLICATIONS

Extended European Search Report dated Nov. 14, 2024 issued in corresponding European Patent Appln. No. 24163554.9.
Office Action dated May 9, 2026 for CN Application 202410282762.9.

* cited by examiner

454: 4541, 4542, 4543, 4544

205: 31, 32, 48

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2023-047016, filed on Mar. 23, 2023, and 2024-017267, filed on Feb. 7, 2024, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Background Art

Various types of medium processing apparatuses in the art are known that bind a sheet bundle of overlaid sheet media. Such medium processing apparatuses employ binding processes including, for example, a "stapling process" for penetrating needle-shaped members (binding members) through a sheet bundle to bind the sheet bundle and a "crimping process" for performing pressure deformation on a portion of a sheet bundle to bind the sheet bundle.

In the crimp binding process, in order to enhance the binding strength, some medium processing apparatuses are known that include a function to apply liquid to a part of a sheet bundle to be pressed and deformed.

In order to apply liquid to sheets as sheet-shaped media when performing crimping binding, a configuration is disclosed in which a liquid reserve tank and an expansion tank are disposed in a binding unit that moves back and forth (reciprocates), and a user can remove the expansion tank from the binding unit and supply liquid.

In the typical configuration disclosed in the related art, a first liquid storage unit mounted on a liquid application unit for applying liquid to a medium and a second liquid storage unit serving as a liquid supplier for replenishing the first liquid storage unit with liquid are linked by a supply tube. Due to such a configuration, the supply tube is to follow as the liquid application unit moves without hindering the flow of the liquid.

SUMMARY

Embodiments of the present disclosure described herein provide a novel medium processing apparatus includes a liquid applier, a post-processing device, a liquid storage unit, a mover, and a liquid supplier. The liquid applier applies liquid to at least one medium. The post-processing device performs a given process on a bundle of media including the at least one medium on which the liquid is applied by the liquid applier. The liquid storage unit stores the liquid to be supplied to the liquid applier. The mover causes the liquid applier to move in a reciprocating direction orthogonal to the conveyance direction. The liquid supplier supplies the liquid from the liquid storage unit to the liquid applier. The liquid supplier includes an extensible member having an elastic cylindrical part on at least a part of the liquid supplier. The extensible member extends in the reciprocating direction of the mover.

Further, embodiments of the present disclosure described herein provide an image forming system including an image forming apparatus and the above-described medium processing apparatus. The image forming apparatus forms an image on a medium. The medium processing apparatus performs the process on a bundle of media including the medium on which the image is formed by the image forming apparatus.

Further, embodiments of the present disclosure described herein provide a novel medium processing apparatus includes a liquid applier, a post-processing device, a liquid storage unit, a mover, and a liquid supplier. The liquid applier applies liquid to at least one medium. The post-processing device performs a given process on the bundle of media including the at least one medium on which the liquid is applied by the liquid applier. The liquid storage unit stores the liquid to be supplied to the liquid applier. The mover causes the liquid applier to move in a reciprocating direction orthogonal to the conveyance direction. The liquid supplier supplies the liquid from the liquid storage unit to the liquid applier. The liquid supplier includes a cylindrical tube, and a winder to concentrically wind the cylindrical tube. The cylindrical tube is extendable in the reciprocating direction of the mover.

Further, embodiments of the present disclosure described herein provide an image forming system including an image forming apparatus and the above-described medium processing apparatus. The image forming apparatus forms an image on a medium. The medium processing apparatus performs the process on the bundle of media including the at least one medium on which the image is formed by the image forming apparatus.

BRIEF DESCRIPTION OF THE SEVERAL VIEWS OF THE DRAWINGS

Exemplary embodiments of this disclosure will be described in detail based on the following figures, wherein.

Figure 1:
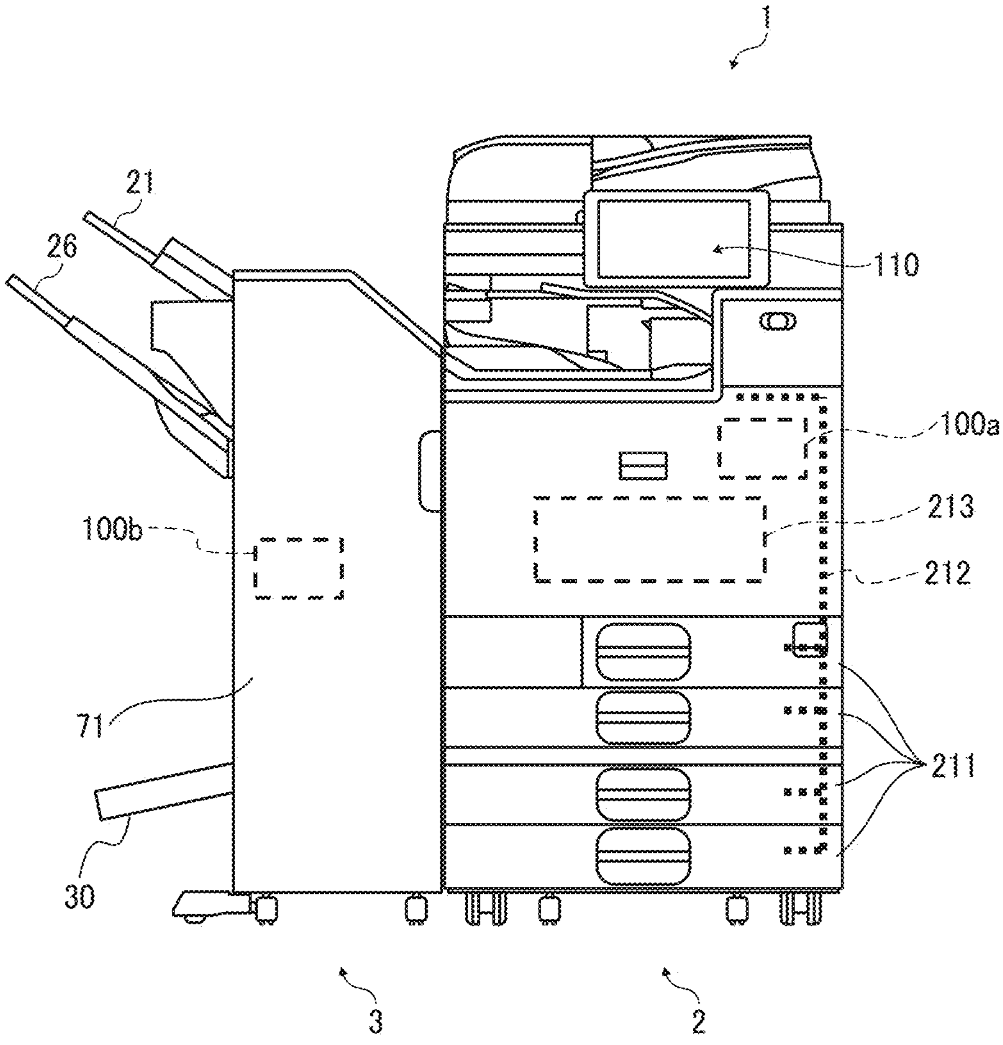
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiment of Image Forming System 1

A description is given of an image forming system 1 according to an embodiment of the present disclosure, with reference to the drawings.

FIG. 1 is a diagram illustrating an overall configuration of the image forming system 1.

The image forming system 1 has a function of forming an image on a sheet P as a sheet medium and a function of performing a post-processing operation on the sheet P as a process after the image is formed on the sheet P. As illustrated in FIG. 1, the image forming system 1 includes an image forming apparatus 2 including the image forming function and a post-processing apparatus 3 serving as a medium processing apparatus including the post-processing function, according to an embodiment of the present disclosure. In the image forming system 1, the image forming apparatus 2 and the post-processing apparatus 3 operate in conjunction with each other.

In the present embodiment, the sheet-like medium to be processed in the image forming system 1 is described on the assumption that the medium is a sheet of "paper". The object to be processed according to the present embodiment is not limited to a paper. For example, any material or specification may be used as long as an image can be formed on a medium in a known image forming process and the medium is a target of the image forming process. The medium includes a medium which can be an object of the folding process or the binding process, and the material or the specification is not limited.

The image forming apparatus 2 forms an image on the sheet P and ejects the sheet P having the image to the post-processing apparatus 3. The image forming apparatus 2 includes an accommodation tray 211 that accommodates the sheet P, a conveyor 212 that conveys the sheet P accommodated in the accommodation tray 211, and an image former 213 that forms an image on the sheet P conveyed by the conveyor 212. The image former 213 may be an inkjet system that forms an image using ink or an electrophotographic system that forms an image using toner. The image forming apparatus 2 also includes a controller 100*a* that controls various operations of the conveyor 212 and the image former 213. Since the image forming apparatus 2 has a typical configuration, a detailed description of the configuration and functions of the image forming apparatus 2 are omitted.

Sheets of paper are widely known as an example of sheet-shaped media. Further, in the following description, a sheet-shaped medium as a medium to be processed is referred to as a "sheet P." Further, in the following description, a bundle of sheets of paper as a plurality of media is an example of a "sheet bundle Pb."

A description is given of the post-processing apparatus 3 according to a first embodiment of the present disclosure.

Figure 2:
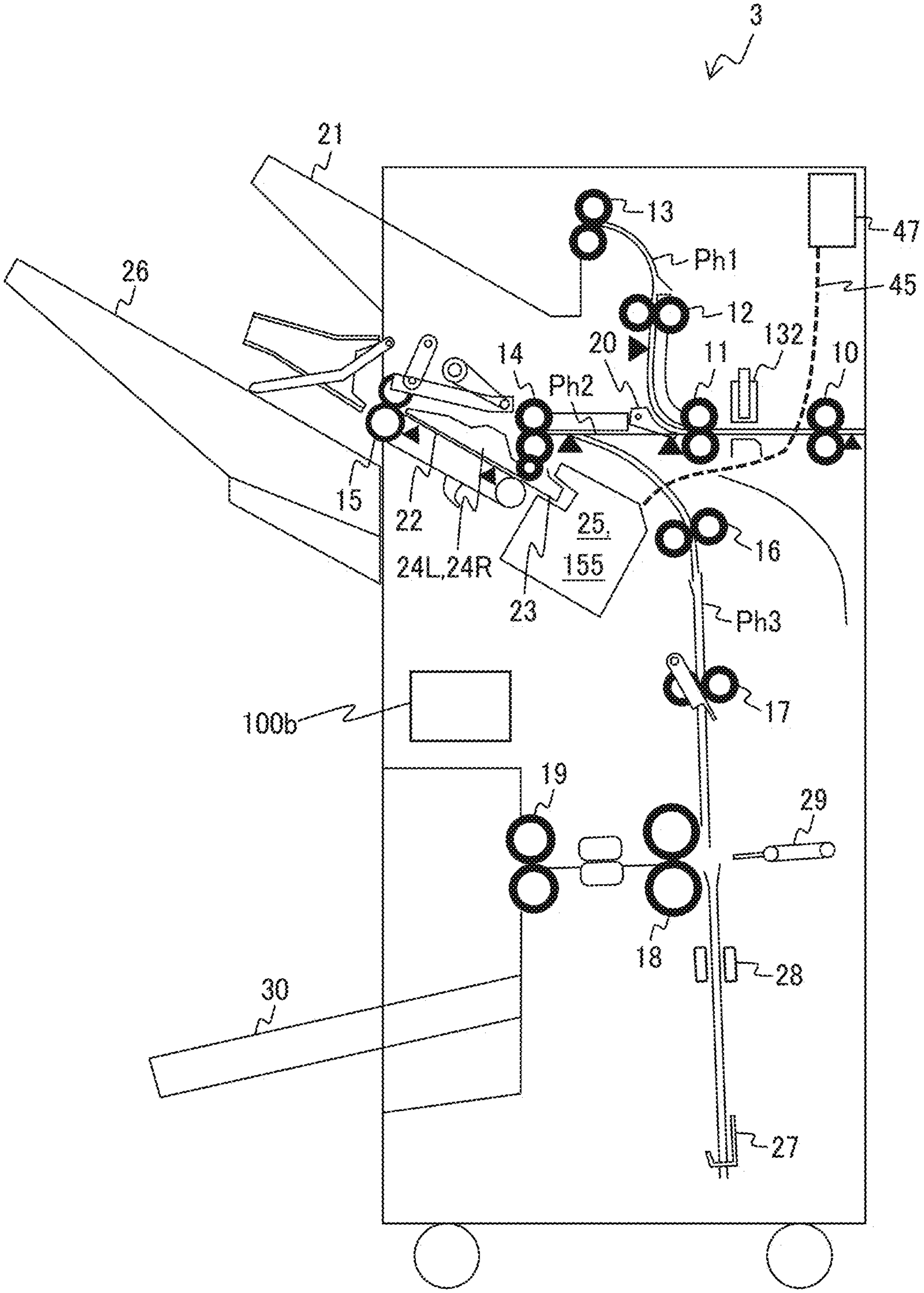
FIG. 2 is a diagram illustrating an internal configuration of a post-processing apparatus according to a first embodiment of the present disclosure.

FIG. 2 is a diagram illustrating an internal configuration of the post-processing apparatus 3 according to the first embodiment of the present disclosure.

The post-processing apparatus 3 has a function that performs given post-processing on the sheet P on which an image is formed by the image forming apparatus 2.

An example of the post-processing according to the present embodiment is a binding process as a "crimping process" that binds, without staples, a plurality of sheets P on each of which an image is formed as a bundle of sheets P, which may be referred to as a sheet bundle. Another example of the post-processing according to the present embodiment is a binding process as a "stapling process" that binds, with staples, a plurality of the sheets P on each of which an image is formed as a bundle of sheets P (i.e., sheet bundle). In the following description, the bundle of sheets P may be referred to as a "sheet bundle Pb" as a bundle of media.

In the present embodiment, a description is typically given of liquid application in a crimp binding process. However, the liquid application related to a stapling process is similar to the liquid application in the crimp binding process. In the following description, the term "binding process" indicates both the "crimp binding process" and the "stapling process", and is not limited to a binding method (whether a binding needle is used or a pressing and deforming process is performed).

More specifically, the "crimp binding process" according to the present embodiment is a process called "crimp binding" to apply pressure to the binding position corresponding to a part of the sheet bundle Pb to deform (perform pressure deformation on) the binding position and bind the sheet bundle Pb. The binding that can be executed by the post-processing apparatus 3 includes edge binding and saddle binding. The edge binding is a process to bind an end (including an edge) of the sheet bundle Pb. The saddle binding is a process to bind the center of the sheet bundle Pb.

The post-processing apparatus 3 includes the conveyance roller pairs 10 to 19, each functioning as a conveyor, the switching member 20, and a controller 100*b* serving as a controller. The controller 100*b* controls the operations of, for example, the conveyance roller pairs 10 to 19 (conveyors), and the switching member 20. Details of the controller 100*b* will be described below. The conveyance roller pairs 10 to 19 convey, inside the post-processing apparatus 3, the sheet P supplied from the image forming apparatus 2. More specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3. A hole punch 132 is disposed between the conveyance roller pairs 10 and 11. The hole punch 132 performs punching on a sheet P conveyed by the conveyance roller pairs 10 and 11.

The first conveyance passage Ph1 is a passage extending to an ejection tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an ejection tray 26 via an internal tray 22. The third conveyance passage Ph3 is a passage that branches off from the first conveyance passage Ph1 between the conveyance roller pairs 11 and 14 in the sheet conveyance direction and reaches to an ejection tray 30.

The switching member 20 serving as a switcher is disposed at a branching position of the first conveyance passage Ph1 and the second conveyance passage Ph2.

Each of the switching member 20 can change the position between a first position and a second position. The switching member 20 at the first position guides the sheet P to be ejected to the ejection tray 21 through the first conveyance passage Ph1. The switching members 20 at the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in reverse to guide the sheet P to the third conveyance passage Ph3. The post-processing apparatus 3 further includes multiple sensors that detects the positions of the sheet P in the first conveyance passage Ph1, the second conveyance passage Ph2, and the third conveyance passage Ph3. Each of the multiple sensors is indicated by a black triangle in FIG. 2.

The post-processing apparatus 3 further includes the ejection tray 21. The sheet P that is output through the first conveyance passage Ph1 is placed on the ejection tray 21. Among the sheets P supplied from the image forming apparatus 2, a sheet P not subjected to the binding process is ejected to the ejection tray 21.

The post-processing apparatus 3 further includes the internal tray 22 serving as a receptacle, an end fence 23, side fences 24L and 24R, an edge binder 25, a staple binder 155, and the ejection tray 26. The internal tray 22, the end fence 23, the side fences 24L and 24R, the edge binder 25, and the staple binder 155 perform edge binding on the sheet bundle Pb including the multiple sheets P conveyed from the second conveyance path Ph2 to the internal tray 22. Among the sheets P supplied from the image forming apparatus 2, the sheet bundle Pb subjected to the edge binding is ejected to the ejection tray 26.

The "edge binding process" includes "parallel binding process," "oblique binding process," and "vertical binding process." The "parallel binding process" is a process of binding the sheet bundle Pb along one side of the sheet bundle Pb parallel to the main scanning direction. The "oblique binding process" is a process of binding a corner of the sheet bundle Pb. The "vertical binding process" is a process of binding the sheet bundle Pb along one side of the sheet bundle Pb parallel to the conveyance direction.

In the following description, a direction in which the sheet P is conveyed from the conveyance roller pair 15 toward the end fence 23 is defined as a "conveyance direction." In other words, the "conveyance direction" herein corresponds to a direction in which the sheet P that has been output from the image forming apparatus 2 is moved toward the ejection tray 26 by, for example, the conveyance roller pair 10, is changed to move toward the end fence 23 by the conveyance roller pair 15 in a direction different from the above-described direction. A direction orthogonal to the thickness direction and the transport direction of the paper P is defined as a "main scanning direction" or a "width direction".

The sheets P that are sequentially conveyed through the second conveyance passage Ph2 are temporarily placed on the internal tray 22 serving as a placement tray. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 and the staple binder 155 bind an end of the sheet bundle Pb aligned by the end fence 23 and the side fences 24L and 24R. Then, the conveyance roller pair 15 ejects the sheet bundle Pb subjected to the edge binding to the ejection tray 26.

The post-processing apparatus 3 further includes an end fence 27, a saddle binder 28, a sheet folding blade 29, and the ejection tray 30. The end fence 27, the saddle binder 28, and the sheet folding blade 29 perform the saddle binding on the sheet bundle Pb including the sheets P that are conveyed through the third conveyance passage Ph3. Among the sheets P supplied from the image forming apparatus 2, the sheet bundle Pb subjected to the saddle binding is ejected to the ejection tray 30.

The end fence 27 aligns the positions of the sheets P that are sequentially conveyed through the third conveyance passage Ph3, in a conveyance direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to nip the sheet bundle Pb. The conveyance roller pairs 18 and 19 eject the sheet bundle Pb subjected to the saddle binding to the ejection tray 30.

In addition, the post-processing apparatus 3 includes a liquid application member 501 (a part of the liquid applier), a liquid supply member 50 (a part of the liquid applier), and a first liquid storage tank 44 (a first liquid storage unit) in the edge binder 25. The first liquid storage tank 44 and the liquid supply member 50 are omitted in FIG. 2. The post-processing device 3 includes a liquid supply passage 45 (a part of the liquid supplier), a liquid supply pump 46 (a part of the liquid supplier), a second liquid storage tank 47 (a part of the second liquid storage unit), and a second liquid storage tank fixer 61 (a part of the second liquid storage unit) as a configuration for replenishing the first liquid storage tank 44 with the liquid. The liquid that is stored in the second liquid storage tank 47 is supplied to the first liquid storage tank 44 via the second liquid storage tank fixer 61, the liquid supply pump 46, and the liquid supply passage 45.

A detailed description is given of the edge binder 25 according to an embodiment of the present disclosure.

Figure 3:
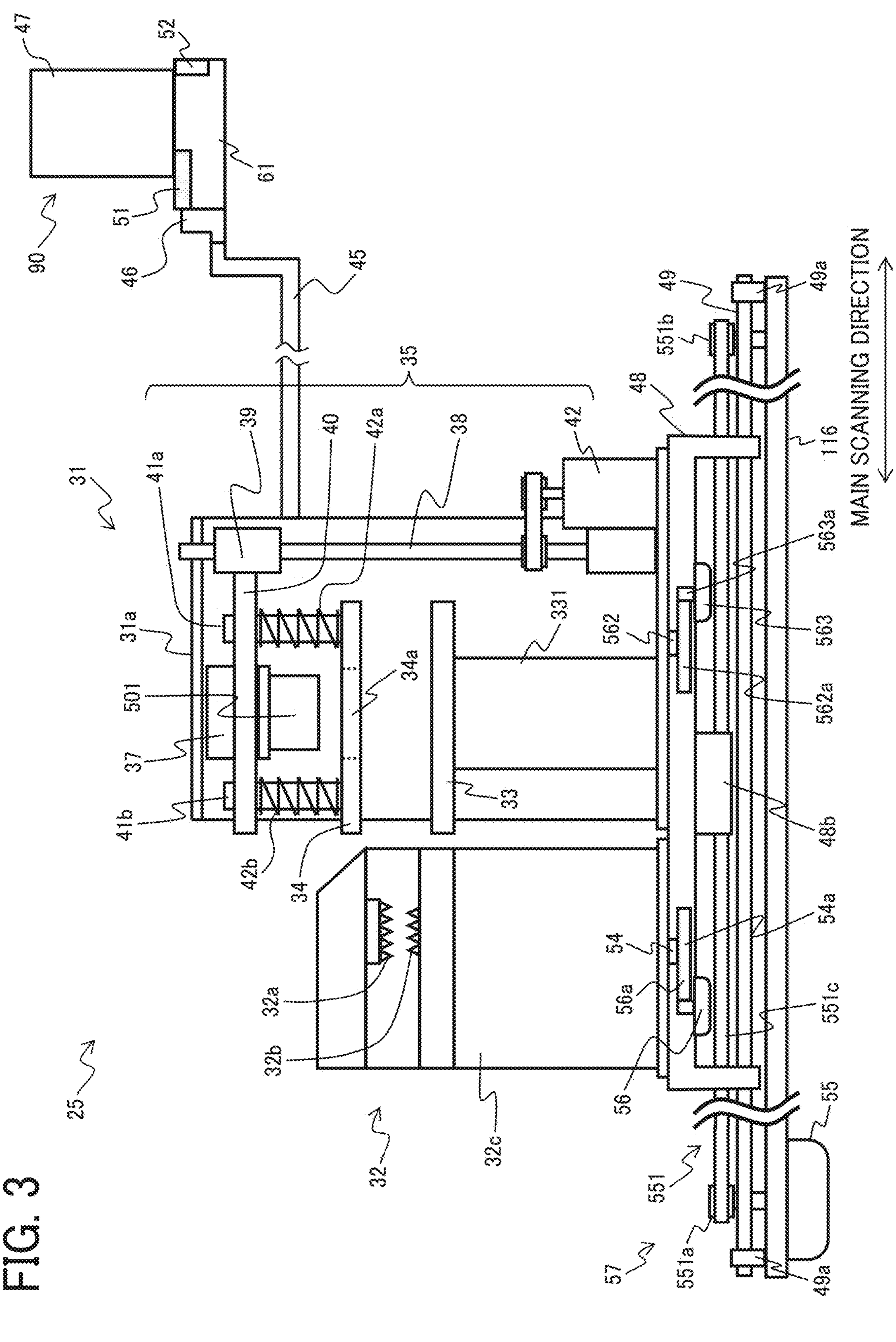
FIG. 3 is a schematic view of an upstream side of an edge binder of the post-processing apparatus of FIG. 2 in a conveyance direction.

FIG. 3 is a schematic diagram illustrating an upstream side of the edge binder 25 in the conveyance direction.

The edge binder 25 performs liquid application and crimp binding illustrated in FIG. 2.

Figure 4:
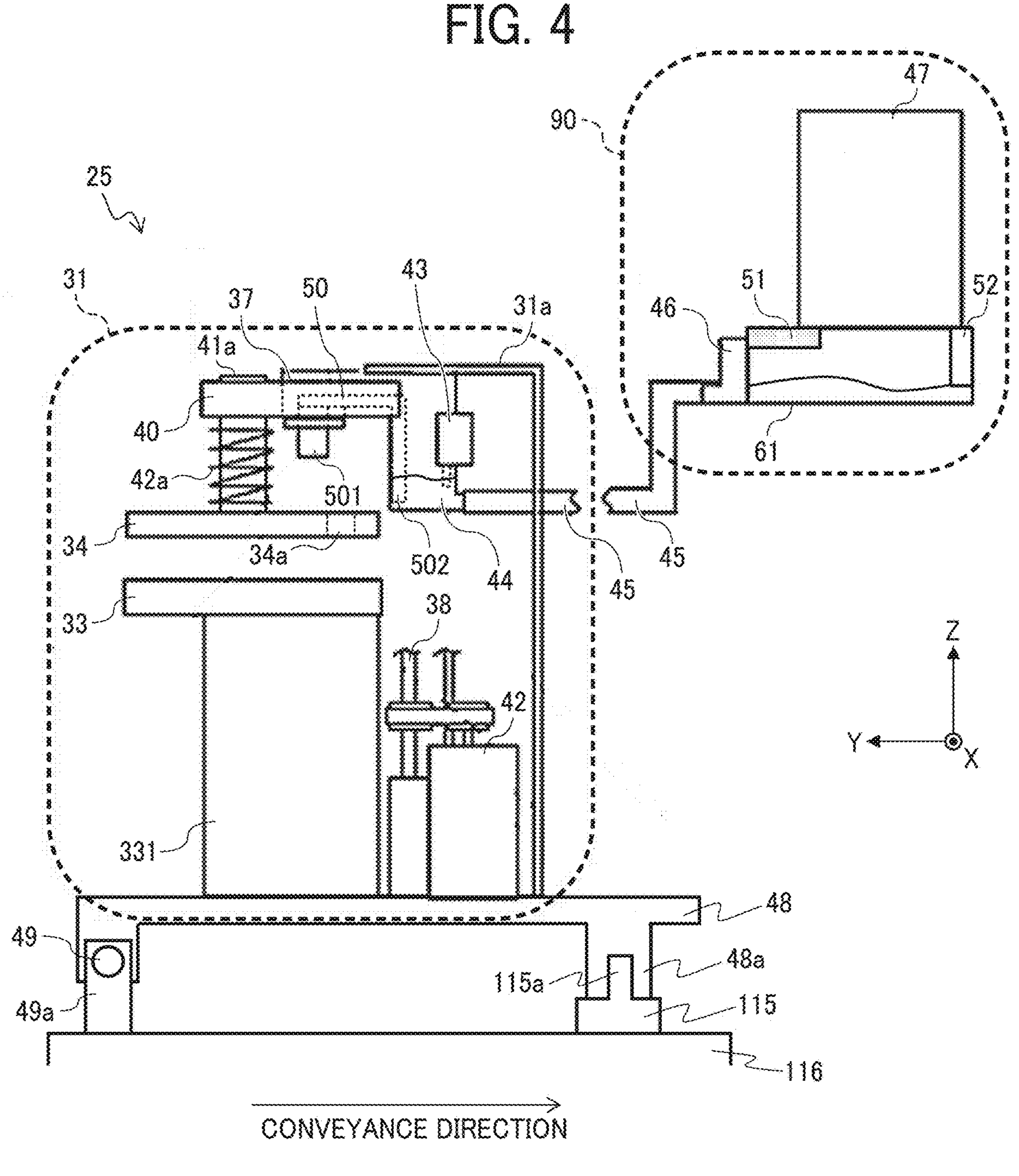
FIG. 4 is a schematic view of a liquid applier of the edge binder of FIG. 3 in a main scanning direction.

FIG. 4 is a schematic view of a liquid applier 31 of the edge binder 25 in the main scanning direction.

As illustrated in FIG. 3, the edge binder 25 includes a liquid applier 31 that applies liquid to the sheets P, and a crimper 32 that is an example of a post-processing device and performs crimping binding on the sheet bundle Pb. The liquid applier 31 and the crimper 32 are disposed downstream from the internal tray 22 in the conveyance direction and adjacent to each other in the main scanning direction.

As illustrated in FIG. 4, the liquid applier 31 applies the liquid stored in the first liquid storage tank 44 to the sheet P or the sheet bundle Pb placed on the internal tray 22. Applying liquid to a sheet P or a sheet bundle Pb by the liquid applier 31 and the operation of the liquid applier 31 when applying liquid are referred to as "liquid application". The liquid application operation of the liquid applier 31 accompanied by the control process is referred to as a "liquid application process".

More specifically, the liquid that is stored in the first liquid storage tank 44 for the liquid application includes, as a main component, the liquid state of a compound of hydrogen and oxygen compound represented by the chemical formula H2O. The liquid hydrogen-oxygen compound is at any temperature. For example, the liquid hydrogen-oxygen compound may be so-called warm water or hot water.

The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in the first liquid storage tank 44 may include an additive in addition to the main component. The liquid that is stored in the first liquid storage tank 44 may include residual chlorine used as tap water. Preferably, for example, the liquid that is stored in the first liquid storage tank 44 may include, as an additive, a colorant, a penetrant, a pH adjuster, a preservative such as phenoxyethanol, a drying inhibitor such as glycerin, or a combination thereof. Furthermore, because water is used as a component of ink used for inkjet printers or ink used for water-based pens, such water or ink may be used for the "liquid application".

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above enhances the binding strength of the sheet bundle Pb, in comparison with a liquid of which the main component is not water (liquid).

As illustrated in FIGS. 3 and 4, the liquid applier 31 can be moved in the main scanning direction together with the crimper 32 by the driving force transmitted from the edge binder movement motor 55.

The liquid applier 31 includes a lower pressure plate 33 as a sheet stacking table of the sheet P or the sheet bundle Pb, an upper pressure plate 34, and a liquid applier movement assembly 35. The components of the liquid applier 31 (the lower pressure plate 33, the upper pressure plate 34, the liquid applier movement assembly 35, and the liquid applier movement motor 42) are held by the liquid application frame 31*a* and the base 48.

A liquid applier shaft 562 provided with a drive transmission gear 562*a* is fixed to a bottom face of the liquid application frame 31*a* that holds the components of the liquid applier 31. The liquid applier shaft 562 and the drive transmission gear 562*a* are held by the base 48 on which the liquid application frame 31*a* is disposed, so as to be rotatable in the forward and reverse directions. The drive transmission gear 562*a* meshes with an output gear 563*a* of the liquid applier pivot motor 563. The liquid applier 31 can be rotated in the forward and reverse directions about the liquid applier shaft 562 on the base 48 by a driving force transmitted from the liquid applier pivot motor 563 to the liquid applier shaft 562 via the output gear 563*a* and the drive transmission gear 562*a*.

The lower pressure plate 33 and the upper pressure plate 34 are disposed downstream from the internal tray 22 in the conveyance direction. The sheets P or the sheet bundle Pb that is placed on the internal tray 22 is also placed on the lower pressure plate 33. The lower pressure plate 33 is provided on a lower pressure plate holder 331. The upper pressure plate 34 is movable in the thickness direction of the sheet P or the sheet bundle Pb at a position where the upper pressure plate 34 faces the sheet P or the sheet bundle Pb placed on the internal tray 22.

In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." Further, the upper pressure plate 34 is provided with a through hole 34*a* passing through the upper pressure plate 34 in the thickness direction at a position opposite to the liquid application member 501 held via the holder 37 attached to the base plate 40. The liquid application member 501 is one end portion of the liquid supply member 50 (liquid absorber) described below and corresponds to a tip portion of the liquid supply member 50.

The liquid applier movement assembly 35 moves the upper pressure plate 34, the base plate 40, the holder 37, the liquid application member 501, the liquid supply member 50, and the first liquid storage tank 44 in the thickness direction of the sheet P or the sheet bundle Pb. The liquid applier movement assembly 35 according to the embodiment moves the upper pressure plate 34, the base plate 40, the holder 37, the liquid application member 501, the liquid supply member 50, and the first liquid storage tank 44 in conjunction with each other by the single liquid applier movement motor 42. The liquid applier movement assembly 35 includes, for example, the liquid applier movement motor 42, a trapezoidal screw 38, a nut 39, the base plate 40, columns 41*a* and 41*b*, and coil springs 42*a* and 42*b*.

The liquid applier movement motor 42 generates a driving force to move the upper pressure plate 34, the base plate 40, the holder 37, the liquid application member 501, the liquid supply member 50, and the first liquid storage tank 44. The trapezoidal screw 38 extends in the thickness direction of the sheet P or the sheet bundle Pb and is provided with the liquid application frame 31*a* such that the trapezoidal screw 38 is rotatable in the forward and reverse directions. The trapezoidal screw 38 is coupled to an output shaft of the liquid applier movement motor 42 via, for example, a pulley and a belt. The nut 39 is screwed to the trapezoidal screw 38. The trapezoidal screw 38 is rotated in the forward and reverse directions by the driving force transmitted from the liquid applier movement motor 42. The rotation of the trapezoidal screw 38 causes the nut 39 to reciprocate on the trapezoidal screw 38.

The base plate 40 is positioned apart from the upper pressure plate 34. The base plate 40 holds the liquid application member 501 with the tip portion of the liquid application member 501 protruding from the base plate 40 toward the upper pressure plate 34. The base plate 40 is coupled to the trapezoidal screw 38 via the nut 39 such that base plate 40 can reciprocate along the trapezoidal screw 38 as the trapezoidal screw 38 rotates in the forward and reverse directions. The position of the base plate 40 in the vertical direction is detected by a movement sensor 40*a* (see FIG. 8).

The columns 41*a* and 41*b* project from the base plate 40 toward the upper pressure plate 34 around the tip portion of the liquid application member 501. The columns 41*a* and 41*b* can relatively move with respect to the base plate 40 in the thickness direction. The columns 41*a* and 41*b* hold the upper pressure plate 34 with the respective tip ends closer to the lower pressure plate 33 than the other ends of the columns 41*a* and 41. The other ends of the columns 41*a* and 41 opposite the ends closer to the lower pressure plate 33 are provided with stoppers that prevent the columns 41*a* and 41*b* from being removed from the base plate 40.

The coil springs 42*a* and 42*b* are fitted around the columns 41*a* and 41*b*, respectively, between the base plate 40 and the upper pressure plate 34. The coil springs **42*a* and 42*b* bias the upper pressure plate 34 and the columns 41*a* and 41*b* toward the lower pressure plate 33 with respect to the base plate 40**.

The liquid applier 31 applies liquid to the sheet P or the sheet bundle Pb placed on the internal tray 22. More specifically, the liquid applier 31 brings the liquid application member 501 into contact with the sheet P or the sheet bundle Pb to apply the liquid to at least one sheet P of the sheet bundle Pb.

The liquid applier 31 includes the first liquid amount detection sensor 43 (serving as a first liquid detector), the first liquid storage tank 44, the liquid application member 501, the liquid supply member 50, and the holder 37. The first liquid storage tank 44 stores the liquid to be applied to the sheet P or the sheet bundle Pb. The amount of liquid that is stored in the first liquid storage tank 44 is detected by the first liquid amount detection sensor 43. The first liquid storage tank 44 is coupled to the base plate 40 via the holder 37.

The liquid application member 501, the liquid supply member 50 disposed in close contact with the liquid application member 501, and the first liquid storage tank 44 are held by the holder 37. The holder 37 is held by the base plate 40. The liquid supply member 50 has a first end in close contact with the liquid application member 501 and a second end immersed in the liquid stored in the first liquid storage tank 44. In other words, the second end of the liquid supply member 50 corresponds to a liquid immersion portion that sucks up the liquid and supplies the liquid to the liquid application member 501. The liquid application member 501 and the liquid supply member 50 are made of a material (e.g., sponge or fiber) having a high liquid absorption rate, such as an elastic resin formed of open cells. However, at least one of the liquid application member 501 or the liquid supply member 50 is not limited to a particular kind as long as the at least one of the liquid application member 501 or the liquid supply member 50 is made of a material having a property of absorbing and holding the liquid and has a property of being crushable in accordance with a pressing force applied when the at least one of the liquid application member 501 or the liquid supply member 50 is in contact with the sheet P. In other words, the material may be any material as long as the material can suck up liquid by capillary action.

Accordingly, when the other end portion (the liquid immersion portion 502) of the liquid supply member 50 is immersed in the liquid stored in the first liquid storage tank 44, the liquid supply member 50 sucks up the liquid by capillary action. In other words, the liquid stored in the first liquid storage tank 44 is sucked up from a liquid immersion portion 502 of the liquid supply member 50, and the sucked liquid is supplied to the liquid application member 501 that is coupled to the tip portion via the liquid supply member 50. Then, the liquid stored in the first liquid storage tank 44 is sucked up to the liquid application member 501 in close contact with one end portion of the liquid supply member 50, and thus the liquid level (stored liquid amount) of the liquid stored in the first liquid storage tank 44 detected by the first liquid amount detection sensor 43 is lowered. As a result, the liquid is supplied from the second liquid storage tank 47 to the first liquid storage tank 44 by the liquid supply pump 46. The liquid supply operation including the operation of filling the liquid stored in the first liquid storage tank 44 by sucking the liquid by the liquid supply member 50 and supplying the liquid to the liquid application member 501 in this manner is referred to as a filling supply operation.

Although the case where the liquid supply member 50 and the liquid application member 501 are separate bodies has been described above, the liquid supply member 50 and the liquid application member 501 may be integrally formed of a material having the same properties (for example, a material having a high liquid absorption rate). In other words, the liquid application member 501 may be part of the liquid supply member 50. In such a case, liquid can be supplied from the liquid supply member 50 to the liquid application member 501 more smoothly by the capillary action and a reduction in cost can be achieved.

The edge binder 25 is coupled to the second liquid storage tank 47. The second liquid storage tank 47 is detachably attached to the edge binder 25 or the post-processing apparatus 3 (see FIG. 15). The second liquid storage tank 47 is fixed (set) to the second liquid storage tank fixer 61 (a part of the second liquid storage unit) at a given position. By so doing, the liquid already stored in the second liquid storage tank 47 can be supplied to the first liquid storage tank 44.

The operation to supply liquid from the second liquid storage tank 47 to the first liquid storage tank 44 by the liquid supply pump 46 is executed in response to a decrease in the stored liquid amount (liquid level) in the first liquid storage tank 44. The stored liquid amount (liquid level) of the first liquid storage tank 44 decreases as the liquid is consumed by the liquid application by the liquid applier 31. In other words, the operation to supply liquid from the second liquid storage tank 47 to the first liquid storage tank 44 corresponds to the liquid supplying operation in accordance with the execution of the job including liquid application by the liquid applier 31.

This liquid supplying operation corresponds to an operation of supplying liquid to the first liquid storage tank 44 so as to replenish liquid each time the stored liquid amount (liquid level) of the first liquid storage tank 44 falls below a reference liquid level, which is described below. In the following description, the liquid supplying operation is referred to as a "replenishing operation."

The above-described "reference liquid level" indicates a liquid level (a stored liquid amount in the first liquid storage tank 44) when the first liquid amount detection sensor 43 detects the liquid in the first liquid storage tank 44.

When the second liquid storage tank 47 is set in the second liquid storage tank fixer 61, the second liquid storage tank fixer 61 is filled with a certain amount of the liquid in the second liquid storage tank 47. The second liquid storage tank fixer 61 includes a setting detection sensor 51 (serving as a set detector) (see FIG. 15). When the setting detection sensor 51 detects the set state of the second liquid storage tank 47 to the second liquid storage tank fixer 61 (see FIG. 12C), a signal indicating the set state is transmitted to the controller **100*b*, which is described below. Thus, the controller 100*b* to be described below detects whether the second liquid storage tank 47 is mounted to the second liquid storage tank fixer 61. Details of the second liquid storage tank 47** will be described below.

The first liquid storage tank 44 and the second liquid storage tank 47 are coupled to each other by the liquid supply passage 45. The liquid supply pump 46 is disposed near the second liquid storage tank fixer 61. As the liquid supply pump 46 is driven, the liquid stored in the second liquid storage tank 47 is supplied (replenished) from the second liquid storage tank 47 to the first liquid storage tank 44 via the liquid supply passage 45. Accordingly, the second liquid storage tank fixer 61 is a component of the liquid supplier that executes a liquid supply operation to supply liquid from the second liquid storage tank 47 to the first liquid storage tank 44. The liquid supply passage 45 includes a flexible material. According to such a configuration, even if the first liquid storage tank 44 is moved by the liquid applier movement assembly 35, liquid can be supplied from the second liquid storage tank 47 to the first liquid storage tank 44 reliably.

The supply of liquid from the second liquid storage tank 47 to the first liquid storage tank 44 can be controlled in accordance with the detection result of the first liquid amount detection sensor 43. In other words, the controller 100*b*, which is described below, determines whether the stored liquid amount (liquid level) in the first liquid storage tank 44 based on the detection result of the first liquid amount detection sensor 43. In accordance with the determined stored liquid amount (liquid level) of the first liquid storage tank 44, the controller 100*b* controls the operation speed and time of the liquid supply pump 46. By so doing, the controller 100*b* can adjust the amount of liquid to be replenished to the first liquid storage tank 44 to maintain the stored liquid amount (liquid level) in the first liquid storage tank 44 at a constant level of liquid.

A description is given of the configuration of the crimper 32.

The crimper 32 serving as a post-processing device presses and deforms a portion of the sheet bundle Pb by serrated upper crimping teeth 32*a* and lower crimping teeth 32*b*, and crimps the sheets P of the portion to bind the sheet bundle Pb. In short, the crimper 32 binds the sheet bundle Pb without staples. The components of the crimper 32 such as the upper crimping teeth 32*a* and the lower crimping teeth 32*b* are disposed on a crimping frame 32*c*. In the following description, such a way of pressing and deforming a given position on the sheet bundle Pb to bind the sheet bundle Pb may be referred to as "crimp binding." In other words, the crimper 32 crimps and binds the sheet bundle Pb or performs the crimp binding on the sheet bundle Pb. The crimping and binding operation of the crimper 32 that involves control processing is referred to as "crimp binding process".

Figure 5A:
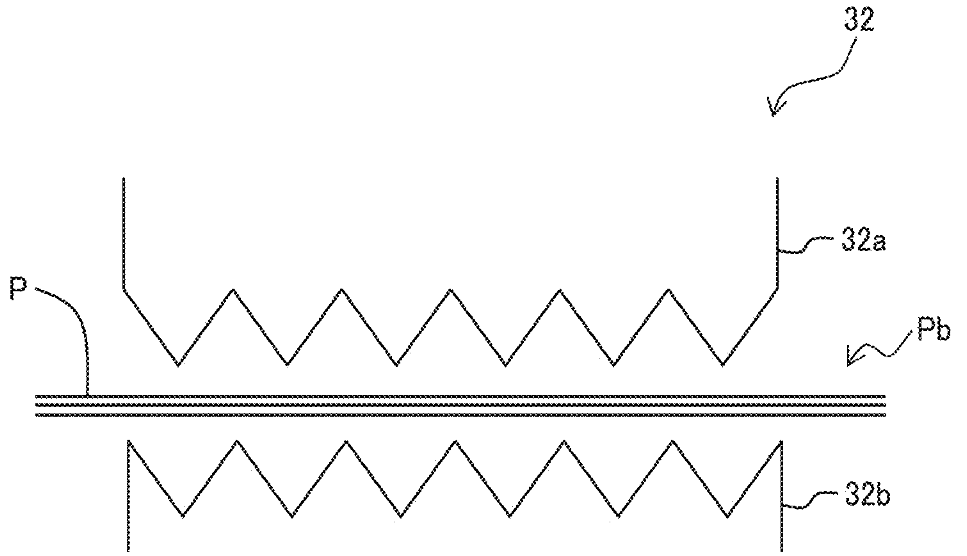
FIGS. 5A and 5B are schematic diagrams each illustrating a configuration of a crimper of the edge binder of FIG. 3.
Figure 5B:

FIGS. 5A and 5B are schematic diagrams illustrating the configuration of the crimper 32.

As illustrated in FIGS. 5A and 5B, the crimper 32 includes the upper crimping teeth 32*a* and the lower crimping teeth 32*b*. The upper crimping teeth 32*a* and the lower crimping teeth 32*b* are disposed to face each other in the thickness direction of the sheet bundle Pb to sandwich the sheet bundle Pb placed on the internal tray 22. The upper crimping teeth 32*a* and the lower crimping teeth 32*b* have respective serrate faces facing each other. The serrate face of each of the upper crimping teeth 32*a* and the lower crimping teeth 32*b* includes concave portions and convex portions alternately formed. The concave portions and the convex portions of the upper crimping teeth 32*a* are shifted from those of the lower crimping teeth 32*b* such that the upper crimping teeth 32*a* are engaged with the lower crimping teeth 32*b*. The upper crimping teeth 32*a* and the lower crimping teeth 32*b* are brought into contact with and separated from each other by a driving force of a contact-separation motor 32*d* illustrated in FIG. 11.

In the process of supplying the multiple sheets P of the sheet bundle Pb to the internal tray 22, as illustrated in FIG. 5A, the upper crimping teeth 32*a* and the lower crimping teeth 32*b* are separated from each other. When all the sheets P of the sheet bundle Pb are placed on the internal tray 22, the upper crimping teeth 32*a* and the lower crimping teeth 32*b* are engaged with each other as illustrated in FIG. 5B by the driving force of the contact-separation motor 32*d* to press and deform the sheet bundle Pb in the thickness direction. As a result, the sheet bundle Pb that has been placed on the internal tray 22 is crimped and bound. The sheet bundle Pb thus crimped and bound is ejected to the ejection tray 26 by the conveyance roller pair 15.

The configuration of the crimper 32 as a crimping assembly is not limited to the configuration of a moving assembly exemplified in the present embodiment, and may be any other suitable structure in which the upper crimping teeth 32*a* and the lower crimping teeth 32*b* of the crimping assembly engage with each other. For example, the crimping assembly may bring the upper crimping teeth 32*a* and the lower crimping teeth 32*b* into contact with each other and separate the upper crimping teeth 32*a* and the lower crimping teeth 32*b* from each other with a link mechanism and a driving source that simply rotates forward or that rotates forward and backward (e.g., the crimping assembly disclosed in Japanese Patent No. 6057167). Alternatively, the crimping assembly may employ a linear motion system to linearly bring the upper crimping teeth 32*a* and the lower crimping teeth 32*b* into contact with each other and separate the upper crimping teeth 32*a* and the lower crimping teeth 32*b* from each other with a screw assembly that converts the forward and backward rotational motions of a driving source into linear reciprocating movement.

As illustrated in FIG. 3, the edge binder 25 includes an edge binder movement assembly 57.

The edge binder movement assembly 57 moves the edge binder 25, specifically, the liquid applier 31 and the crimper 32, in the main scanning direction along a downstream end, in the conveyance direction, of the sheet P placed on the internal tray 22. The edge binder movement assembly 57 includes, for example, the base 48, a guide shaft 49, the edge binder movement motor 55, and a driving force transmission assembly 551 that transmits the driving force of the edge binder movement motor 55 to the base 48, and a standby position sensor 540 (see FIG. 11).

The liquid applier 31 and the crimper 32 are attached to the base 48 so as to be adjacent to each other in the main scanning direction. As illustrated in FIG. 4, the guide shaft 49 is held by multiple guide shaft brackets 49*a* disposed in the main scanning direction at a position on the upstream side of a binding assembly base 116 in the conveyance direction of the sheet P. As illustrated in FIG. 3, the guide shaft 49 extends in the main scanning direction on the binding assembly base 116. The guide rail 115 is disposed in the main scanning direction on the downstream side of the binding assembly base 116 in the conveying direction of the sheet P. As illustrated in FIG. 4, the guide rail 115 includes a fitting target portion 115*a* that fits to a fitting portion 48*a* of the base 48 in the main scanning direction. In other words, the base 48 is movably held by the guide shaft 49 and the guide rail 115 in the main scanning direction on the binding assembly base 116.

The edge binder movement motor 55 generates a driving force to move the edge binder 25. The driving force transmission assembly 551 transmits the driving force of the edge binder movement motor 55 to the base 48 via pulleys 551*a* and 551*b*, a timing belt 551*c*, and a fastening portion 48*b* that fastens the base 48 and the timing belt 551*c*. As a result, the liquid applier 31 and the crimper 32 integrated by the base 48 move in the main scanning direction along the guide shaft 49.

The edge binder movement motor 55 according to the present embodiment is, for example, a servo motor that can stop the edge binder 25 at a target position (for example, a binding position B1 described below) without returning the edge binder 25 to an origin position (for example, a standby position HP described below) every time the edge binder 25 is moved.

The post-processing apparatus 3 further includes a standby position sensor 540 and an encoder sensor 541. The standby position sensor 540 is, for example, a light-shielding optical sensor (see FIG. 11) to detect that the edge binder 25 has reached a standby position HP (see FIG. 13A). The encoder sensor 541 (see FIG. 11) is attached to an output shaft of the edge binder movement motor 55. (skip) The controller 100*b*, which will be described below, detects that the edge binder 25 has reached the standby position HP, based on a detection result of the standby position sensor 540. The controller 100*b* also counts pulse signals output from the encoder sensor 541 to ascertain the current position of the edge binder 25 moved from the standby position HP.

However, a specific method of stopping the edge binder 25 at the target position without returning the edge binder 25 to the standby position HP is not limited to the aforementioned example. As another example, the post-processing apparatus 3 may include a sensor that detects the arrival of the edge binder 25 at a given target position.

As illustrated in FIG. 3, a crimper shaft 54 provided with a drive transmission gear 54*a* is fixed to a bottom face of the crimping frame 32*c* that holds the components of the crimper 32. The crimper shaft 54 and the drive transmission gear 54*a* are held by the base 48 on which the crimping frame 32*c* is disposed, so as to be rotatable in the forward and reverse directions. The drive transmission gear 54*a* meshes with an output gear 56*a* of a crimper pivot motor 56. The crimper 32 can be rotated in the forward and reverse directions about the crimper shaft 54 on the base 48 by a driving force transmitted from the crimper pivot motor 56 to the crimper shaft 54 via the output gear 56*a* and the drive transmission gear 54*a*.

In the above description, the edge binder 25 has a configuration of moving along the guide shaft 49 with the crimper 32 and the liquid applier 31 being integrated, the embodiments of the present disclosure are not limited to the above-described configuration. For example, the crimper 32 and the liquid applier 31 may have a configuration of moving separately from each other.

Now, a description is given of a modification of the edge binder 25 described above.

Specifically, referring now to FIGS. 6 to 8C, a description is given of an edge binder 25' as a post-processing device and as a modification of the edge binder 25 included in the post-processing apparatus 3. A difference of the edge binder 25' from the edge binder 25 according to the first embodiment is that the liquid applier 31 and the crimper 32 are integrated as a single unit. In the following description, components like those of the edge binder 25 according to the first embodiment are denoted by like reference numerals, and redundant descriptions thereof may be omitted.

Figure 6:
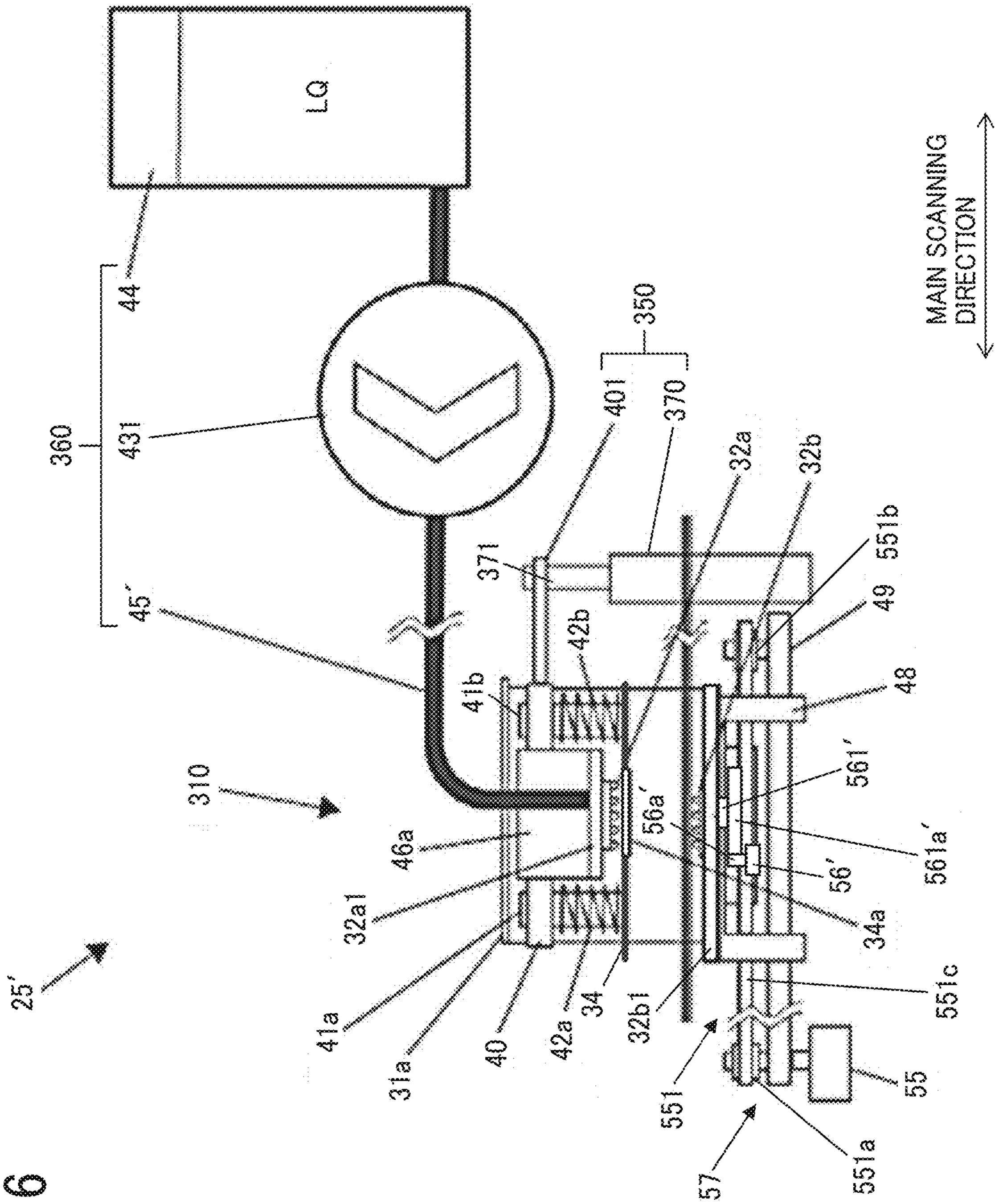
FIG. 6 is a diagram illustrating an edge binder as a modification of the edge binder of FIG. 3.

FIG. 6 is a schematic view of an upstream side of the edge binder 25' in the conveyance direction.

Figure 7A:
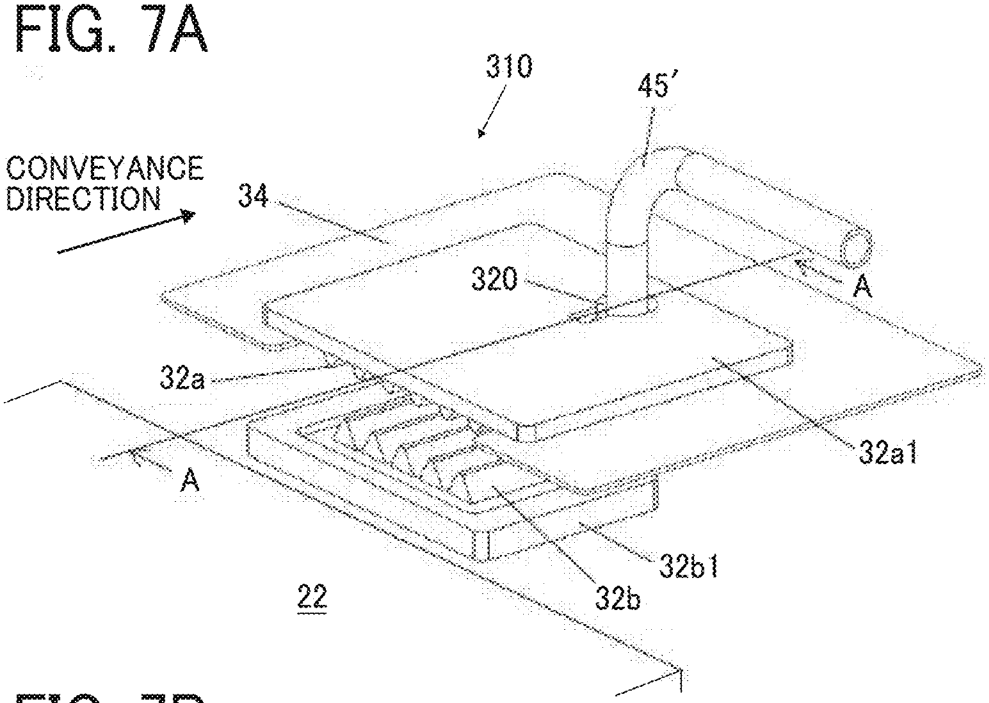
FIGS. 7A, 7B, and 7C are diagrams each illustrating a liquid application crimper of the edge binder of FIG. 6.

FIG. 7A is a perspective view of a liquid application crimper 310.

Figure 7B:
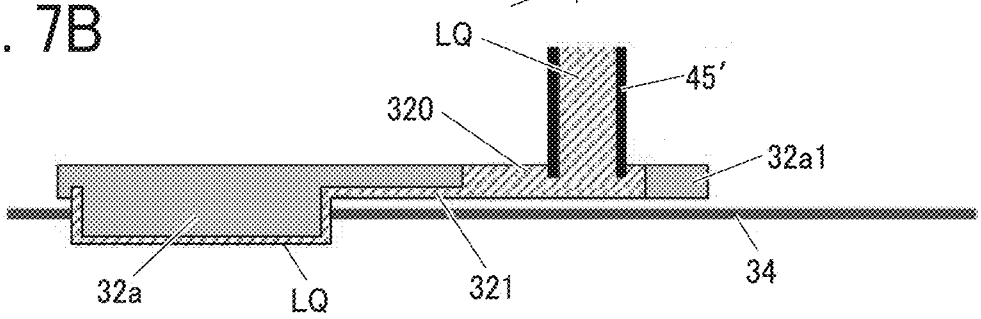

FIG. 7B is a cross-sectional view of the liquid application crimper 310 taken along line A-A in FIG. 7A.

Figure 7C:
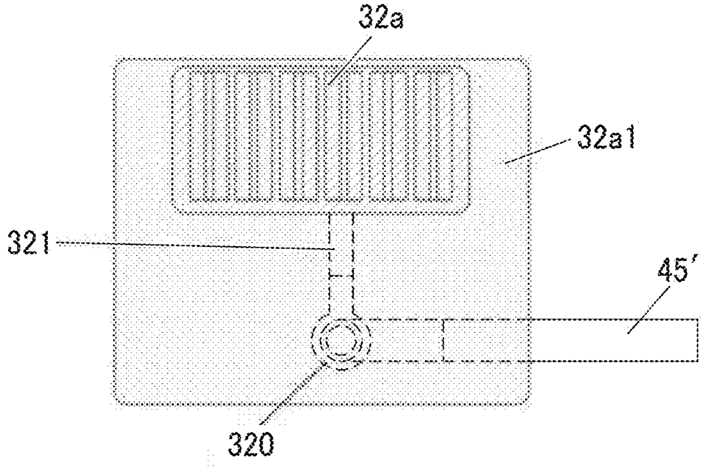

FIG. 7C is a plan view of the upper crimping teeth 32*a* of FIG. 7A as viewed from the side at which the lower crimping teeth 32*b* is disposed.

Figure 8A:
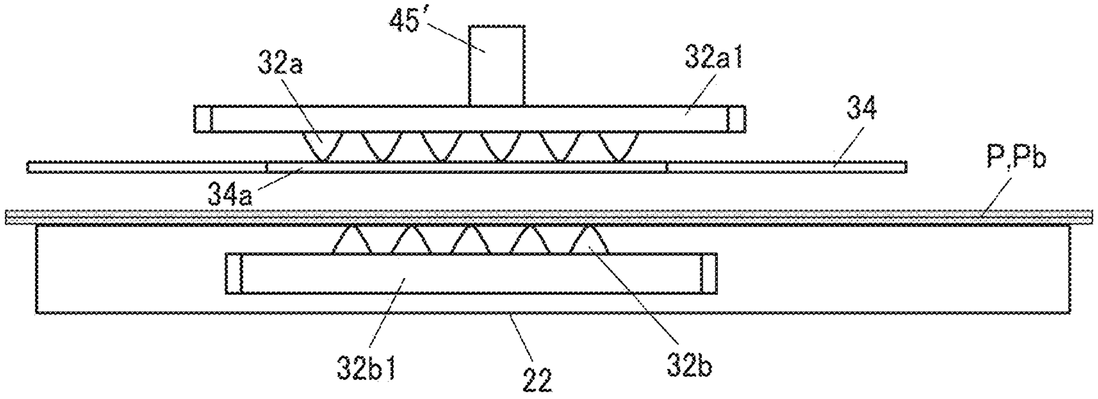
FIGS. 8A, 8B, and 8C are diagrams each illustrating a liquid applying operation and a crimp binding operation performed by the liquid application crimper of FIGS. 7A, 7B, and 7C.
Figure 8B:
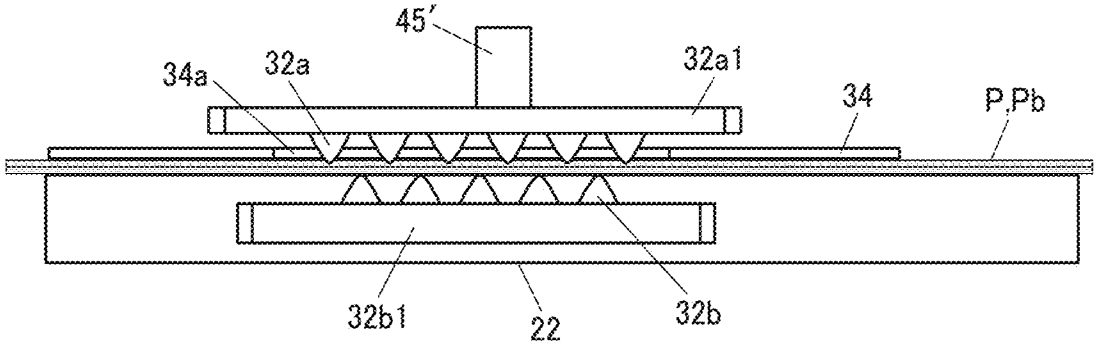
Figure 8C:
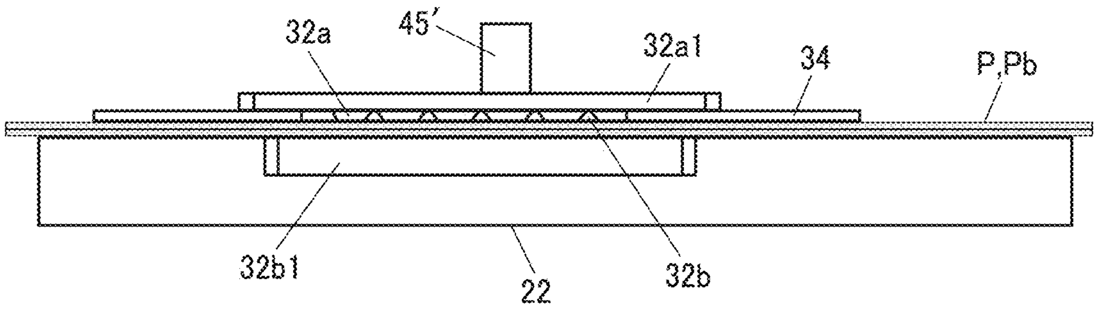

FIGS. 8A to 8C are diagrams illustrating a liquid applying operation and a crimp binding operation performed by the liquid application crimper 310.

In other words, FIGS. 8A to 8C are schematic views of a downstream side of the liquid application crimper 310 in the conveyance direction.

As illustrated in FIG. 6, the edge binder 25' includes the liquid application crimper 310 in which the liquid applier 31 and the crimper 32 (serving as a post-processing device) of the edge binder 25 according to the first embodiment are integrated as a single unit. The liquid application crimper 310 is disposed downstream from the internal tray 22 in the conveyance direction.

The liquid application crimper 310 applies liquid LQ stored in the first liquid storage tank 44 to the sheet P or the sheet bundle Pb placed on the internal tray 22. The liquid application crimper 310 can be moved in the main scanning direction by the driving force that is transmitted from the edge binder movement motor 55 to the base 48 by the driving force transmission assembly 551. The liquid application crimper 310 includes the upper pressure plate 34, the upper crimping teeth 32*a*, the lower crimping teeth 32*b*, a liquid application crimper movement assembly 350, and a liquid supply assembly 360. The components of the liquid application crimper 310 are held by the liquid application frame 31*a* and the base 48. A liquid application crimper shaft 561' provided with a drive transmission gear 561*a'* is fixed to a bottom face of the liquid application frame 31*a*. The liquid application crimper shaft 561' and the drive transmission gear 561*a'* are held by the base 48 on which the liquid application frame 31*a* is disposed, so as to be rotatable in the forward and reverse directions. The drive transmission gear 561*a'* meshes with an output gear 56*a'* of a liquid application crimper pivot motor 56'. The liquid application crimper 310 can be rotated in the forward and reverse directions about the liquid application crimper shaft 561' on the base 48 by a driving force transmitted from the liquid application crimper pivot motor 56' to the liquid application crimper shaft 561' via the output gear 56*a'* and the drive transmission gear 561*a'*.

The liquid application crimper movement assembly 350 moves the upper pressure plate 34, the base plate 40, and the upper crimping teeth 32*a* in cooperation with each other in the thickness direction of the sheet P or the sheet bundle Pb by an electric cylinder 370. The base plate 40 holds the upper crimping teeth holding member 32*al* and the upper crimping teeth 32*a* via a holder 46*a*. The base plate 40 movably holds the upper pressure plate 34 via the columns 41*a* and 41*b*. The base plate 40 is attached to the distal end of a rod 371 of the electric cylinder 370 via a connecter 401.

The columns 41*a* and 41*b* have respective lower ends holding the upper pressure plate 34. The coil springs 42*a* and 42*b* are externally inserted into the columns 41*a* and 41*b* between the base plate 40 and the upper pressure plate 34. The coil springs 42*a* and 42*b* bias the upper pressure plate 34 and the columns 41*a* and 41*b* in a direction away from the base plate 40.

The liquid supply assembly 360 includes the first liquid storage tank 44, a liquid supply pump 431, and a first liquid supply passage 45'. The liquid supply pump 431 supplies the liquid LQ to the liquid reservoir 320 disposed in the upper crimping teeth holding member 32*al* as illustrated in FIG. 7A via the first liquid supply passage 45'. The first liquid supply passage 45' is coupled to the liquid supply pump 431 at the base end and to the liquid reservoir 320 at the tip end. The first liquid supply passage 45' includes a long and elastic member.

As illustrated in FIG. 7B, the upper crimping teeth 32*a* are integrated with the upper crimping teeth holding member 32*al*. The upper crimping teeth holding member 32*al* includes the liquid reservoir 320 and a liquid supply passage 321 to supply the liquid LQ stored in the liquid reservoir 320 to the upper crimping teeth 32*a*. The surface of the upper crimping teeth 32*a* is subjected to a hydrophilic treatment so that the liquid LQ that is supplied through the liquid supply passage 321 uniformly spreads over the surface of the upper crimping teeth 32*a*. On the other hand, the portion of the upper crimping teeth holding member 32*al* other than the upper crimping teeth 32*a* is subjected to a hydrophobic treatment so that the liquid LQ efficiently spreads over the surface of the upper crimping teeth 32*a*.

As illustrated in FIG. 6, the lower crimping teeth 32*b* are integrated with a lower crimping teeth holding member 32*b*1, which is a part of the liquid application frame 31*a*. The lower crimping teeth 32*b* are attached to the base 48 via the lower crimping teeth holding member 32*b*1.

Referring now to FIGS. 8A to 8C, a description is given of the liquid applying operation and the crimp binding operation performed by the liquid application crimper 310. In the process of supplying the sheet P to the internal tray 22, as illustrated in FIG. 8A, the upper crimping teeth 32*a* and the lower crimping teeth 32*b* are apart from each other. When the sheet P is placed on the internal tray 22, the electric cylinder 370 is contracted to move the upper crimping teeth 32*a* and the upper pressure plate 34 toward the sheet P. Then, as illustrated in FIG. 8B, the upper pressure plate 34 first contacts the sheet P, and then the upper crimping teeth 32*a* pass through the through hole 34*a* of the upper pressure plate 34 and contacts the sheet P. At this time, since the liquid LQ has spread over the surface of the upper crimping teeth 32*a*, the liquid is applied from the upper crimping teeth 32*a* in contact with the sheet P to the liquid application position on the sheet P. When liquid application to the liquid application position is completed, the electric cylinder 370 is extended to separate the upper crimping teeth 32*a* and the upper pressure plate 34 from the sheet P. The above-described contact and separation operation (liquid application operation) of the upper crimping teeth 32*a* and the upper pressure plate 34 with respect to the sheets Pis repeatedly performed on sheets P of the sheet bundle Pb.

When the sheet bundle Pb constructed of a given number of sheets P is placed on the internal tray 22, the electric cylinder 370 is further contracted to move the upper crimping teeth 32*a* toward the lower crimping teeth 32*b*. As illustrated in FIG. 8C, the upper crimping teeth 32*a* further moves toward the lower crimping teeth 32*b* with the sheet bundle Pb sandwiched between the upper crimping teeth 32*a* and the lower crimping teeth 32*b*. Thus, the upper crimping teeth 32*a* and the lower crimping teeth 32*b* press and deform the sheet bundle Pb to crimp and bind the sheet bundle Pb. In short, the crimp binding operation is performed.

A description is given of a staple binder 155.

Specifically, a detailed description is now given of the staple binder 155 having a function of executing a stapling process.

Figure 9:
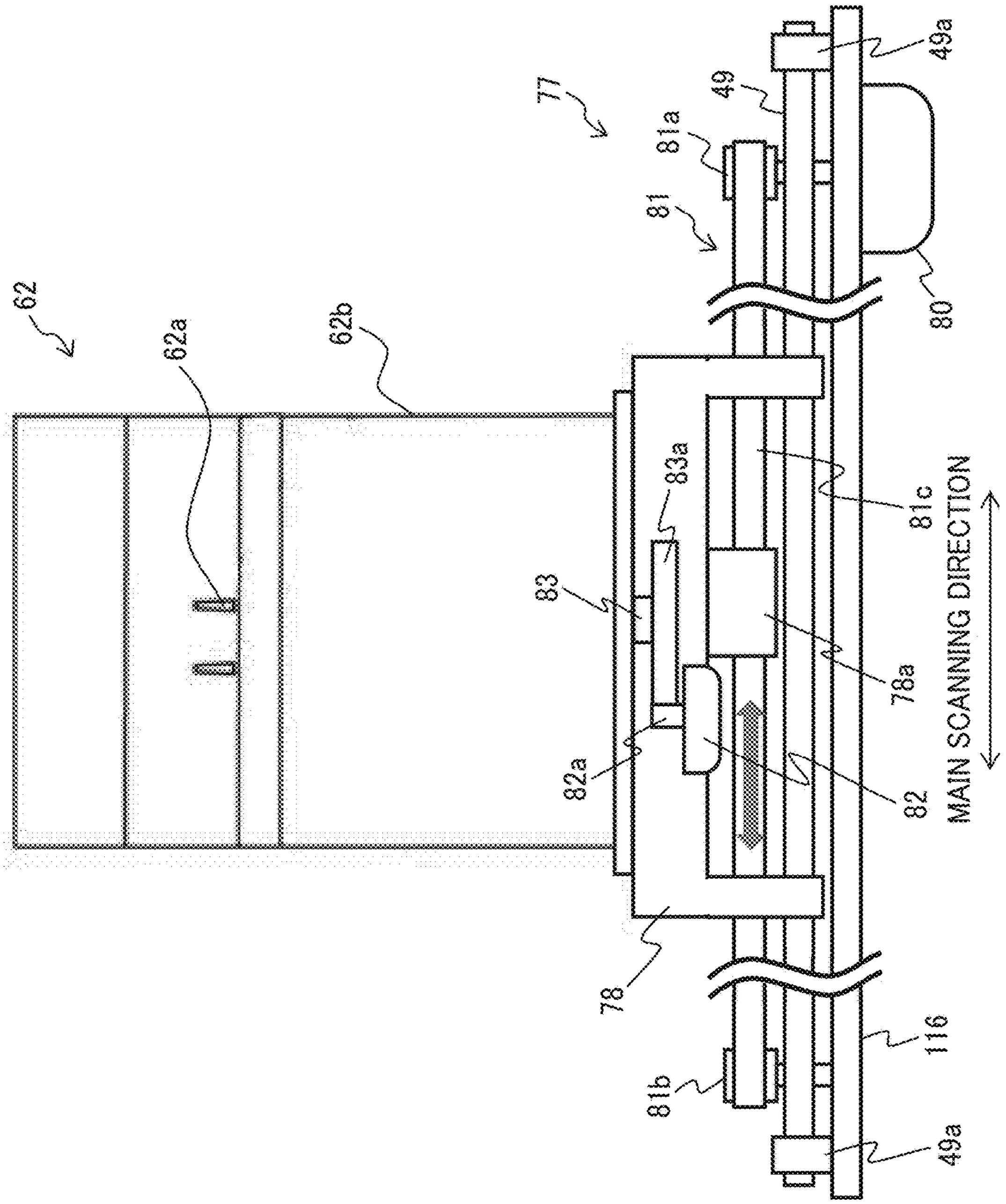
FIG. 9 is a schematic view of an upstream side of a staple binder of the post-processing apparatus of FIG. 2 in a conveyance direction.

FIG. 9 is a view of an upstream side of the staple binder 155 in the conveyance direction. The staple binder 155 includes a stapler 62 that binds the sheet bundle Pb with staples.

The stapler 62 is disposed downstream from the internal tray 22 in the conveyance direction of the sheet P and spaced apart from the edge binder 25 in the main scanning direction.

The stapler 62 serving as a post-processing device has a configuration of performing so-called "staple binding" to bind a sheet bundle Pb with a staple(s). More specifically, the stapler 62 includes a stapling-part drive motor 62*d* (see FIG. 11) that drives the stapling part 62*a*. The stapling part 62*a* binds the sheet bundle Pb by causing the binding staple loaded in the stapling part 62*a* to penetrate the sheet bundle Pb by the driving force of the stapling-part drive motor 62*d*. The configuration of the stapler 62 is already known, and thus detailed description thereof will be omitted.

As illustrated in FIG. 9, the staple binder 155 includes a staple binder movement assembly 77. The staple binder movement assembly 77 moves the staple binder 155 in the main scanning direction along a downstream end in the conveyance direction of the sheet P or the sheet bundle Pb placed on the internal tray 22. The staple binder movement assembly 77 includes, for example, a base 78, the guide shaft 49, a staple binder movement motor 80, and a driving force transmission assembly 81. The driving force transmission assembly 81 transmits a driving force of the staple binder movement motor 80 to the base 78 via pulleys 81*a* and 81*b*, a timing belt 81*c*, and a fastening portion 78*a* that fastens the base 78 and the timing belt 81*c*. A stapler shaft 83 including a drive transmission gear 83*a* is fixed to a bottom face of a stapling frame 62*b* that holds the components of the stapler 62.

The stapler shaft 83 and the drive transmission gear 83*a* are held by the base 78 on which the stapling frame 62*b* is disposed, so as to be rotatable in the forward and reverse directions. The drive transmission gear 83*a* meshes with an output gear 82*a* of a stapler pivot motor 82. The stapler 62 is rotatable in the forward and reverse directions about the stapler shaft 83 on the base 78 by a driving force transmitted from the stapler pivot motor 82 to the stapler shaft 83 via the output gear 82*a* and the drive transmission gear 83*a*.

The edge binder 25 and the staple binder 155 are supported by the common guide shaft 49. In other words, the edge binder movement assembly 57 and the staple binder movement assembly 77 move the edge binder 25 and the staple binder 155 in the main scanning direction along the common guide shaft 49. The edge binder movement assembly 57 and the staple binder movement assembly 77 can independently move the edge binder 25 and the staple binder 155.

Figure 10:
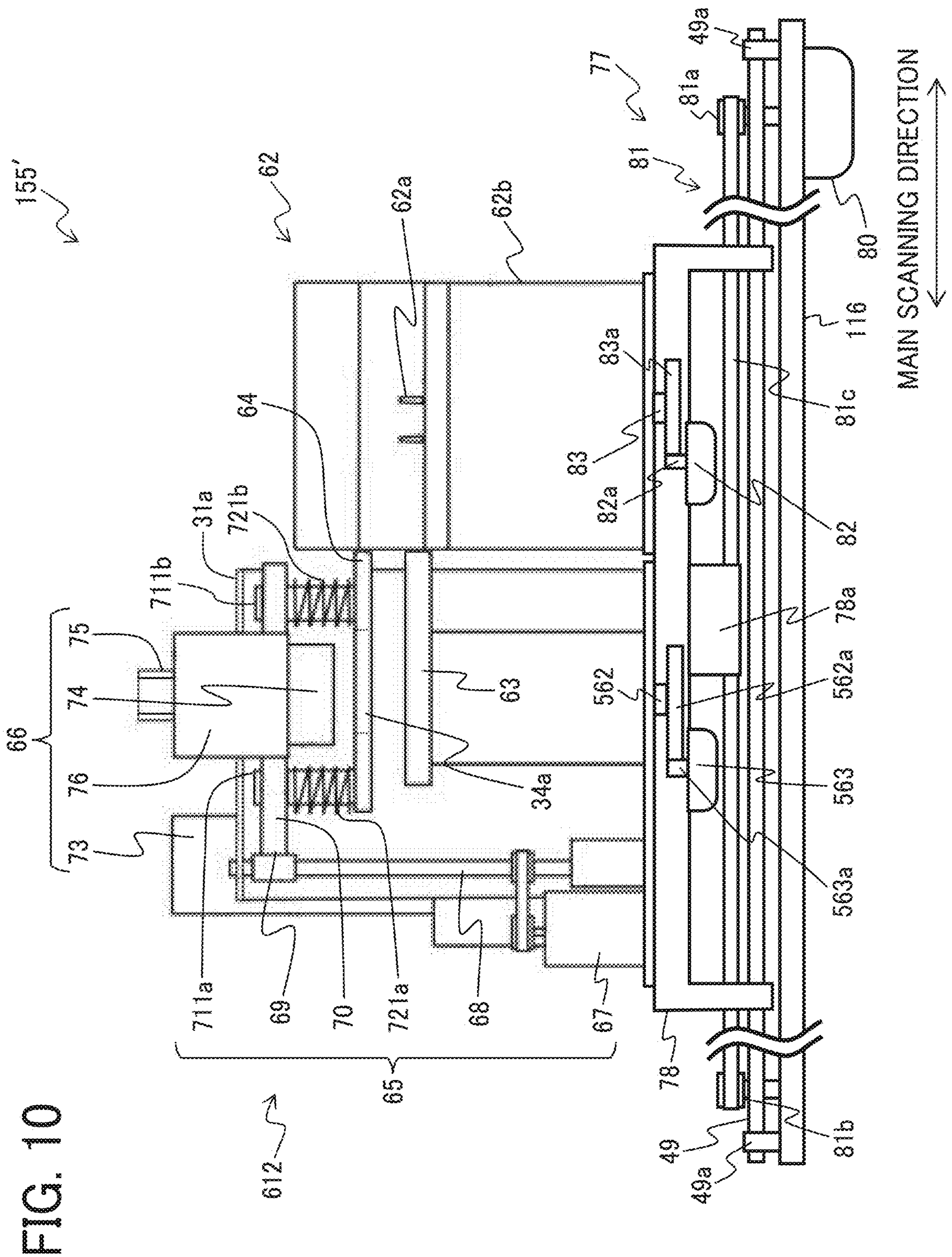
FIG. 10 is a schematic view of an upstream side of a staple binder as a modification of the staple binder of FIG. 9 in the conveyance direction.

FIG. 10 illustrates a staple binder 155' as a modification of the staple binder 155. Specifically, FIG. 10 is a view of an upstream side of the staple binder 155' in the conveyance direction.

The staple binder 155' is different from the staple binder 155 in that the staple binder 155' includes a second liquid applier 612 in addition to the stapler 62. As illustrated in FIG. 10, the staple binder 155' includes the second liquid applier 612 and the stapler 62. The second liquid applier 612 and the stapler 62 are disposed adjacent to each other in the main scanning direction on the downstream side of the internal tray 22 in the conveyance direction.

The second liquid applier 612 executes "liquid application" of applying liquid stored in a third liquid storage tank 73 to the sheet P or the sheet bundle Pb placed on the internal tray 22. A given area including a position to which the liquid is applied on the sheet P or the sheet bundle Pb by the second liquid applier 612 corresponds to a binding position to be stapled by the stapler 62. As illustrated in FIG. 10, the second liquid applier 612 includes a second lower pressure plate 63, a second upper pressure plate 64, a second liquid applier movement assembly 65, and a second liquid application assembly 66. The second liquid applier movement assembly 65 includes, for example, a second liquid applier movement motor 67, a second trapezoidal screw 68, a second nut 69, a second base plate 70, second columns 711*a* and 711*b*, and second coil springs 721*a* and 721*b*.

The second liquid application assembly 66 includes the third liquid storage tank 73, a second liquid application member 74, a second liquid supply portion 75, and a second joint 76. Since the second liquid application assembly 66 and the liquid application assembly of the liquid applier 31 (including the first liquid storage tank 44, the liquid supply member 50, the liquid application member 501, and the holder 37) illustrated in FIGS. 3 and 4 have common configurations, redundant descriptions thereof will be omitted unless otherwise required. Since the configuration of the stapler 62 illustrated in FIG. 10 is like the configuration of the stapler 62 illustrated in FIG. 9, a detailed description thereof is omitted below unless otherwise required. Since the second liquid applier 612 and the liquid applier 31 that are illustrated in FIG. 3 have common pivot mechanisms, redundant descriptions thereof will be omitted unless otherwise required. The pivot mechanism of the second liquid applier 612 includes a liquid applier pivot motor 563, an output gear 563*a*, a drive transmission gear 562*a*, and a liquid applier shaft 562.

In the binding process, the staple binder 155' that is illustrated in FIG. 10 performs the liquid application process on the sheet P to loosen and soften the binding position, allowing the staple to easily pass through the sheet bundle Pb. As a result, the number of sheets to be bound per sheet bundle Pb can be increased as compared with a case where the stapling process is performed without applying the liquid.

A description is given of a control block of the post-processing apparatus 3.

A description is given below of a control block of the post-processing apparatus 3, with reference to FIG. 11.

Figure 11:
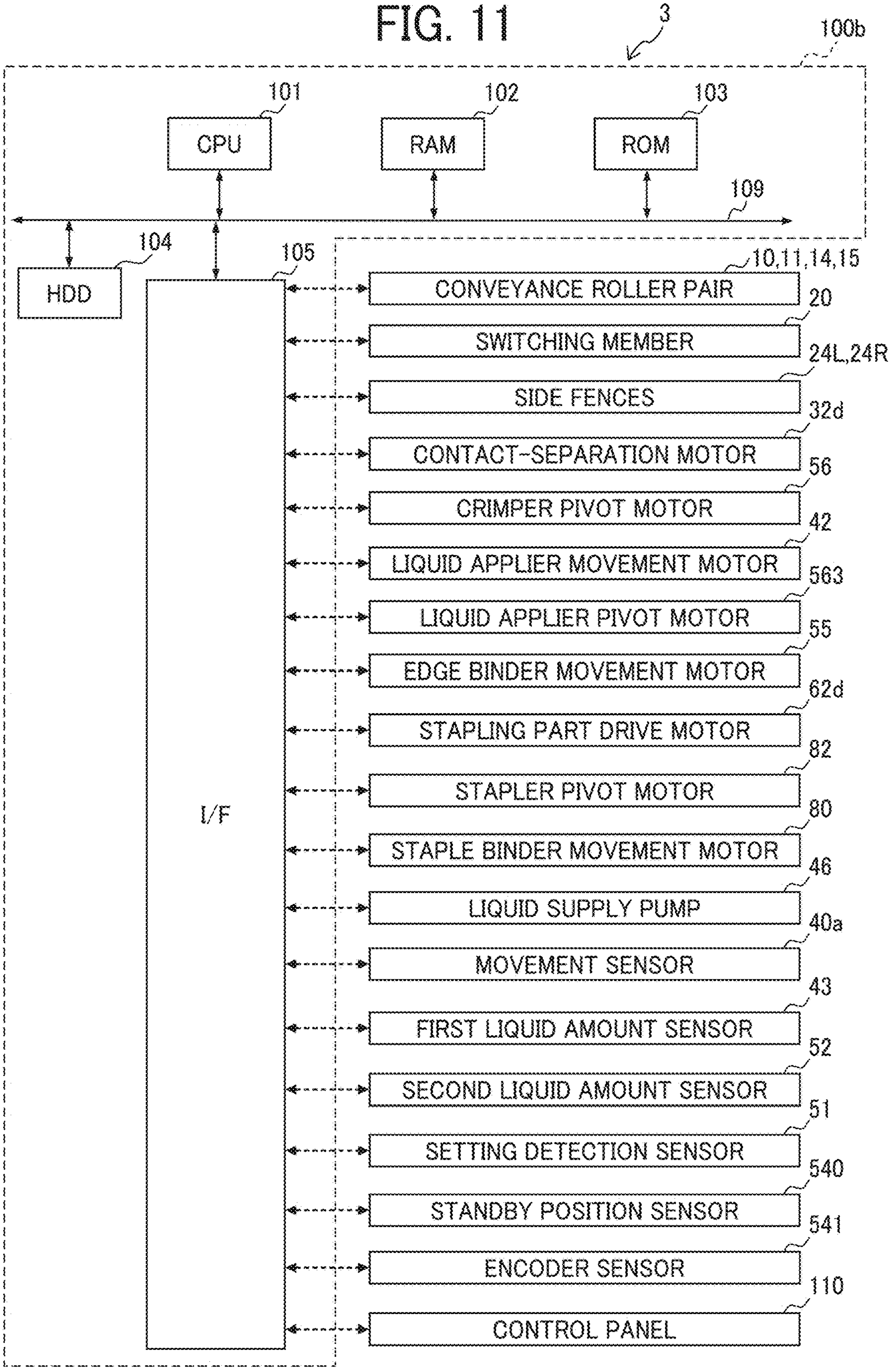
FIG. 11 is a block diagram illustrating a hardware configuration of the post-processing apparatus of FIG. 2 to control the post-processing apparatus.

FIG. 11 is a block diagram illustrating a hardware configuration for executing control processing in the post-processing apparatus 3.

As illustrated in FIG. 11, the post-processing apparatus 3 includes a central processing unit (CPU) 101, a random access memory (RAM) 102, a read only memory (ROM) 103, a hard disk drive (HDD) 104, and an interface (I/F) 105.

The CPU 101, the RAM 102, the ROM 103, the HDD 104, and the I/F 105 are connected to each other via a common bus 109.

The CPU 101 is an arithmetic unit and controls the operation of the overall operation of the post-processing apparatus 3.

The RAM 102 is a volatile storage medium that allows data to be read and written at high speed. The CPU 101 uses the RAM 102 as a work area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

The post-processing apparatus 3 processes, by an arithmetic function of the CPU 101, e.g., a control program stored in the ROM 103 and an information processing program (or application program) loaded into the RAM 102 from a storage medium such as the HDD 104. Such processing configures a software controller including various functional modules of the post-processing apparatus 3. The software controller that is thus configured cooperates with hardware resources of the post-processing apparatus 3 to construct functional blocks that implement functions of the post-processing apparatus 3. In other words, the CPU 101, the RAM 102, the ROM 103, the HDD 104, and the I/F 105 constitute at least part of a controller 100*b* serving as a control device that controls the operation of the post-processing apparatus 3.

The I/F 105 is an interface that connects the conveyance roller pairs 10, 11, 14, and 15, the switching member 20, the side fences 24L and 24R, the contact-separation motor 32*d*, the crimper pivot motor 56, the liquid applier movement motor 42, the liquid applier pivot motor 563, the edge binder movement motor 55, the stapling-part drive motor 62*d*, the stapler pivot motor 82, the staple binder movement motor 80, the liquid supply pump 46, the movement sensor 40*a*, the first liquid amount detection sensor 43, the second liquid amount detection sensor 52 serving as a second liquid amount detector, the setting detection sensor 51, the standby position sensor 540, the encoder sensor 541, and a control panel 110 to the common bus 109.

The controller 100*b* controls, via the I/F 105, the operations of the conveyance roller pairs 10, 11, 14, and 15, the switching member 20, the side fences 24L and 24R, the contact-separation motor 32*d*, the crimper pivot motor 56, the liquid applier movement motor 42, the liquid applier pivot motor 563, the edge binder movement motor 55, the stapling-part drive motor 62*d*, the stapler pivot motor 82, the staple binder movement motor 80, and the liquid supply pump 46. The controller 100*b* acquires detection results from the movement sensor 40*a*, the first liquid amount detection sensor 43, the second liquid amount detection sensor 52, the setting detection sensor 51, the standby position sensor 540, and the encoder sensor 541.

Although FIG. 11 illustrates only the components related to the edge binder 25 and the staple binder 155 that perform the edge binding, the components related to the saddle binder 28 that performs the saddle binding are also controlled by the controller 100*b*.

As illustrated in FIG. 1, the image forming apparatus 2 includes the control panel 110. The control panel 110 includes an operating device that receives instructions input by a user and a display serving as a notifier that notifies the user of information. The control panel 110 includes, for example, physical input buttons and a touch screen overlaid on a display. The control panel 110 acquires information from the user through the operation unit and provides the information to the user through the display. A specific example of the notification unit is not limited to the display and may be a light emitting diode (LED) lamp or a speaker. The post-processing apparatus 3 may include a control panel 110 similar to the above-described control panel 110 of the image forming apparatus 2.

As described above, the post-processing apparatus 3 implements the function of performing operation control related to the liquid application by software (control programs) executed by the CPU 101 with hardware resources included in the controller 100*b*.

The liquid application executed by the post-processing apparatus 3 may be performed by the staple binder 155 including the stapler 62 only, and the liquid application may be performed by using the liquid applier 31 included in the edge binder 25. On the other hand, the edge binder 25 may include only the crimper 32, and the liquid application may be performed by using the second liquid applier 612. In other words, the post-processing apparatus 3 may have a configuration in which either one of the liquid applier 31 and the second liquid applier 612 performs the liquid application, regardless of the type of the binding process.

In the above description, the staple binder 155' has a configuration in which the stapler 62 and the second liquid applier 612 move along the guide shaft 49 as a single unit.

However, the embodiments of the present disclosure are not limited to the above-described configuration. For example, the stapler 62 and the second liquid applier 612 may move separately.

A description is given of a binding process according to an embodiment of the present disclosure.

A description is given below of the binding process executed by the edge binder 25 included in the post-processing apparatus 3.

Figure 12:
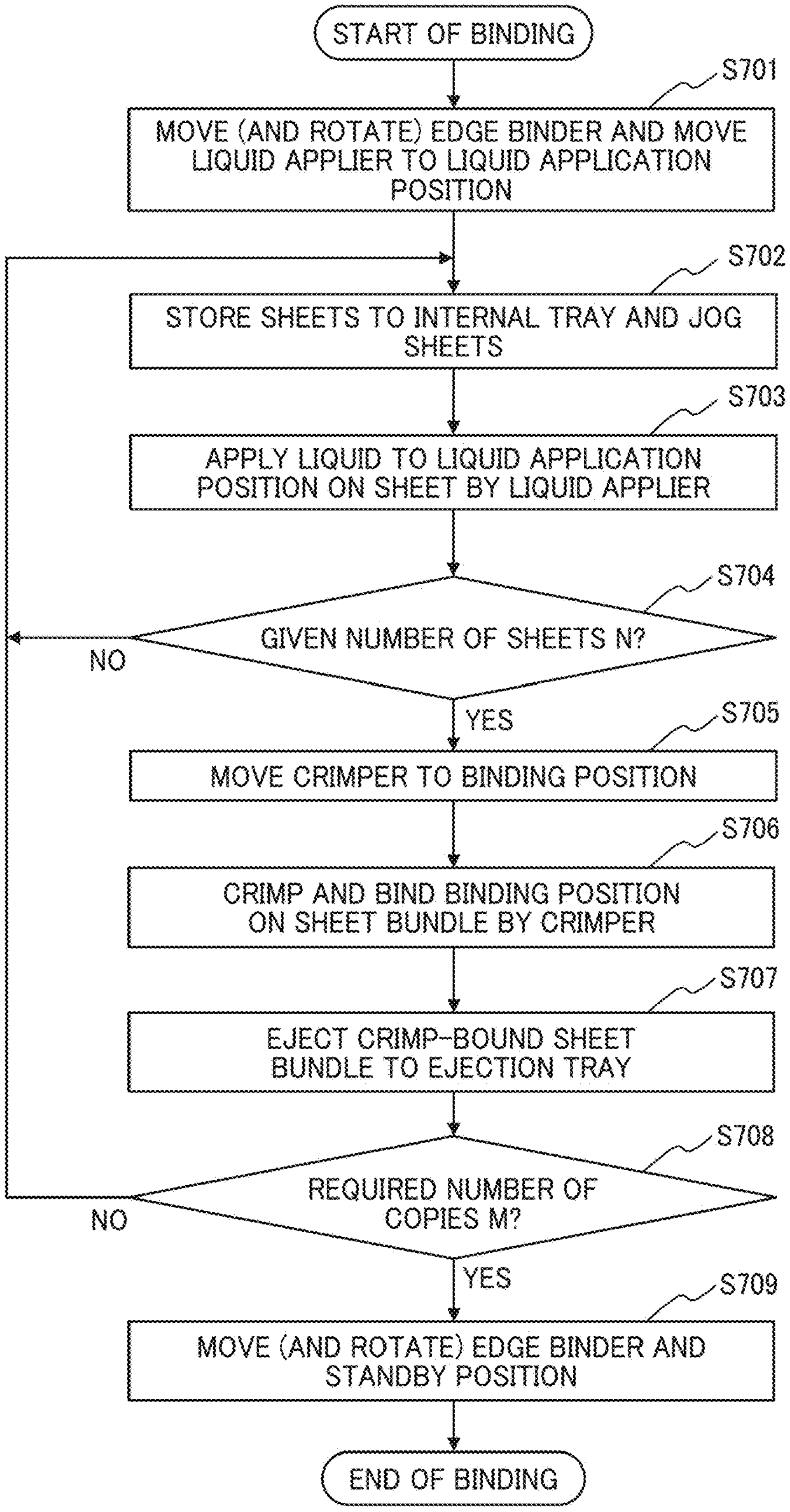
FIG. 12 is a flowchart of a binding process performed by the edge binder of FIG. 3.

FIG. 12 is a flowchart of a process of a one-point binding performed by the edge binder 25.

Figure 13C:
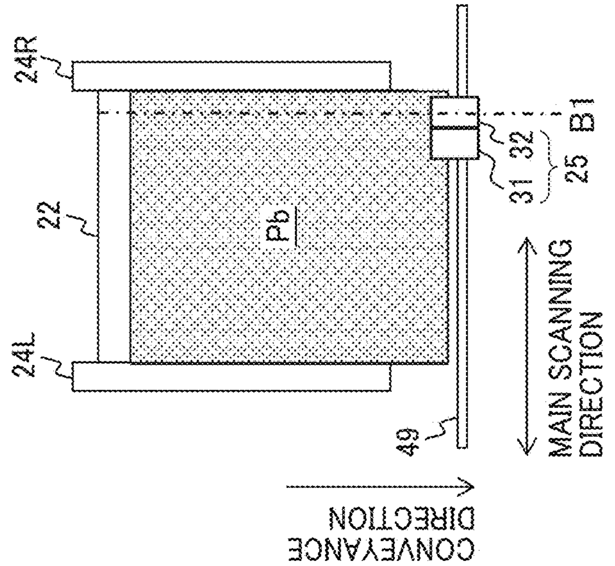
FIGS. 13A, 13B, and 13C are diagrams each illustrating the positions of the liquid applier and the crimper during the binding process of FIG. 12.
Figure 13B:
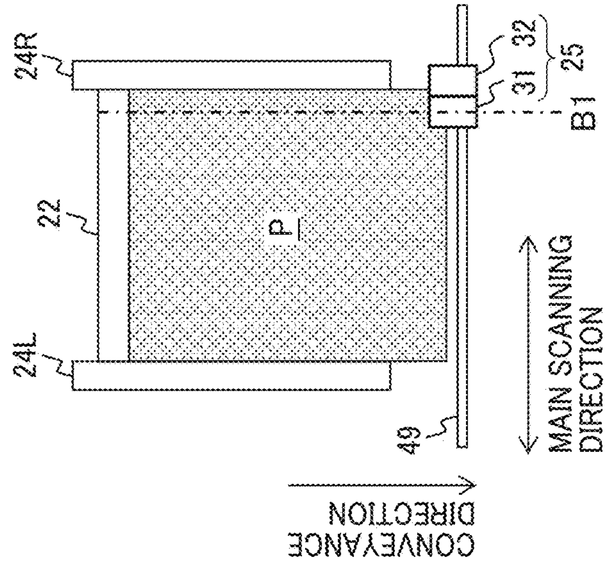
Figure 13A:
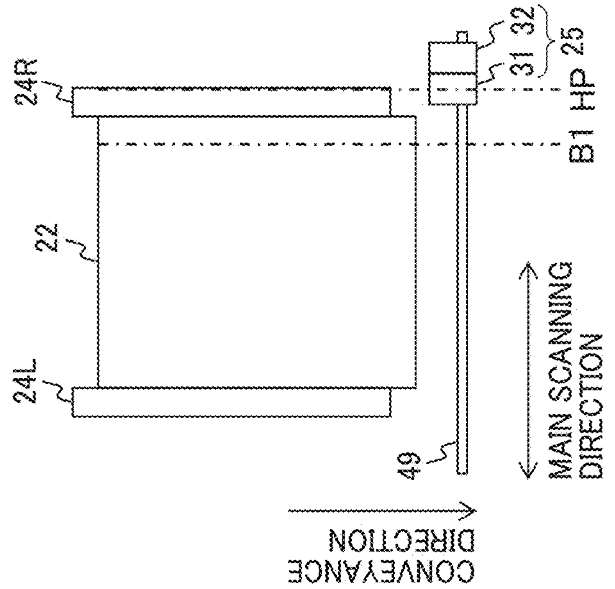

FIGS. 13A, 13B, and 13C are diagrams each illustrating the positions of the edge binder 25 (the liquid applier 31 and the crimper 32) during the one-point binding. FIGS. 13A to 13C do not illustrate changes in the postures of the liquid applier 31 and the crimper 32.

The position (liquid application position) to which liquid is applied on a sheet P or a sheet bundle Pb by the liquid applier 31 corresponds to the binding position on the sheet bundle Pb to be crimped by the crimper 32. For this reason, in the following description, the liquid application position and the binding position are denoted by the same reference sign (B1).

For example, the controller 100*b* starts the binding process illustrated in FIG. 9 when the controller 100*b* acquires an instruction to execute the binding process from the image forming apparatus 2. In the following description, the instruction to execute the binding process may be referred to as a "binding command."

The binding command includes, for example, the type of the sheet P (i.e., information affecting the spread of liquid, such as material and thickness), the number of sheets P of the sheet bundle Pb, the number of sheet bundles Pb to be bound, the binding position on the sheet bundle Pb, and the binding posture of the edge binder 25. In the following description, the number of sheets P of the sheet bundle Pb may be referred to as "given number of sheets N" whereas the number of sheet bundles Pb to be bound may be referred to as "requested number of copies M." The liquid applier 31 and the crimper 32 are assumed to be in a parallel binding posture and located at a standby position HP (FIG. 13A) that is a position shifted in the width direction from the sheets P placed on the internal tray 22 at the start of the binding process.

When the posture that is instructed by the binding command is the "oblique binding posture", the controller 100*b* drives the liquid applier pivot motor 563 and the crimper pivot motor 56 to rotate the liquid applier 31 and the crimper 32 of the edge binder 25 into the oblique binding posture (step S701). Alternatively, when the posture that is instructed by the binding command is the "oblique binding posture," only the crimper 32 may be rotated to the oblique binding posture while the liquid applier 31 may not be rotated. In this case, the driving assembly may be simplified as compared with a case where both the liquid applier 31 and the crimper 32 are rotated in the forward and reverse directions, and thus effects of cost reduction, downsizing of the apparatus, and reduction of failure of the device are exhibited.

On the other hand, when the posture that is instructed by the binding command is the "parallel binding posture," the controller 100*b* omits the aforementioned operation of rotating the liquid applier 31 and the crimper 32 of the edge binder 25 to the oblique binding posture.

The controller 100*b* drives the edge binder movement motor 55 to move the edge binder 25 in the main scanning direction so that the liquid applier 31 faces the liquid application position B1 instructed by the binding command (step S701). The controller 100*b* executes the operation of step S701 before a first sheet P is conveyed to the internal tray 22 by the conveyance roller pairs 10, 11, 14, and 15.

The controller 100*b* rotates the conveyance roller pairs 10, 11, 14, and 15 to store the sheet P, on which the image has been formed by the image forming apparatus 2, onto the internal tray 22 (step S702). The controller 100*b* moves the side fences 24L and 24R to align the position of the sheet P or the sheet bundle Pb placed on the internal tray 22 in the main scanning direction (step S702). In short, the controller 100*b* performs so-called jogging.

Subsequently, the controller 100*b* causes the liquid applier 31 facing the liquid application position B1 to perform liquid application, on the basis of pre-adjusted liquid application control data, in the liquid application position B1 on the sheet P, which has been placed on the internal tray 22 in the immediately preceding step S702 (step S703). In other words, the controller 100*b* drives the liquid applier movement motor 42 to bring the liquid application member 501 into contact with the liquid application position B1 on the sheet P placed on the internal tray 22 (see FIG. 13B).

In the liquid application process in step S703, the controller 100*b* adjusts the position at which the liquid application member 501 applies liquid to the sheet P in accordance with the type of the sheet P and the binding position included in the binding command. The controller 100*b* adjusts the amount of pressing the liquid application member 501 against the sheet P. In other words, the controller 100*b* controls the driving of the liquid applier movement motor 42 based on the adjusted control data, and adjusts the amount of movement of the liquid application member 501 with respect to the liquid application position B1 of the sheet P placed on the internal tray 22.

The controller 100*b* determines whether the number of sheets P placed on the internal tray 22 has reached the given number of sheets N instructed by the binding command (step S704). When the controller 100*b* determines that the number of sheets P placed on the internal tray 22 has not reached the given number of sheets N (NO in step S704), the controller 100*b* executes the operations of steps S702 to S704 again until the number of sheets P placed on the internal tray 22 reaches the given number of sheets N (YES in step S704). In other words, the controller 100*b* executes the processing of steps S702 to S704 each time the sheet P is conveyed to the internal tray 22 by the conveyance roller pairs 10, 11, 14, and 15. The liquid application by the liquid applier 31 may be performed on each of the sheets P of the sheet bundle Pb.

When the controller 100*b* determines that the number of sheets P placed on the internal tray 22 has reached the given number of sheets N (YES in step S704), the controller 100*b* drives the edge binder movement motor 55 to move the edge binder 25 in the main scanning direction such that the crimper 32 faces the binding position B1 as illustrated in FIG. 13C (step S705).

The controller 100*b* causes the crimper 32 to crimp and bind the sheet bundle Pb placed on the internal tray 22 (step S706). The controller 100*b* causes the conveyance roller pair 15 to eject the sheet bundle Pb thus crimped and bound by the crimper 32 to the ejection tray 26 (step S707). Specifically, the controller 100*b* drives the contact-separation motor 32*d* to cause the upper crimping teeth 32*a* and the lower crimping teeth 32*b* to pinch the binding position B1 on the sheet bundle Pb placed on the internal tray 22. The sheet bundle Pb is pressed and deformed between the upper crimping teeth 32*a* and the lower crimping teeth 32*b*. Thus, the crimper 32 crimps the sheet bundle Pb. Then, the controller 100*b* rotates the conveyance roller pair 15 to eject the sheet bundle Pb thus crimped and bound to the ejection tray 26.

The sheet bundle Pb placed on the internal tray 22 has a crimping area (corresponding to the binding position B1) pinched between the upper crimping teeth 32*a* and the lower crimping teeth 32*b* in step S706. The crimping area overlaps a liquid application area (corresponding to the liquid application position B1) contacted by a distal end (tip portion) of the liquid application member 501 in step S703. In other words, the crimper 32 crimps and binds a region to which the liquid has been applied by the liquid applier 31 on the sheet bundle Pb placed on the internal tray 22. The crimping area that is pinched by the upper crimping teeth 32*a* and the lower crimping teeth 32*b* may completely or partially overlaps the liquid application area contacted by the distal end (tip portion) of the liquid application member 501, to obtain a sufficient binding strength.

The controller 100*b* determines whether the number of sheet bundles Pb thus ejected to the ejection tray 26 has reached the requested number of copies M indicated by the binding command (step S708). When the controller 100*b* determines that the number of sheet bundles Pb thus ejected has not reached the requested number of copies M (NO in step S708), the controller 100*b* executes the operations of step S702 and the following steps again. In other words, when the controller 100*b* determines that the number of sheet bundles Pb thus ejected has not reached the requested number of copies M (NO in step S708), the controller 100*b* repeats the operations of steps S702 to S708 until the number of sheet bundles Pb ejected to the ejection tray 26 reaches the requested number of copies M.

On the other hand, when the controller 100*b* determines that the number of sheet bundles Pb output to the ejection tray 26 has reached the requested number of copies M (YES in step S708), the controller 100*b* drives the edge binder movement motor 55 to move the edge binder 25 (the liquid applier 31 and the crimper 32) to the standby position HP as illustrated in FIG. 13A (step S709) When the posture that is instructed by the binding command is the "oblique binding posture," the controller 100*b* drives the liquid applier pivot motor 563 and the crimper pivot motor 56 to rotate the liquid applier 31 and the crimper 32 into the parallel binding posture (step S709). By contrast, when the posture that is instructed by the binding command is the "parallel binding posture," the controller 100 omits the aforementioned operation of rotating the liquid applier 31 and the crimper 32 to the parallel binding posture. As a result, the edge binder 25 (the liquid applier 31 and the crimper 32) returns to the standby position HP position illustrated in FIG. 13A. In steps S701 and S709, the execution order of the movement in the main scanning direction and the rotation in the forward and reverse directions of the liquid applier 31 and the crimper 32 is not limited to the aforementioned order and may be reversed.

A detailed description is given below of a second liquid storage tank 47 according to an embodiment of the present disclosure.

Figure 14A:
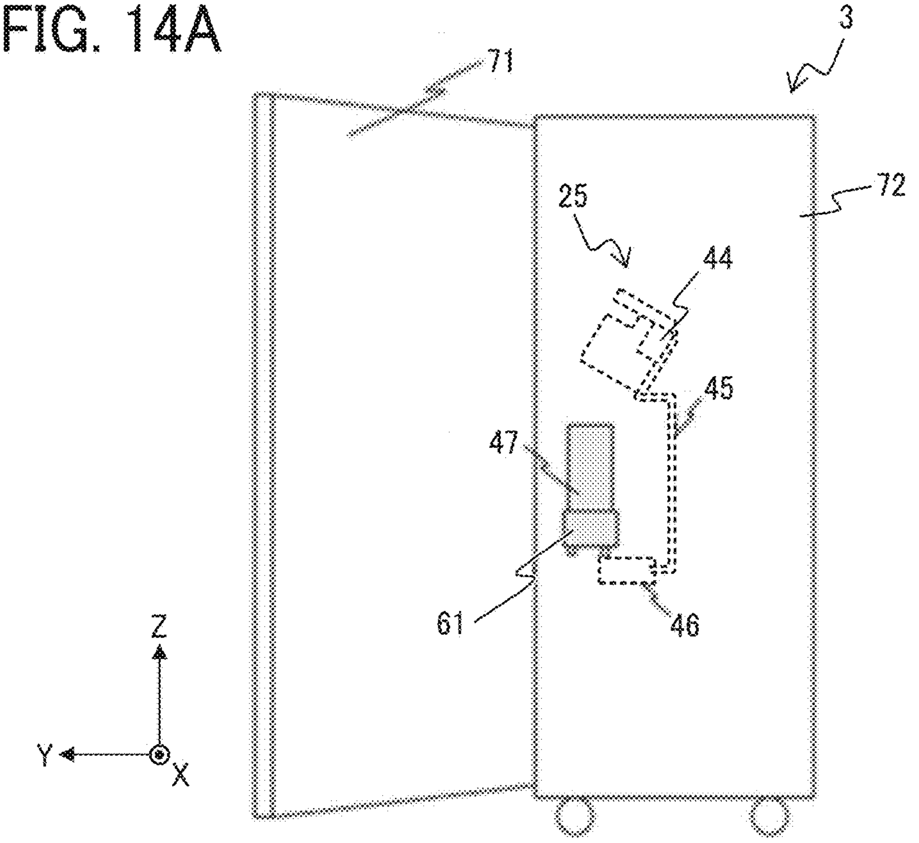
FIGS. 14A and 14B are diagrams illustrating the arrangement and configuration of a second liquid storage in the post-processing apparatus of FIG. 2.
Figure 14B:
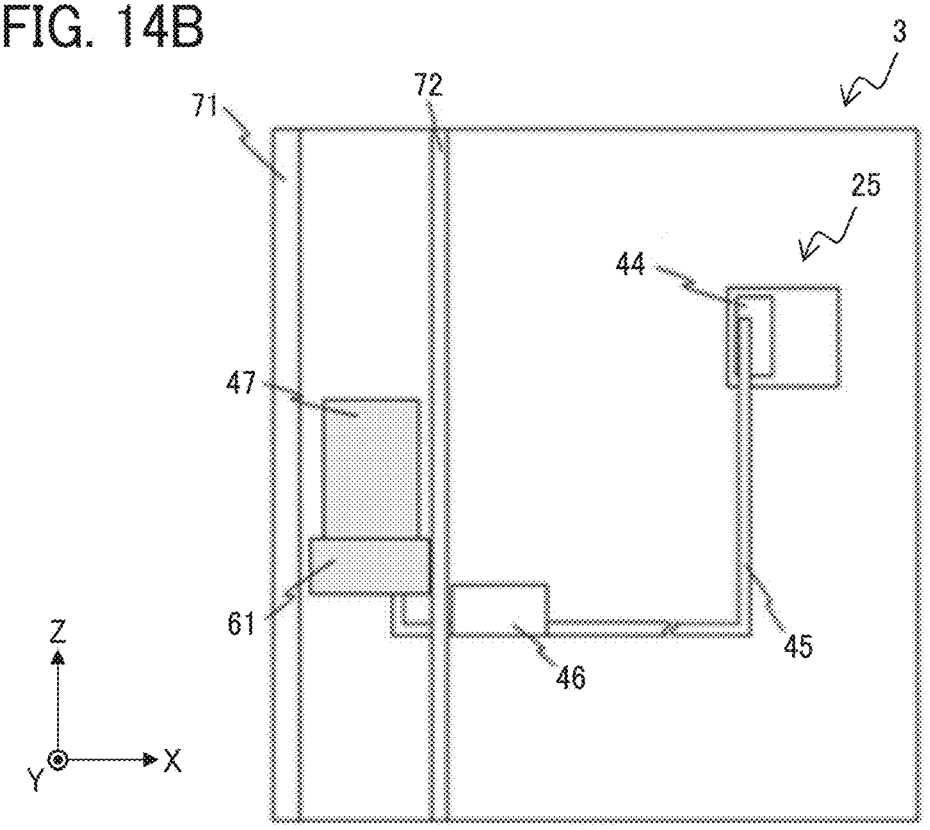

Referring now to FIGS. 14A, 14B, and 15, a description is given of the arrangement and configuration of the second liquid storage tank 47 in the post-processing apparatus 3.

FIGS. 14A and 14B illustrate example location and configuration of the second liquid storage tank 47 as a main tank.

FIG. 14A illustrates the post-processing apparatus 3 with a cover 71 opened.

FIG. 14B is a cross-sectional side view of the post-processing apparatus 3, illustrating the post-processing apparatus 3 with the cover 71 closed.

As illustrated in FIGS. 14A and 14B, the second liquid storage tank 47 is located so as to be accessible when the cover 71 of the post-processing apparatus 3 is opened.

As illustrated in FIG. 14B, the second liquid storage tank 47 and the second liquid storage tank fixer 61 are disposed on the near side in a depth direction (X direction) of the post-processing apparatus 3. The first liquid storage tank 44 is disposed on the far side in the depth direction (X direction) of the post-processing apparatus 3. A main body side plate 72 of the post-processing apparatus 3 is disposed between the arrangement position of the second liquid storage tank 47 and the second liquid storage tank fixer 61 and the arrangement position of the first liquid storage tank 44. The second liquid storage tank fixer 61 is attached to the main body side plate 72 of the post-processing apparatus 3.

Figure 15A:
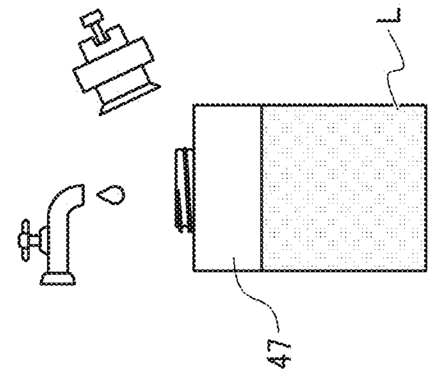
FIGS. 15A, 15B, and 15C are diagrams each illustrating an attachment and detachment configuration of the second liquid storage of FIGS. 14A and 14B.
Figure 15B:
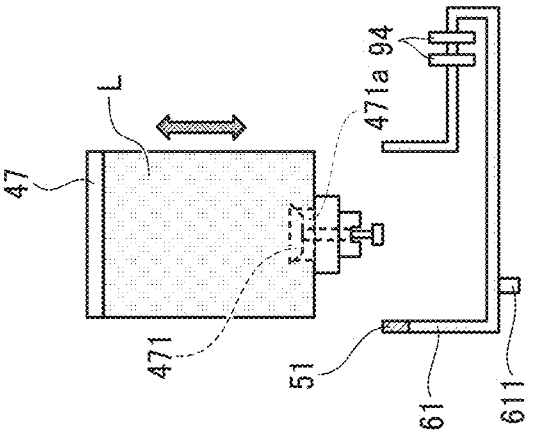
Figure 15C:
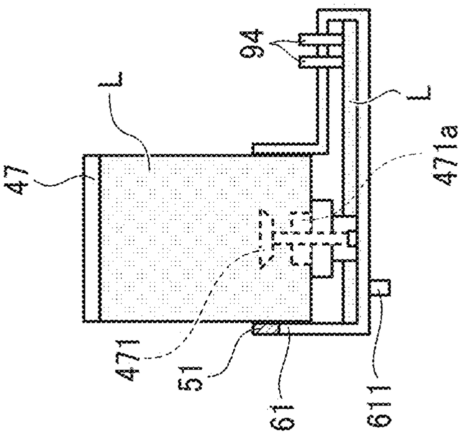

FIGS. 15A, 15B, and 15C each illustrates the second liquid storage tank 47 attachable to and detachable from the second liquid storage tank fixer 61 and a state where liquid is replenished to the second liquid storage tank 47.

As illustrated in FIG. 15A, the second liquid storage tank 47 is detachably attached to the first liquid storage tank 44 so that the second liquid storage tank 47 can replenish the liquid to the first liquid storage tank 44. As illustrated in FIG. 15B, the second liquid storage tank fixer 61 is provided with the setting detection sensor 51 serving as a setting detector that detects that the second liquid storage tank 47 is set in the second liquid storage tank fixer 61.

When the setting detection sensor 51 detects the set state of the second liquid storage tank 47 to the second liquid storage tank fixer 61 (see FIG. 15C), a signal indicating the set state is transmitted to the controller 100*b*. Thus, the controller 100*b* detects whether the second liquid storage tank 47 is mounted to the second liquid storage tank fixer 61.

The second liquid amount detection sensor 52 (serving as second liquid detector) that detects the amount of liquid L to be stored in the second liquid storage tank 47 is disposed in the second liquid storage tank fixer 61. The output value (voltage) of the second liquid amount detection sensor 52 is notified to the controller 100*b*. The controller 100*b* determines the output value (voltage) of the second liquid amount detection sensor 52 to determine whether the amount of liquid stored in the second liquid storage tank fixer 61 is a required amount of liquid. When the controller 100*b* determines that the second liquid storage tank 47 is in the mount state based on the output signal of the setting detection sensor 51, the controller 100*b* turns on the second liquid amount detection sensor 52 such that the remaining amount of liquid (the amount of the liquid stored) in the second liquid storage tank fixer 61 can be detected.

When the second liquid storage tank 47 is not mounted on the second liquid storage tank fixer 61, an outlet of the second liquid storage tank 47 is closed by a liquid supply valve 471 so that the liquid does not leak. As illustrated in FIG. 15C, when the second liquid storage tank 47 is mounted on the second liquid storage tank fixer 61, the liquid supply valve 471 is pushed up to open a liquid discharge port 471*a* of the second liquid storage tank 47. By so doing, the liquid is flow out from the second liquid storage tank 47 to the second liquid storage tank fixer 61. As a result, the liquid stored in the second liquid storage tank 47 flows out to the second liquid storage tank fixer 61. The liquid flown from the second liquid storage tank 47 is temporarily stored in the second liquid storage tank fixer 61.

As a measurement to prevent the liquid from being frozen during maintenance of the post-processing apparatus 3, a liquid draining process may be performed to drain the liquid in the post-processing apparatus 3. In the liquid draining process, the liquid remaining in the first liquid storage tank 44 and the liquid supply passage 45 is supplied by the liquid supply pump 46 to the second liquid storage tank fixer 61 via the liquid supply passage 45 in the reverse direction. In order to deal with such a situation, the second liquid storage tank fixer 61 is set to the amount to sufficiently store liquid in the first liquid storage tank 44 and the liquid supply passage 45. The second liquid storage tank fixer 61 has a liquid drain plug 611.

After the liquid remaining in the first liquid storage tank 44 and the liquid supply passage 45 is reversely fed by the liquid supply pump 46 to the second liquid storage tank fixer 61, the liquid drain plug 611 is opened to discharge the liquid stored in the second liquid storage tank fixer 61 from the inside of the post-processing apparatus 3.

A description is given of a configuration of liquid application according to a first embodiment of the present disclosure.

A description is now given of an overall configuration of the configuration used for liquid application in the edge binder 25 and the staple binder 155 included in the post-processing apparatus 3 and the configuration of supplying liquid to the edge binder 25 and the staple binder 155.

Figure 16:
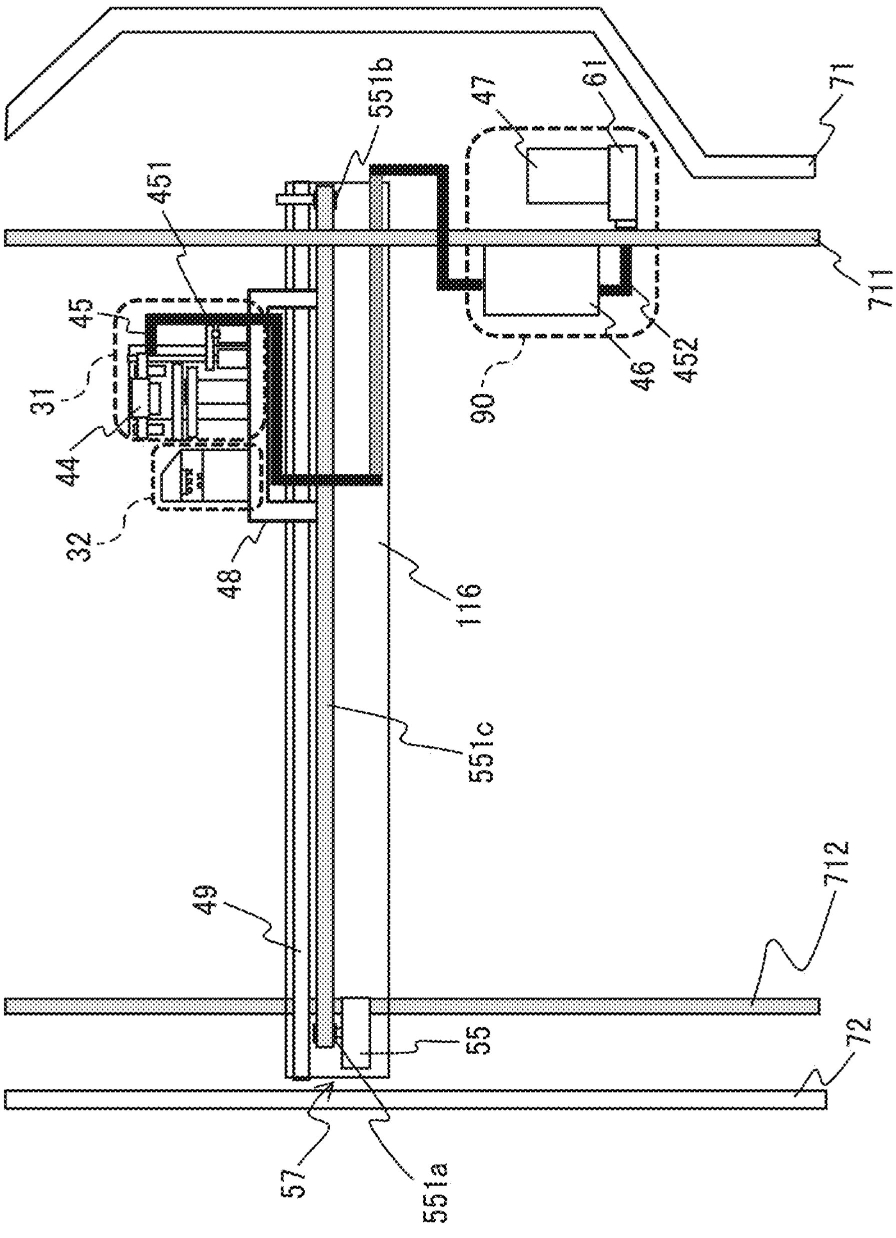
FIG. 16 is a diagram illustrating an operation performed by a liquid applier according to the present embodiment.
Figure 17:
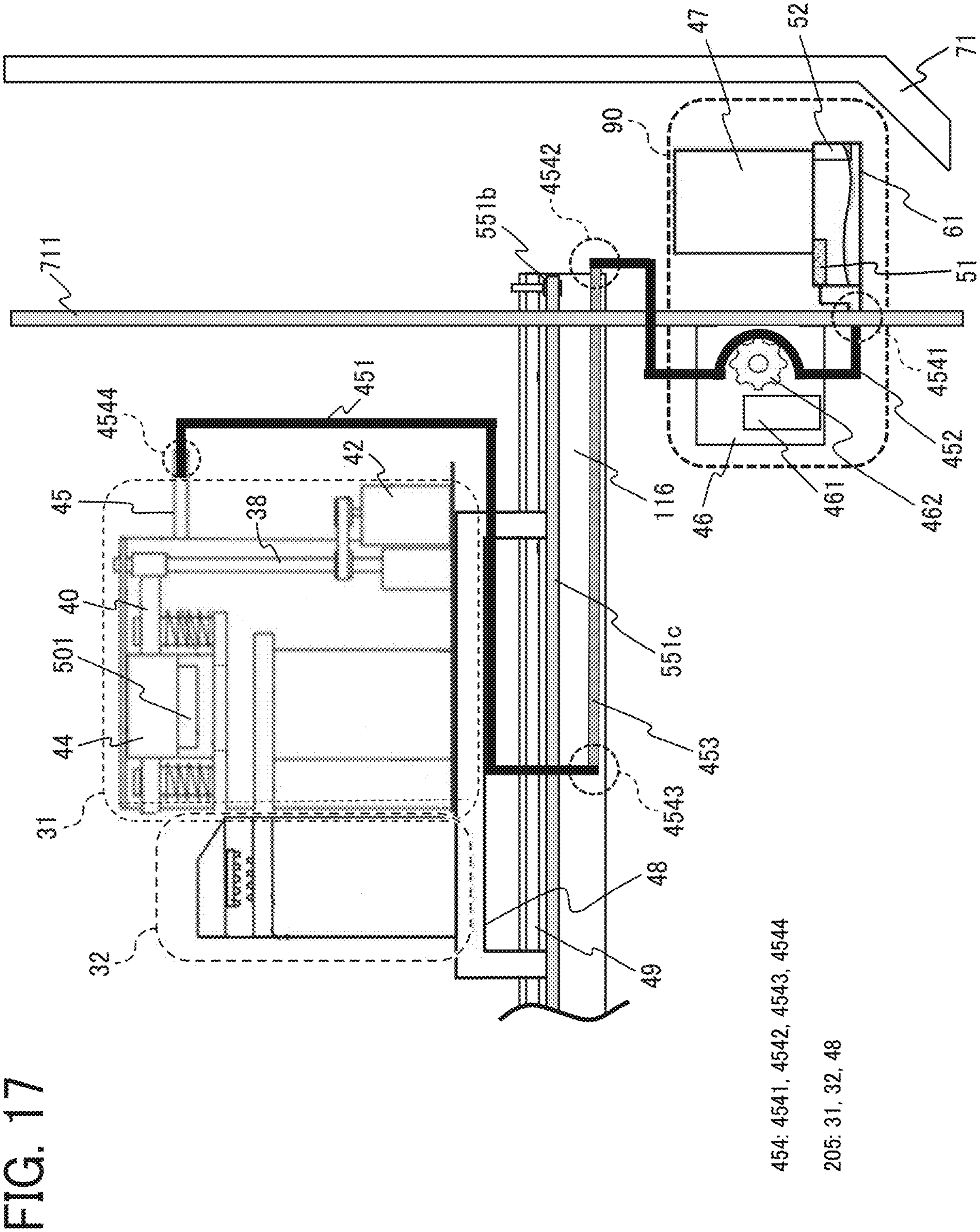
FIG. 17 is an enlarged diagram illustrating another operation performed by a liquid applier according to the present embodiment.

FIGS. 16 and 17 are views including the structure around the edge binder 25 described with reference to FIG. 3.

As described above, the liquid applier 31 is disposed in parallel with the crimper 32. The second liquid applier 612 is also disposed in parallel with the stapler 62. The liquid appliers disposed in parallel with the respective binders are movable in the width direction of the sheet P by the edge binder movement assembly 57 when the liquid application is performed on the sheet P for the binding process. In other words, the direction in which the binder and the liquid applier move relative to the sheet P in the liquid application process is the width direction of the sheet P. In other words, the direction of movement of the liquid applier disposed in parallel with the binder is a direction orthogonal to the conveyance direction of the sheet P. This direction is referred to as a reciprocating direction.

More specifically, as described above, the crimper 32 and the liquid applier 31 are attached to the base 48. The crimper 32 and the liquid applier 31 are movable in the main scanning direction along the guide shaft 49 by the edge binder movement motor 55 and a driving force transmission assembly 551 (including pulleys 551*a* and 551*b* and timing belt 551*c*) that transmits the driving force of the edge binder movement motor 55 to the base 48. The direction along the guide shaft 49 (main scanning direction) corresponds to the reciprocating direction according to the present embodiment.

The guide shaft 49 is disposed on a binding assembly base 116 by multiple guide shaft brackets 49*a*. The binding assembly base 116 is a member disposed so as to bridge between a main body front side plate 711 and a main body rear side plate 712 of the post-processing apparatus 3. The guide shaft 49 supports the liquid applier 31 and the crimper 32 to be movable in a reciprocating manner within a range in which the guide shaft 49 is fixed to the binding assembly base 116.

The liquid applier 31 includes the first liquid storage tank 44 for storing the liquid for the liquid application process. The first liquid storage tank 44 is disposed near the liquid application member 501. Further, for example, a liquid replenishment unit 90 is disposed on the main body front side plate 711. Opening the cover 71 of the post-processing apparatus 3 allows the user to be accessible to the second liquid storage tank 47 included in the liquid replenishment unit 90, so that the second liquid storage tank 47 can be detached from the liquid replenishment unit 90 for replenishing (supplying) liquid. After the liquid is replenished to the second liquid storage tank 47, the second liquid storage tank 47 is set to the second liquid storage tank fixer 61. By so doing, the second liquid storage tank 47 is filled with a certain amount of liquid in the second liquid storage tank fixer 61. The second liquid storage tank fixer 61 includes the second liquid amount detection sensor 52 (see FIG. 17) that detects the liquid level when the liquid is equal to or smaller than the set amount.

FIG. 17 is an enlarged diagram illustrating the configuration and operation of the edge binder 25 and the area around the edge binder 25, As illustrated in FIG. 17, the liquid replenishment unit 90 fixed to the main body front side plate 711 includes the liquid supply pump 46. The liquid supply pump 46 is fixed to the main body front side plate 711.

The liquid supply pump 46 is a tube-type constant-amount liquid feeding pump having a configuration in which, as a pump motor 461 rotates, a shoe 462 contacting a second silicon tube 452 as a part of the liquid supply passage 45 rotates. The position at which the shoe 462 compresses the second silicon tube 452 is sequentially moved, and thus the liquid stored in the second liquid storage tank fixer 61 feeds air or liquid flowing into the liquid supply passage 45 (the second silicon tube 452) in the rotational direction of the shoe 462.

Since the rotational amount of the shoe 462 and the amount of liquid to be fed are constant in the tube-type constant-amount liquid feeding pump, the tube-type constant-amount liquid feeding pump can feed the constant amount of liquid and no valve structure is needed. In the present embodiment, the liquid supply pump 46 employs a tube-type constant-amount liquid feeding pump. However, the configuration of a tube-type constant-amount liquid feeding pump is not limited to the above-described pump and any liquid feeding pump may be applied as long as liquid can be fed. For example, a propeller pump, a screw pump, or a peristaltic pump may be used.

A detailed description is given of the configuration of the liquid supply passage 45.

The liquid supply passage 45 includes a first silicon tube 451, an elastic tube 453, a second silicon tube 452, and two or more supply coupling portions 454, in other words, multiple supply coupling portions 454. The first silicon tube 451 serves as a cylindrical tube having a hollow cylindrical cross section. The elastic tube 453 serves as a hollow cylindrical cross section and as an extensible member including an elastic member. The second silicon tube 452 serves as a cylindrical tube having a hollow cylindrical cross section. The two or more (multiple) supply coupling portions 454 coupled the elastic tube 453, and the second silicon tube 452 to the liquid replenishment unit 90 or the liquid applier 31.

In the present embodiment, the liquid supply passage 45 is illustrated as a liquid supply passage including a tube and a joint to supply liquid from the second liquid storage tank 47 to the first liquid storage tank 44. However, the configuration of the liquid supply passage 45 is not limited to the above-described configuration, and any configuration may be applied to a liquid supply passage as long as the configuration can perform the function as a liquid supply passage. For example, as long as the liquid can be fed without leaking, the material and the connection method are not limited, and a connection method incorporated in each component may be used.

The second liquid storage tank fixer 61 and the second silicon tube 452 are coupled to each other by a first supply coupling portion 4541 so that the second silicon tube 452 passes through the liquid supply pump 46.

The elastic tube 453 is coupled, by the second supply coupling portion 4542, to the second silicon tube 452 that is coupled to the outlet portion of the liquid supply pump 46. The elastic tube 453 enters from the opening of the binding assembly base 116 to be disposed along the movement direction of the liquid applier 31.

The elastic tube 453 is coupled to the first silicon tube 451 by a third supply coupling portion 4543 and to the second silicon tube 452 by the second supply coupling portion 4542. The elastic tube 453 is disposed so as to be expandable and contractable in the reciprocating direction of the liquid applier 31 with an end of the elastic tube 453 being fixed to the third supply coupling portion 4543 and the second supply coupling portion 4542.

The first silicon tube 451 passes through the lower side of the moving portion 205 and is coupled to the first liquid storage tank 44 by a fourth supply coupling portion 4544 from the liquid applier 31 on the front side of the post-processing apparatus 3. The liquid can be fed to the first liquid storage tank 44 by feeding out the air or the liquid along the liquid supply passage from the second liquid storage tank 47 to the first liquid storage tank 44.

A description is given of a configuration of liquid application according to a second embodiment of the present disclosure.

A description is now given of an overall configuration of the configuration used for liquid application in the edge binder 25 and the staple binder 155 included in the post-processing apparatus 3 and the configuration of supplying liquid to the edge binder 25 and the staple binder 155.

Figure 18:
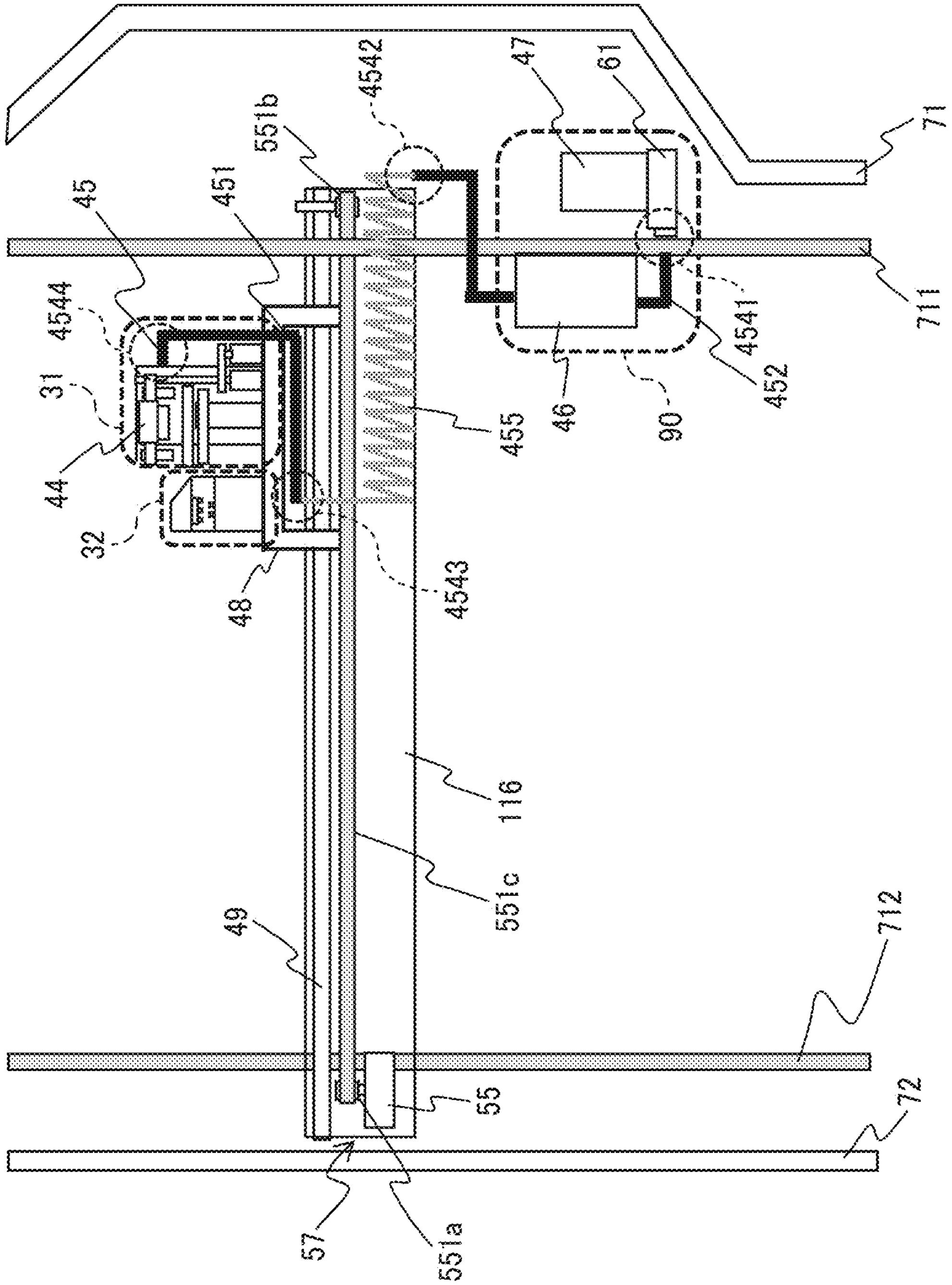
FIG. 18 is a diagram illustrating yet another operation performed by a liquid applier according to the present embodiment.

FIG. 18 is a diagram illustrating yet another operation performed by a liquid applier according to the present embodiment.

The configuration of the second embodiment illustrated in FIG. 18 is different an elastic liquid supply member from the configuration of the first embodiment described above. In other words, FIG. 18 illustrates the configuration of the second embodiment that employs a coil tube 455 including an elastic member wound in a spiral, as an extensible member, instead of the member in the portion where the elastic tube 453 is used in the first embodiment.

As described above, the liquid supply passage 45 includes a liquid supply passage that couples the first liquid storage tank 44 and the second liquid storage tank 47. In the present embodiment, the liquid supply passage 45 serving as a liquid supply passage includes the coil tube 455, the liquid supply pump 46, the first silicon tube 451 serving as a cylindrical tube having a hollow cylindrical cross section, and the second silicon tube 452 serving as a cylindrical tube having a hollow cylindrical cross section.

The first silicon tube 451 has one end that is coupled to the first liquid storage tank 44 by the fourth supply coupling portion 4544 and the other end that is coupled to the coil tube 455 by the third supply coupling portion 4543. The second silicon tube 452 has one end that is coupled to a coil tube 455 by a second supply coupling portion 4542 and the other end that is coupled to an outlet portion of the second liquid storage tank 47 by the first supply coupling portion 4541. The second silicon tube 452 includes the liquid supply pump 46.

As the liquid supply pump 46 is driven, the liquid stored in the second liquid storage tank 47 is supplied (replenished) to the coil tube 455 via the second silicon tube 452. The liquid fed to the coil tube 455 runs in the coil tube 455. Then, the liquid further runs in the first silicon tube 451 to be fed to the first liquid storage tank 44. When the crimper 32 and the liquid applier 31 reciprocate along the guide shaft 49, the spring-shape portion of the coil tube 455 extends or contracts, so that the liquid supply passage 45 can be followed in the reciprocating movement.

A description is given below of the liquid supplying configuration including the coil tube 455, with reference to FIG. 19.

Figure 19:
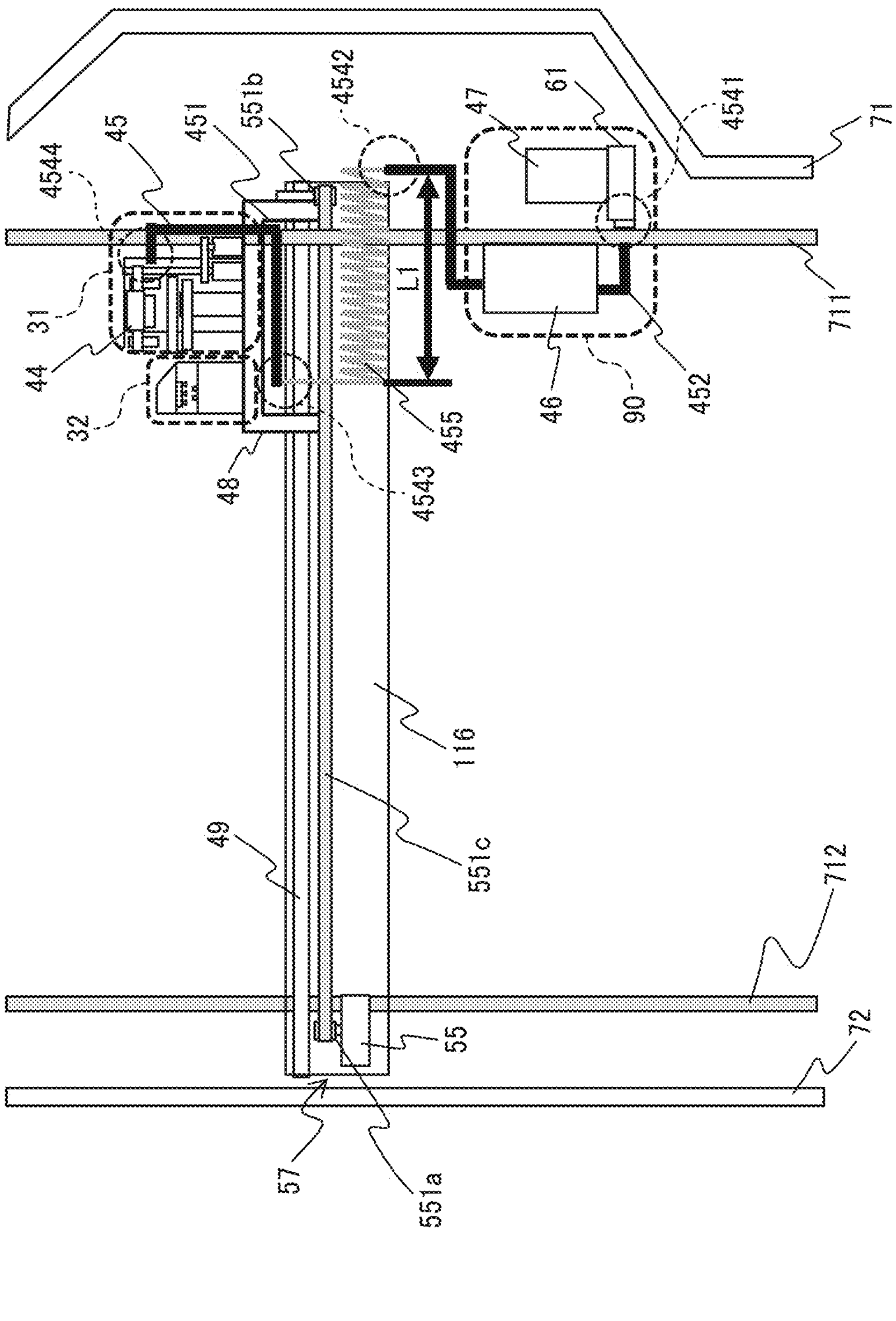
FIG. 19 is a diagram illustrating yet another operation performed by a liquid applier according to the present embodiment.

FIG. 19 is a diagram illustrating the liquid supplying configuration in a case where the crimper 32 and the liquid applier 31 are moved to the nearest side to the post-processing apparatus 3.

The "case where the crimper 32 and the liquid applier 31 are moved to the nearest side to the post-processing apparatus 3" is a case where, for example, the liquid applier 31 is moved to one end of the movement limit in a depth direction of the post-processing apparatus 3, in other words, a case where the liquid applier 31 is moved to the most contactable position to the cover 71 of the post-processing apparatus 3.

In this case, the movement of the liquid applier 31 moves the first silicon tube 451 coupled to the liquid applier 31 by the fourth supply coupling portion 4544 and the coil tube 455 coupled to the first silicon tube 451 by the third supply coupling portion 4543 in the same direction as the direction of movement of the liquid applier 31 to follow the liquid applier 31. As a result, as illustrated in FIG. 19, the coil tube 455 disposed along the guide shaft 49 is contracted in the axial direction of the guide shaft 49.

The entire length of the coil tube 455 in this contracted state is referred to as a "first coil length L1".

In the present embodiment, the range of movement of the liquid applier 31 is limited so that the first coil length L1 is longer than the natural length of the coil tube 455 (the length of the coil tube 455 when the coil tube 455 is not contracted or expanded). By this limitation, even when the liquid applier 31 moves in the width direction, the liquid supply passage 45 serving as a liquid supply passage including the coil tube 455 can be prevented from bending, and can be prevented from blocking the supply of liquid.

In the liquid supply passage including the coil tube 455 or in the state where the post-processing apparatus 3 is not used, it is desirable that the standby position of the liquid applier 31 illustrated in FIG. 16 is located at the position of the liquid applier 31. In other words, when the liquid application process is not executed, the position of the liquid applier 31 is closer to the liquid replenishment unit 90 (the cover 71 of the post-processing apparatus 3) than the intermediate position in the depth direction of the post-processing apparatus 3 in the direction of the guide shaft 49. As described above, by causing the liquid applier 31 to stand by a specified position in a case where the liquid applier 31 does not move, the external force applied to the coil tube 455 can be reduced.

A description is given below of the liquid supplying configuration including the coil tube 455, with reference to FIG. 20.

Figure 20:
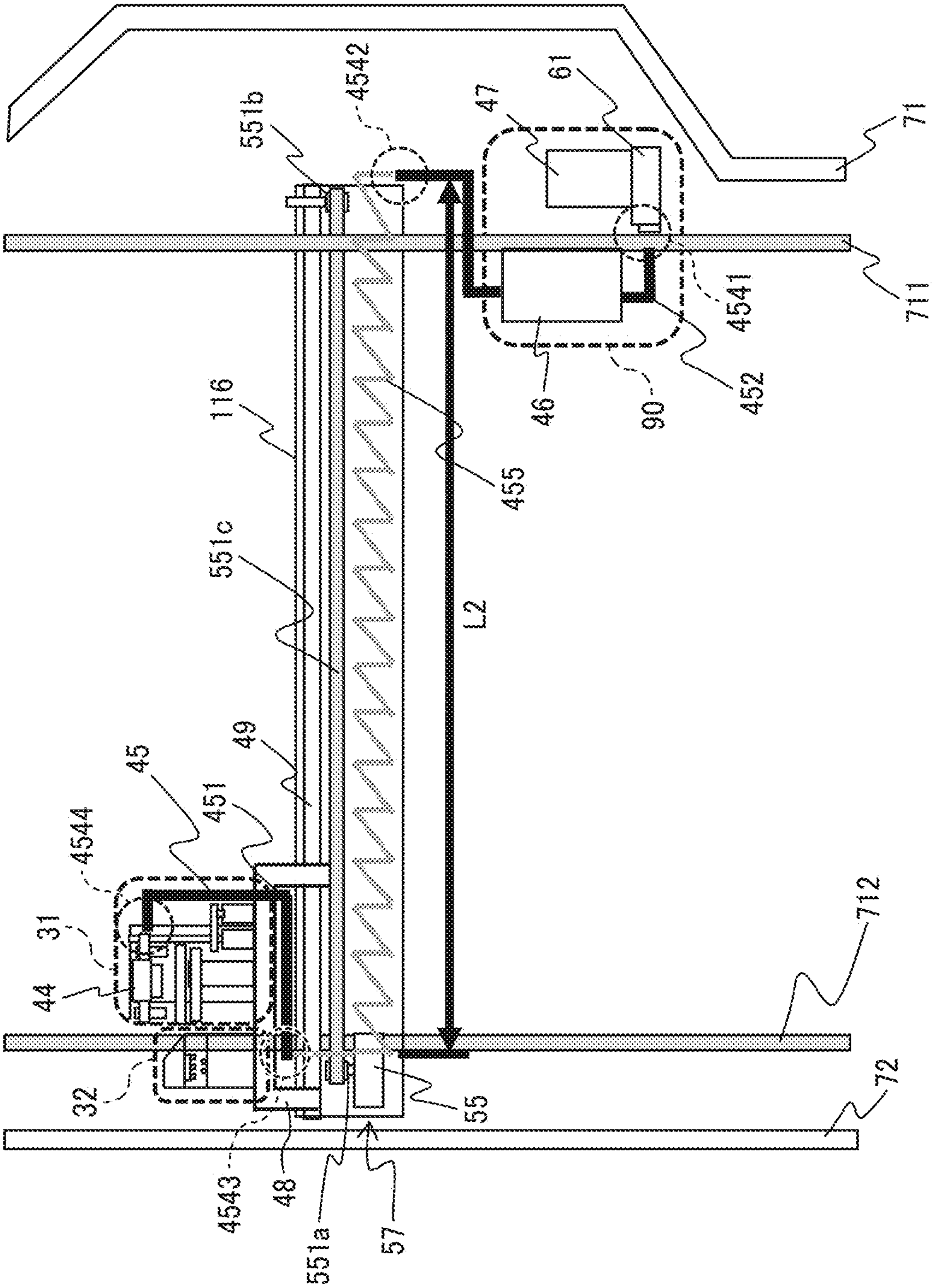
FIG. 20 is a diagram illustrating yet another operation performed by a liquid applier according to the present embodiment.

FIG. 20 is a diagram illustrating the liquid supplying configuration in a case where the crimper 32 and the liquid applier 31 are moved to the farthest side of the post-processing apparatus 3.

The "case where the crimper 32 and the liquid applier 31 are moved to the farthest side to the post-processing apparatus 3" is a case where, for example, the liquid applier 31 is moved to the other end of the movement limit in the depth direction of the post-processing apparatus 3, in other words, a case where the liquid applier 31 is moved to the most contactable position to the main body side plate 72 of the post-processing apparatus 3.

In this case, the movement of the liquid applier 31 moves the first silicon tube 451 coupled to the liquid applier 31 by the fourth supply coupling portion 4544 and the coil tube 455 coupled to the first silicon tube 451 by the third supply coupling portion 4543 in the same direction as the direction of movement of the liquid applier 31 to follow the liquid applier 31. As a result, as illustrated in FIG. 20, the coil tube 455 disposed along the guide shaft 49 is extended in the axial direction of the guide shaft 49. The entire length of the coil tube 455 in this contracted state is referred to as a "second coil length L2".

In the present embodiment, the range of movement of the liquid applier 31 is limited so that the second coil length L2 is two times or more the first coil length L1 (the natural length of the coil tube 455) and the coil tube 455 is not plastically deformed. In other words, the range in which the length of the coil tube 455 changes in accordance with the movement of the liquid applier 31 is set to fall between the first coil length L1 that is longer than the natural length of the coil tube 455 and the second coil length L2 that is two times or more the first coil length L1.

Further, the liquid supply passage can be shortened by minimizing the number of turns of the coil tube 455 with the condition of the second coil length L2 (two times or more the first coil length L1) being satisfied. By so doing, the time for supplying liquid can be shortened and the amount of liquid to be replenished can be reduced.

A description is given of a configuration of liquid supply according to a third embodiment of the present disclosure.

A description is now given of an overall configuration of the configuration used for liquid application in the edge binder 25 and the staple binder 155 included in the post-processing apparatus 3 and the configuration of supplying liquid to the edge binder 25 and the staple binder 155, according to the third embodiment.

Figure 21:
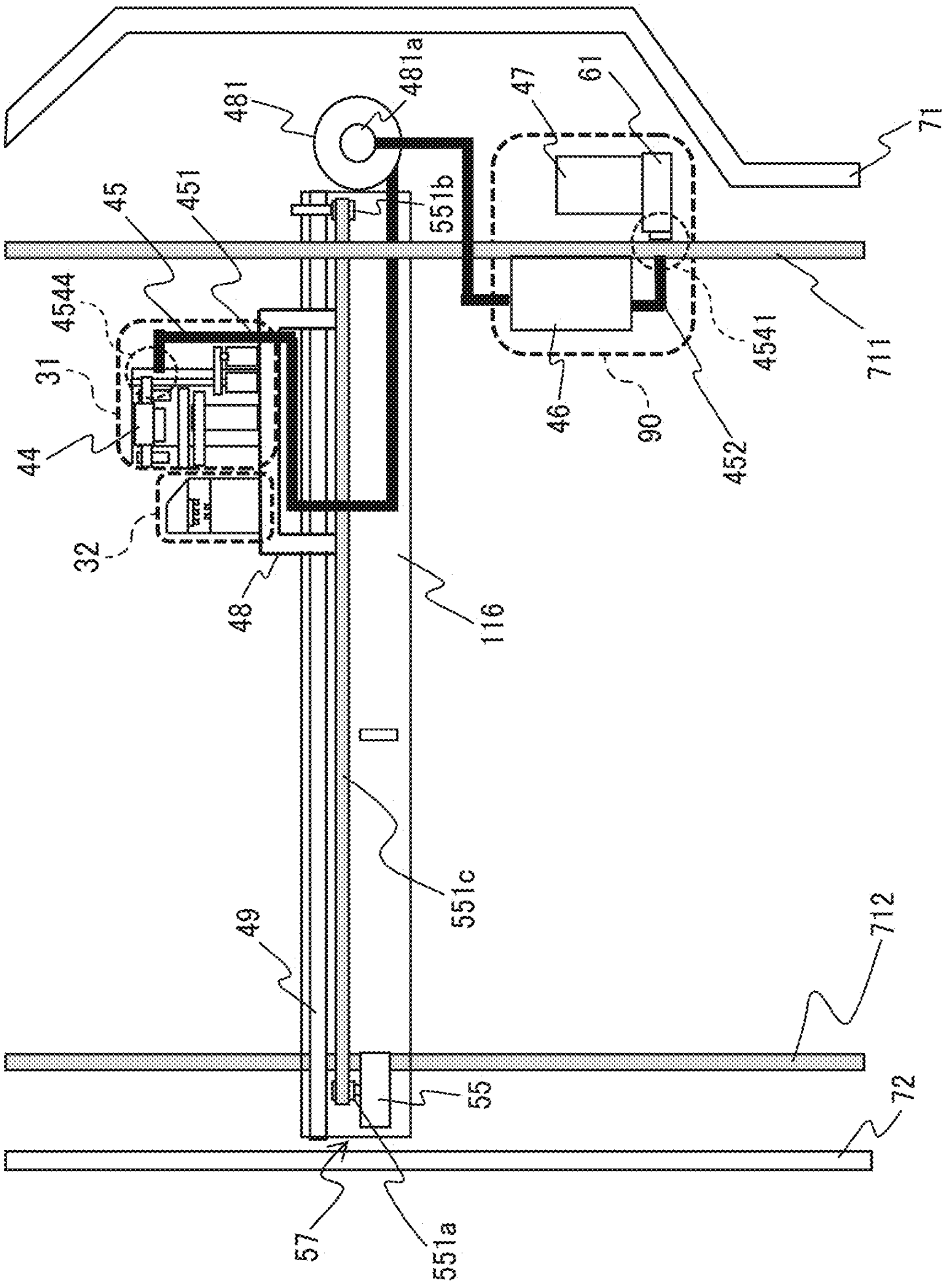
FIG. 21 is a diagram illustrating yet another operation performed by a liquid applier according to the present embodiment.

FIG. 21 is a diagram illustrating the post-processing apparatus 3 according to the third embodiment of the present disclosure, which is different in an elastic liquid supply member from the first embodiment and the second embodiment described above.

As illustrated in FIG. 21, the post-processing apparatus 3 according to the third embodiment includes an elastic liquid supply member different from the post-processing apparatuses according to the first embodiment and the second embodiment. In other words, in the post-processing apparatus 3 according to the present embodiment, a winder 481 including a reel structure that winds and holds the tube member is used in the portion of the liquid supply passage 45 where the elastic tube 453 is used in the first embodiment and the portion of the liquid supply passage 45 where the coil tube 455 is used in the second embodiment.

As described above, the liquid supply passage 45 corresponds to a liquid supply passage that couples the first liquid storage tank 44 and the second liquid storage tank 47 to each other for supplying liquid. The liquid supply passage 45 serving as a liquid supply passage according to the present embodiment includes a combination of the first silicon tube 451 having a hollow cylindrical cross section, the winder 481, the second silicon tube 452 having a hollow cylindrical cross section, and the liquid supply pump 46.

In the liquid supply passage 45 according to the present embodiment, the first silicon tube 451 has one end that is coupled to the first liquid storage tank 44 by the fourth supply coupling portion 4544 and the other end that is coupled to the winder 481. The second silicon tube 452 included in the liquid supply passage 45 has one end that is coupled to the rotary joint 481*a* of the winder 481 and the other end that is coupled to the first supply coupling portion 4541 serving as an outlet portion of the second liquid storage tank 47.

As illustrated in FIG. 21, the second silicon tube 452 includes the liquid supply pump 46.

The detailed configuration of the winder 481 is described below.

Referring now to FIGS. 22 to 25, a description is given of the detailed configuration of the winder 481.

Figure 22:
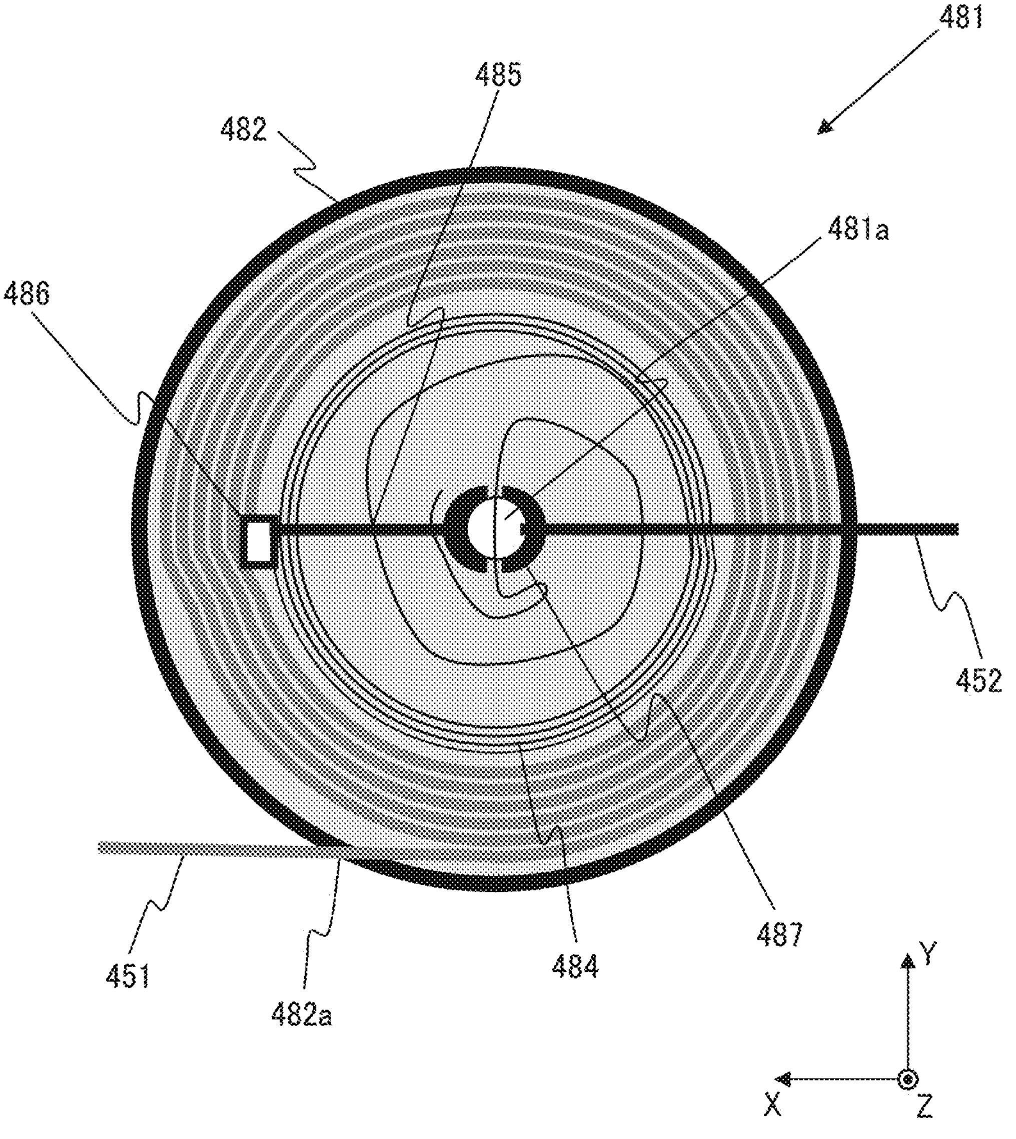
FIG. 22 is a diagram illustrating a winder included in a liquid applier according to the present embodiment.

FIG. 22 is a plan view of the winder 481, and illustrates a structure in which the first silicon tube 451 and the second silicon tube 452 are coupled to each other by the rotary joint 481*a*.

Figure 23:
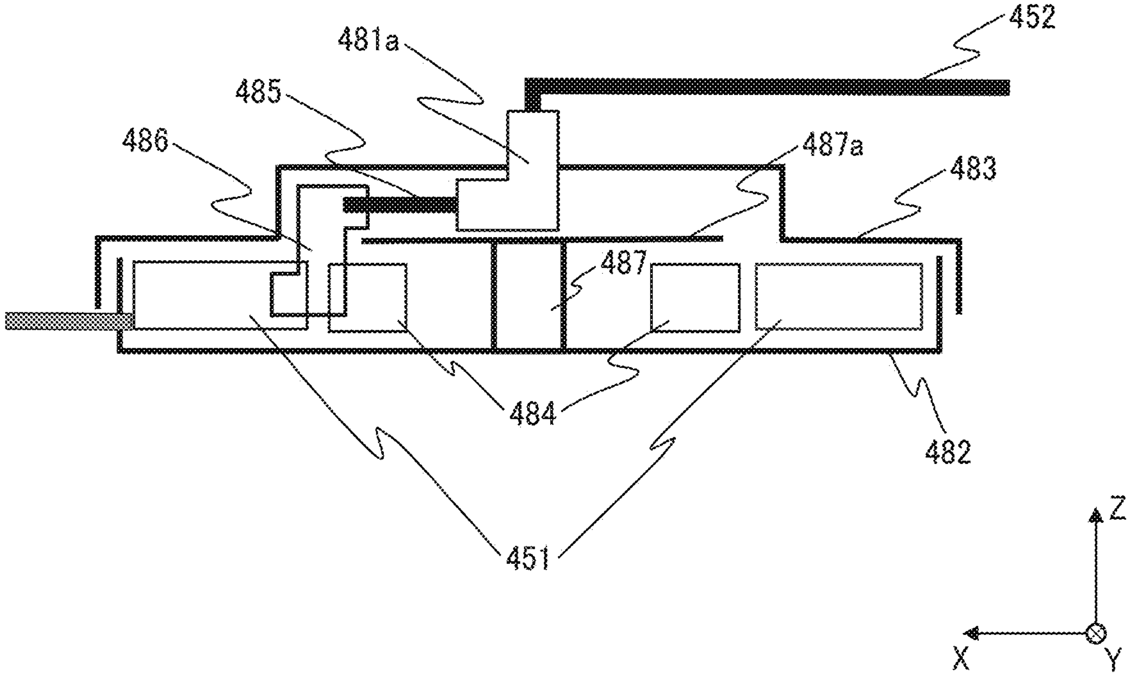
FIG. 23 is a diagram illustrating a winder included in a liquid applier according to the present embodiment.

FIG. 23 is a vertical cross-sectional view of the winder 481.

Figure 24:
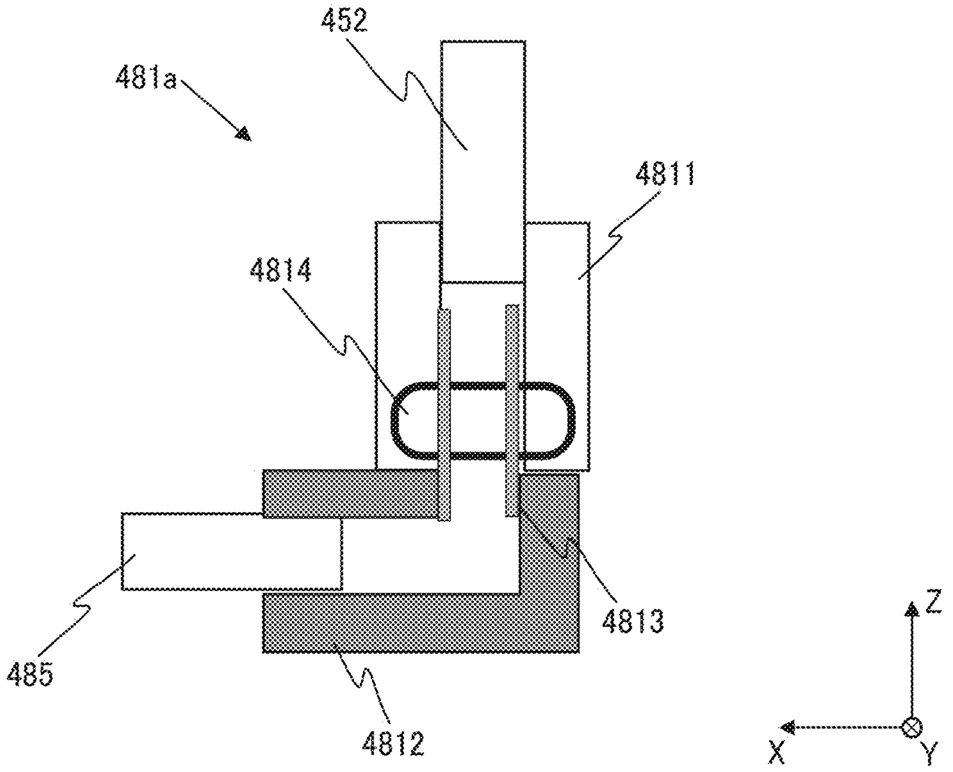
FIG. 24 is a diagram illustrating a winder included in a liquid applier according to the present embodiment.

FIG. 24 is a vertical cross-sectional view of the rotary joint 481*a* included in the winder 481.

Figure 25A:
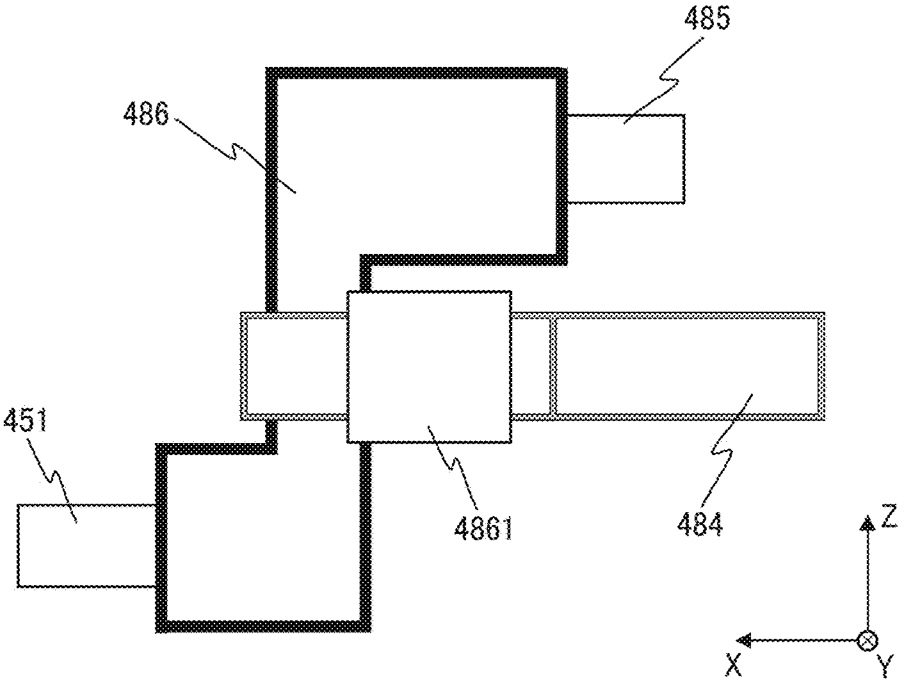
FIGS. 25A and 25B are diagrams each illustrating a winder included in a liquid applier according to the present embodiment.

FIG. 25A is a vertical cross-sectional view of a connector 486 included in the winder 481.

Figure 25B:
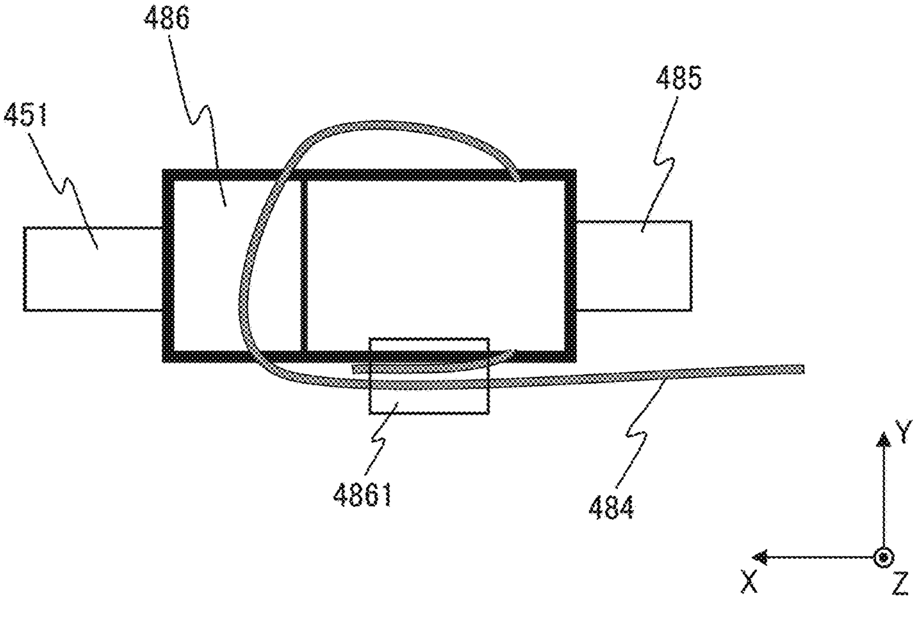

FIG. 25B is a plan view of the connector 486 included in the winder 481.

As illustrated in FIGS. 22 and 23, the winder 481 stores a flat spiral spring 484, a part of the first silicon tube 451, the rotary joint 481*a*, a relay silicon tube 485, a connector 486, and a flat spiral spring holder 487 in a space defined by a tube holder 482 and a winder lid 483.

As illustrated in FIG. 24, the rotary joint 481*a* includes a fixing portion 4811 and a rotary portion 4812 included in a tubular part so that liquid can flow through the rotary joint 481*a*. The rotary portion 4812 and the fixing portion 4811 are assembled by a slide bearing 4813 and a ball bearing 4814.

The end of the rotary joint 481*a* close to the fixing portion 4811 is coupled to the second silicon tube 452. The end of the rotary joint 481*a* close to the rotary portion 4812 is coupled to the relay silicon tube 485. The rotary portion 4812 and the relay silicon tube 485 are rotatable by 360 degrees in the circumferential direction of the tube holder 482.

As illustrated in FIG. 25, the connector 486 coupled to the other end of the relay silicon tube 485 has a channel through which the liquid fed from the second silicon tube 452 flows to the first silicon tube 451. Due to such a configuration, the connector 486 is coupled to the other end of the relay silicon tube 485 via the rotary joint 481*a* and the relay silicon tube 485. If the rotary joint 481*a* and the connector 486 are directly coupled to each other in the coupling, the relay silicon tube 485 is omitted.

As illustrated in FIGS. 21 and 22, the first silicon tube 451 is disposed concentrically from the center toward the outside (toward the circumference) in the cylindrical space of the tube holder 482 that includes the outer wall of the winder 481. The outermost portion of the first silicon tube 451 is disposed in a direction along the guide shaft 49 from an opening 482*a* in the tube holder 482. The first silicon tube 451 extending from the winder 481 passes through the space below the moving portion 205 to be coupled to the first liquid storage tank 44 from the side of the liquid applier 31 facing the front side of the post-processing apparatus 3.

A flat spiral spring 484 having a highly elastic material is concentrically wound up for three rounds other than both ends of the flat spiral spring 484 and is disposed inside the first silicon tube 451 that is wound up. The tip portion at the center of the wound-up flat spiral spring 484 is inserted into a flat spiral spring holder 487 disposed at the center of the tube holder 482 to form a curved portion for preventing the tip portion comes off.

As illustrated in FIG. 25B, the other end of the flat spiral spring 484 is assembled by being wound around the connector 486 for at least one round and being fixed by welding or screwing at a flat spiral spring coupling portion 4861.

As illustrated in FIG. 23, the flat spiral spring holder 487 fixes the end of the flat spiral spring 484 to the rotary joint 481*a* and includes a partition plate 487*a*, which has a disk shape, on the top face. The partition plate 487*a* separates the space inside and between the tube holder 482 and the winder lid 483 vertically. This configuration can prevent interference from the flat spiral spring 484 and the relay silicon tube 485.

FIG. 22 illustrates the winder 481 in the state where the restoring force applied to the first silicon tube 451, by which the flat spiral spring 484 returns to the original shape, and the reaction force for coupling the liquid applier 31 are balanced.

The connector 486 is coupled to the other end of the flat spiral spring 484 via the flat spiral spring coupling portion 4861. The first silicon tube 451, the second silicon tube 452, or both pull from the winder 481, the connector 486 moves in the circumferential direction of the tube holder 482 along with the movement of the first silicon tube 451. At this time, the flat spiral spring is elastically deformed.

Figure 26A:
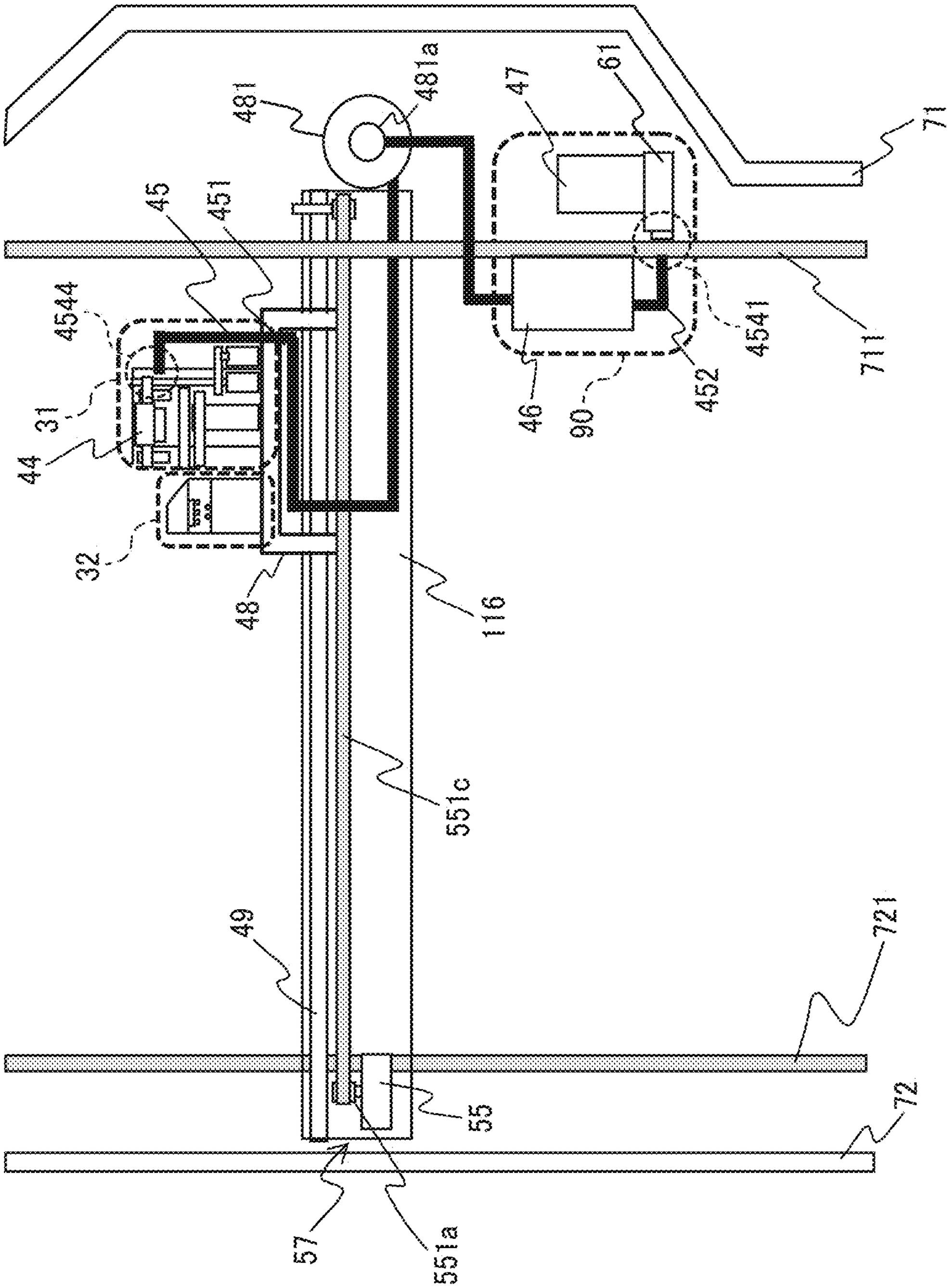
FIGS. 26A and 26B are diagrams each illustrating another operation performed by a liquid applier according to the present embodiment.

FIG. 26 illustrates the layout in the case where the liquid applier 31 is moved, using the winder 481, to one end of the movement limit in the depth direction of the post-processing apparatus 3, in other words, the case where the liquid applier 31 is moved to the most contactable position to the cover 71 of the post-processing apparatus 3.

Since the restoring force by which the flat spiral spring 484 returns to the original shape is applied to the flat spiral spring 484 inside the winder 481, the flat spiral spring 484 rotates in the counterclockwise direction with the connector 486 along with the movement of the liquid applier 31.

Figure 26B:
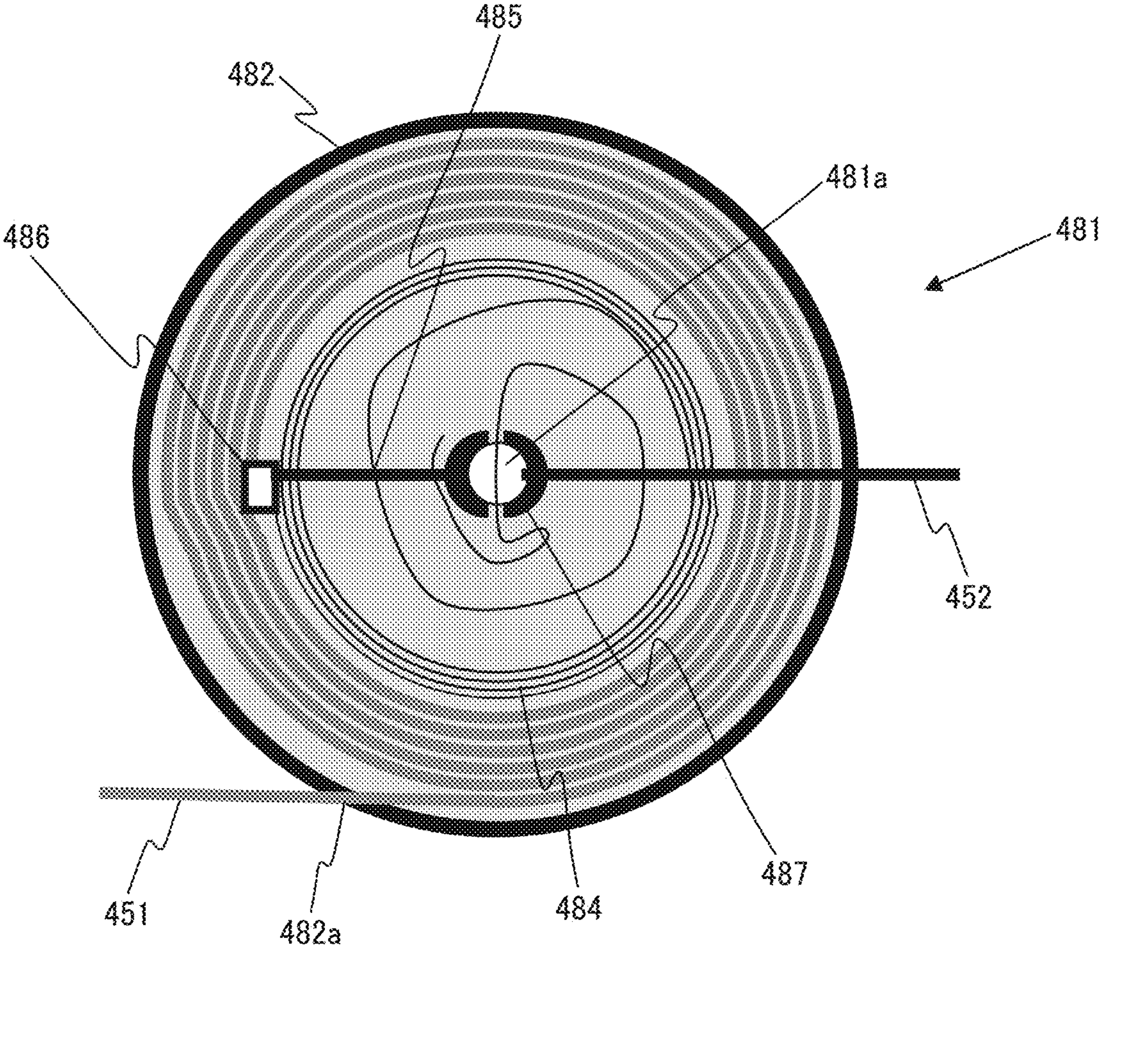

The first silicon tube 451 coupled to the connector 486 also rotates in the counterclockwise direction, so that the portion of the first silicon tube 451 linearly disposed along the guide shaft 49 is concentrically wound to be the state illustrated in FIG. 26B. This configuration can prevent the first silicon tube 451 serving as a liquid supply passage from being folded in a zigzag shape or bent, due to the movement of the liquid applier 31. In other words, this configuration can avoid the situation to cause any problem in liquid supply.

The rotary portion 4812 coupled to the connector 486 can rotate by 360 degrees about the second silicon tube 452 coupled to the fixing portion 4811 of the rotary joint 481*a* by the ball bearing 4814 and the slide bearing 4813. This configuration can prevent twist of the second silicon tube 452, and can avoid the situation to cause any problem in liquid supply.

Figure 27A:
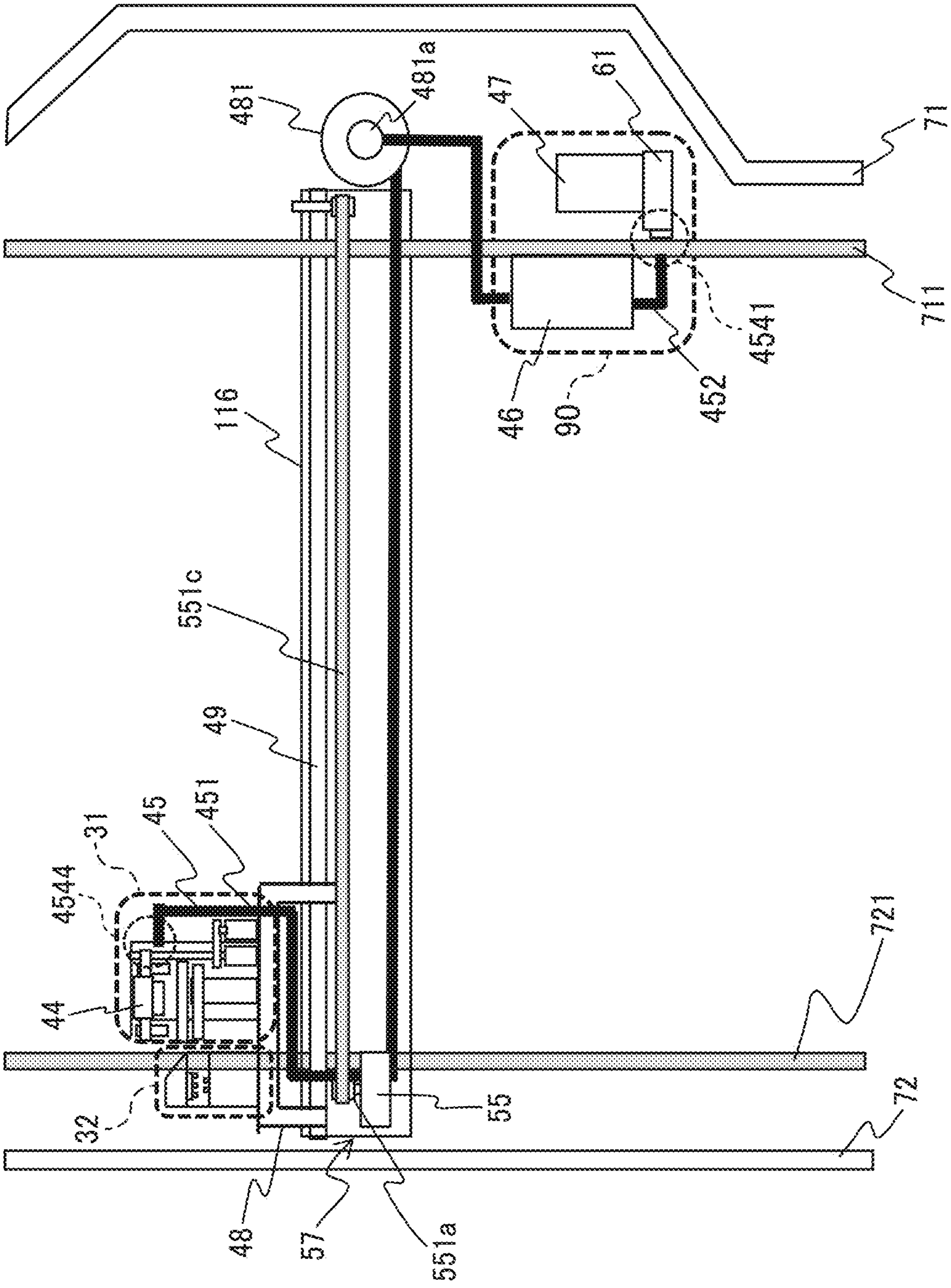
FIGS. 27A and 27B are diagrams each illustrating yet another operation performed by a liquid applier according to the present embodiment.

FIG. 27 illustrates the layout in the case where the liquid applier 31 is moved, using the winder 481, to the other end of the movement limit in the depth direction of the post-processing apparatus 3, in other words, the case where the liquid applier 31 is moved to the most contactable position to the main body side plate 72 of the post-processing apparatus 3.

Figure 27B:
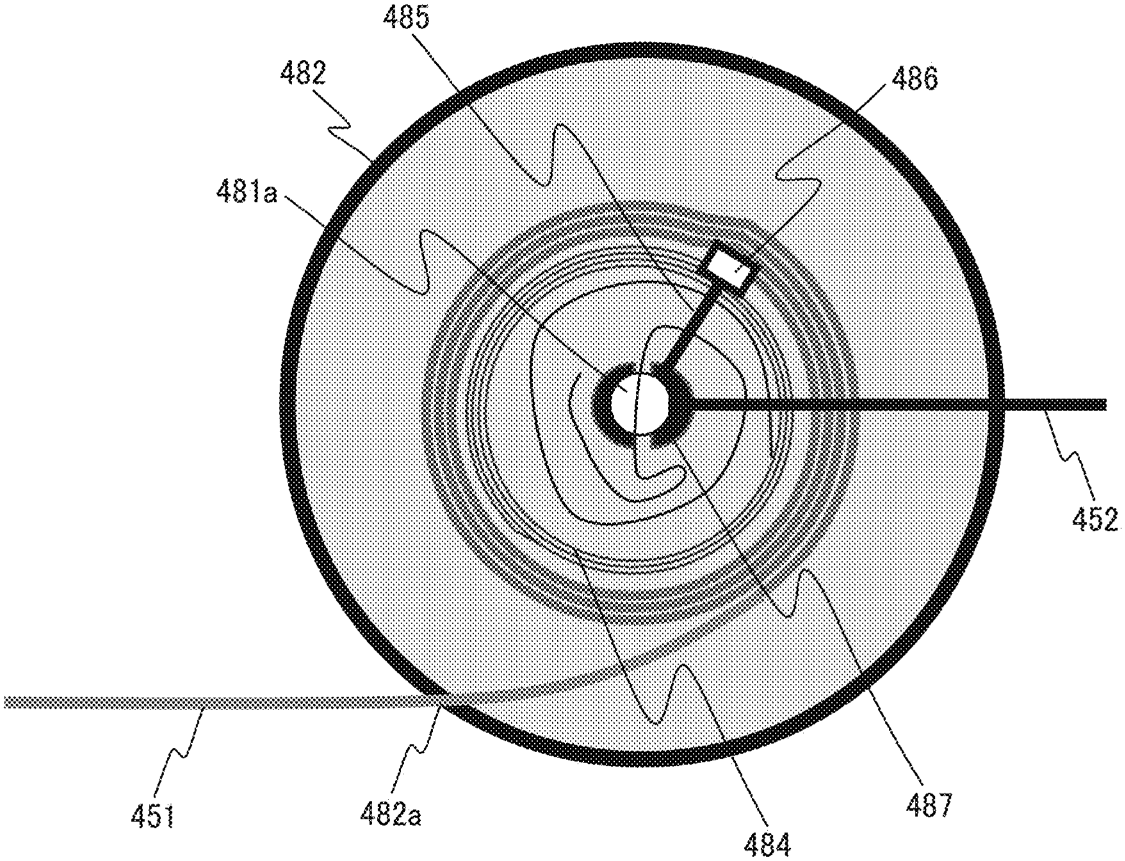

When the liquid applier 31 is moved to the furthermost side of the post-processing apparatus 3, the first silicon tube 451 moves following the liquid applier 31 to be drawn out from the winder 481 along the guide shaft 49. As illustrated in FIG. 27B, as the first silicon tube 451 is drawn out inside the winder 481, the connector 486 and the portion where the first silicon tube 451 is concentrically wound rotate in the clockwise direction.

As the flat spiral spring 484 coupled to the connector 486 is also wound in the clockwise direction, the elastic energy is stored. The rotary portion 4812 coupled to the connector 486 can rotate about the second silicon tube 452 coupled to the fixing portion 4811 of the rotary joint 481*a* by the ball bearing 4814 and the slide bearing 4813. This configuration can prevent twist of the second silicon tube 452, and can avoid the situation to cause any problem in liquid supply.

In the condition where the liquid applier 31 is moved to the furthermost side of the post-processing apparatus 3, the length of the first silicon tube 451 may be set such that the portion of the first silicon tube 451 is concentrically wound for more than one round.

According to the embodiments described above, when moving in the width direction of a sheet P for the liquid application process in a case where the post-processing apparatus 3 has a configuration to perform the liquid application process in cooperation with the binding process that can be performed in the post-processing apparatus 3, an excess physical pressure is applied to the liquid supply configuration to prevent the situation to cause any problem in the operation. To be more specific, by employing the configuration that can prevent an excessive deformation in the liquid supply passage that follows the reciprocating movement of the binding process unit, the configuration does not hinder the liquid supply process and does not obstruct to the movement of the unit.

According to the embodiments described above, by disposing a liquid supply passage portion that connects a liquid application unit reciprocating with the fixed liquid supply portion along the axial direction of the reciprocating movement of the liquid application unit, the liquid supply passage portion can follow the movement of the liquid application unit without hindering the flow of the liquid in the liquid supply passage portion. In other words, the liquid supply passage portion can follow the reciprocating movement of the liquid application unit by using a member having an elasticity (an elastic member or a spiral member) or a member that extends the liquid supply passage length in the reciprocating direction by being pulled out when the forces of compression and tension are applied to a concentrically wound member.

Figure 37A:
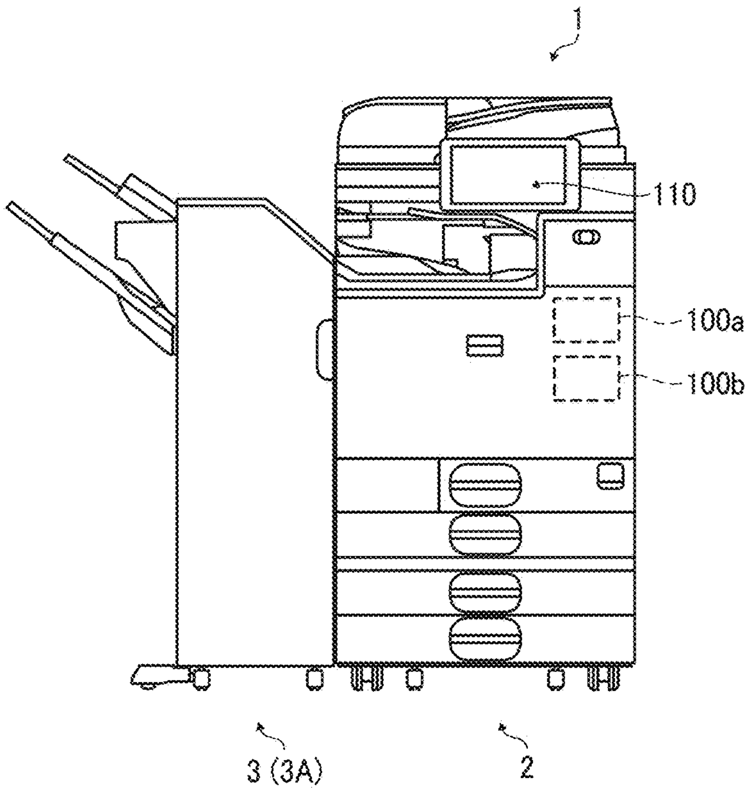
FIGS. 37A and 37B are diagrams each illustrating a post-processing apparatus including controllers as a first modification of the present embodiment.
Figure 37B:
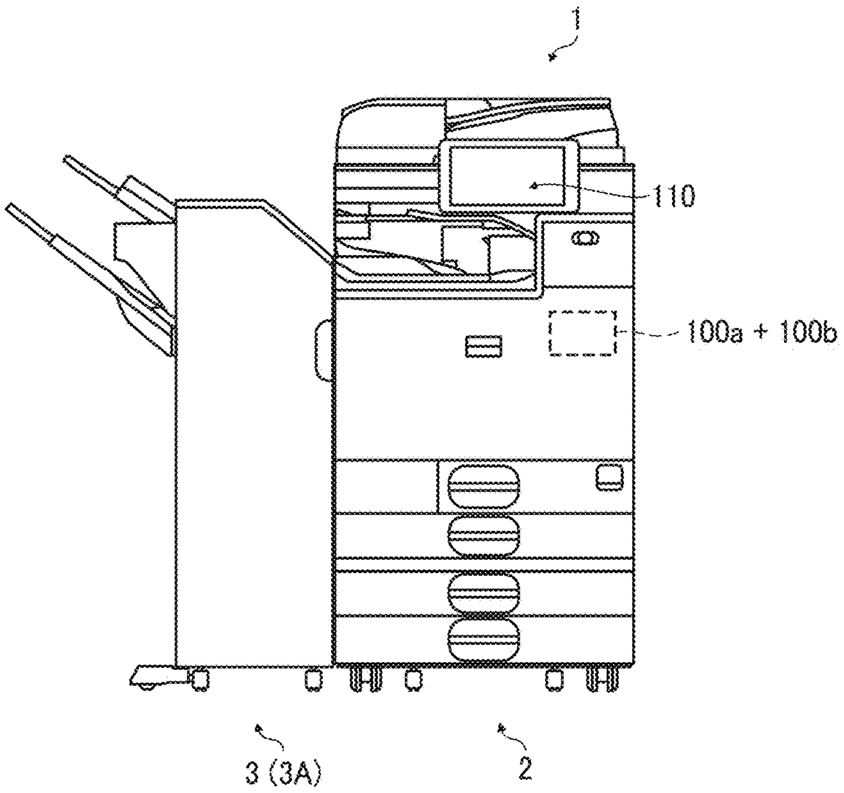

In the above description, the controller 100*b* of the post-processing apparatus 3 is provided separately from the controller 100*a* of the image forming apparatus 2 as illustrated in FIG. 1. However, embodiments of the present disclosure are not limited to the above-described configuration. For example, as illustrated in FIG. 37A, the controller 100*b* of the post-processing apparatus 3 may be disposed in the image forming apparatus 2. Further, as illustrated in FIG. 37B, the controller 100*b* of the post-processing apparatus 3 may be integrated with the controller 100*a* of the image forming apparatus 2.

Figure 38A:
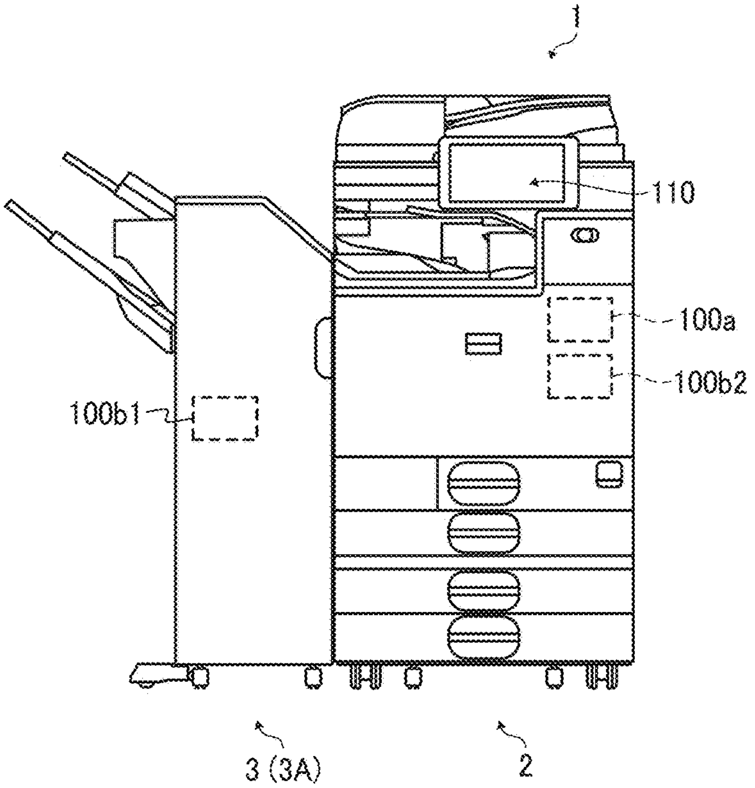
FIGS. 38A and 38B are diagrams each illustrating a post-processing apparatus including controllers as a second modification of the present embodiment.

As illustrated in FIG. 38A, the controller 100*b* of the post-processing apparatus 3 may be divided into a controller

Figure 38B:
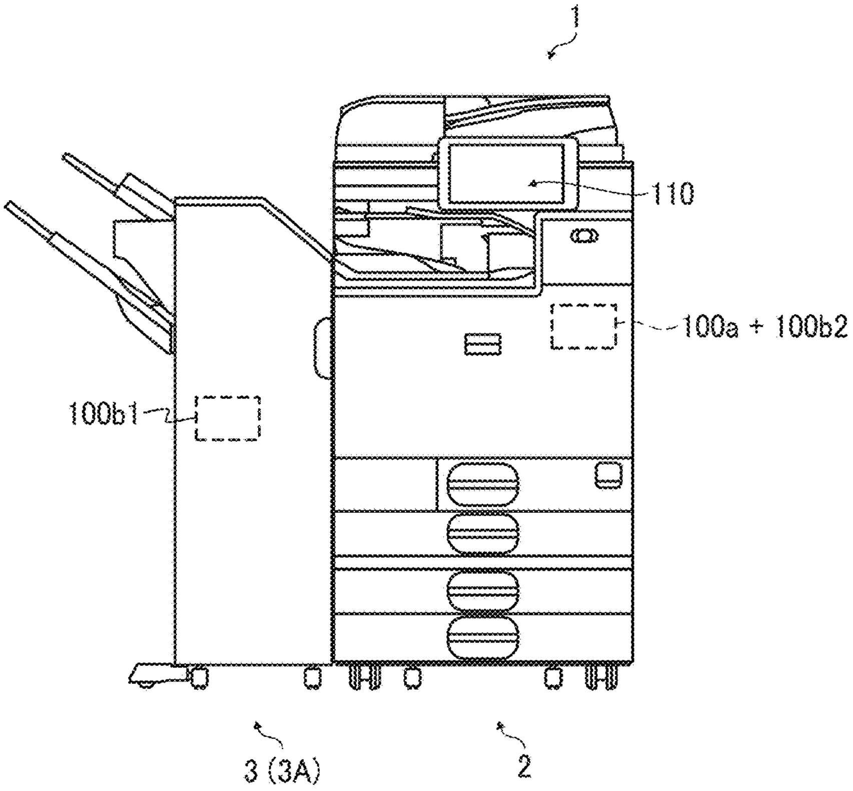

100_b_1 (e.g., a drive unit such as a motor) and a controller 100_b_2 (a detector such as a sensor) according to the function, and the controller 100_b_2 of the post-processing apparatus 3 may be disposed in the image forming apparatus 2. Further, as illustrated in FIG. 38B, the controller 100_b_2 of the post-processing apparatus 3 disposed in the image forming apparatus 2 may be integrated with the controller 100_a_ of the image forming apparatus 2.

A description is given below of a post-processing apparatus 3 according to a second embodiment of the present disclosure.

Referring now to FIGS. 28 to 36, a description is given of a post-processing apparatus 3A according to a second embodiment of the present disclosure. In the following description, components like those of the post-processing apparatus 3 according to the first embodiment are denoted by like reference numerals, and redundant descriptions thereof may be omitted unless otherwise required.

The post-processing apparatus 3A according to the second embodiment includes an edge binder 251. The edge binder 251 is different from the edge binder 25 of the post-processing apparatus 3 according to the first embodiment in which the liquid applier 31 and the crimper 32 are arranged side by side. The edge binder 251 includes a crimper 32' and a liquid applier 131 is disposed at an upstream position in a direction in which the sheet P is conveyed. Such a configuration allows a given number of sheets P to be stacked in advance after the liquid application process and conveyed to the crimper 32' of the edge binder 251 disposed at a downstream position in the direction in which the sheet P is conveyed. Accordingly, the productivity of the binding process performed by the crimper 32' is enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to both the opposite conveyance direction and the thickness direction of the sheet P is defined as the "main scanning direction" or the "width direction of the sheet P."

The liquid application position to which the liquid is applied on the sheet P or the sheet bundle Pb by the liquid applier 131 corresponds to the binding position on the sheet bundle Pb to be crimped and bound by the crimper 32'. For this reason, in the following description, the liquid application position and the binding position are denoted by the same reference sign (B1).

Figure 28:
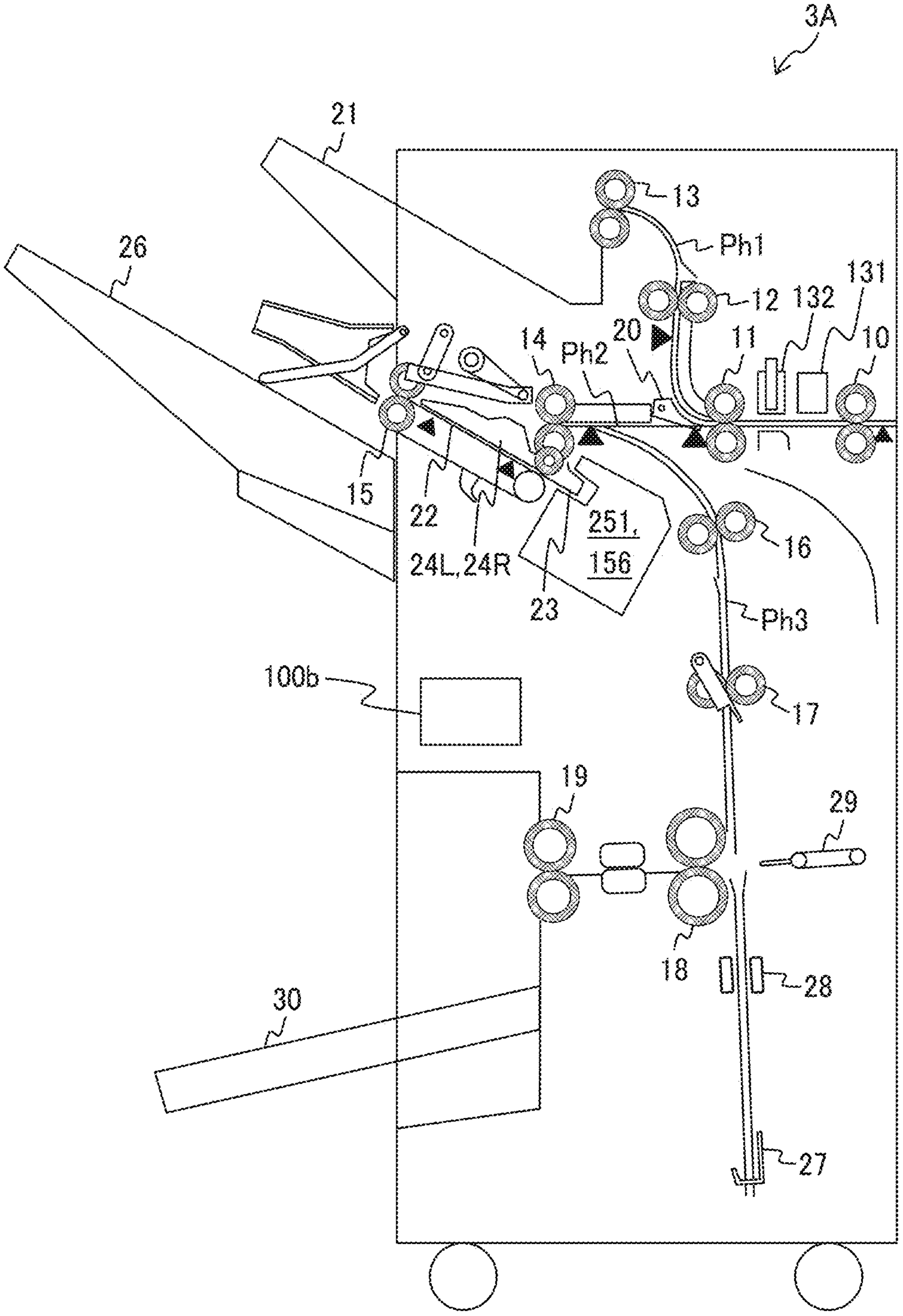
FIG. 28 is a diagram illustrating an internal configuration of a post-processing apparatus according to a second embodiment of the present disclosure.

FIG. 28 is a diagram illustrating an internal configuration of the post-processing apparatus 3A according to the second embodiment of the present disclosure.

Figure 29A:
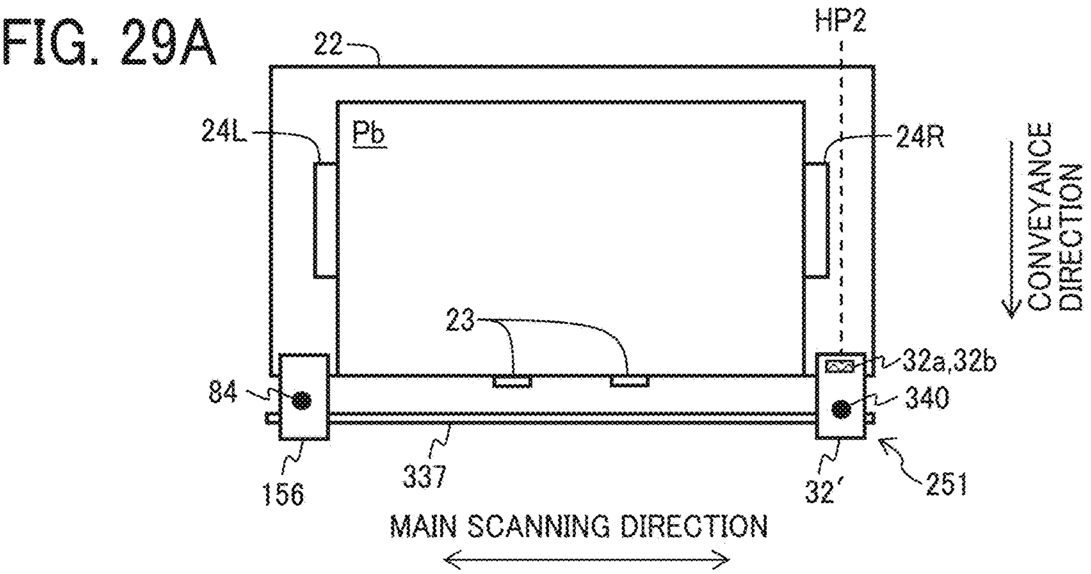
FIGS. 29A, 29B, and 29C are views of an internal tray of the post-processing apparatus according to the second embodiment, in a thickness direction of a sheet.
Figure 29B:
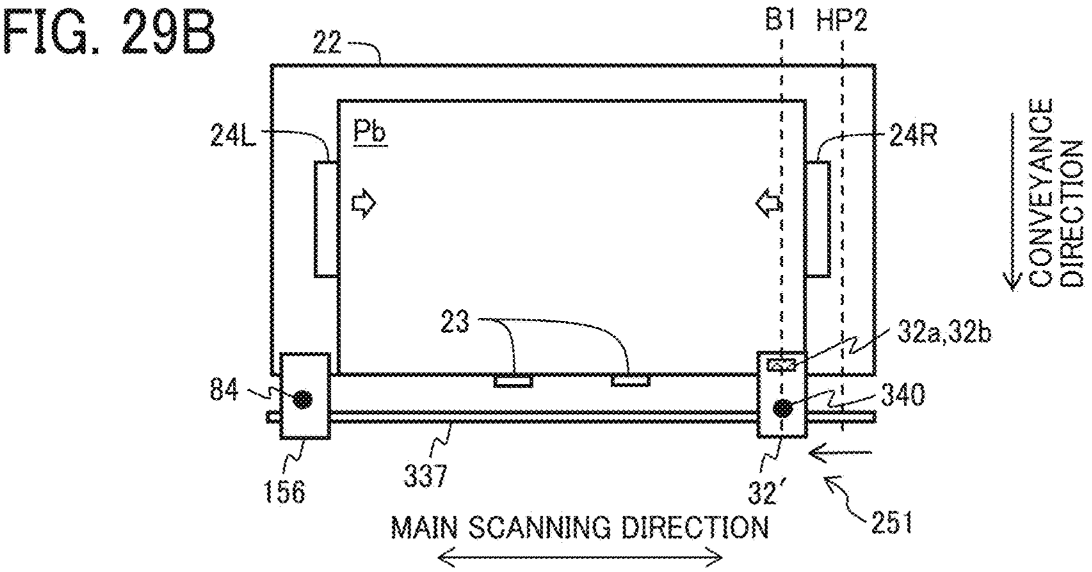
Figure 29C:
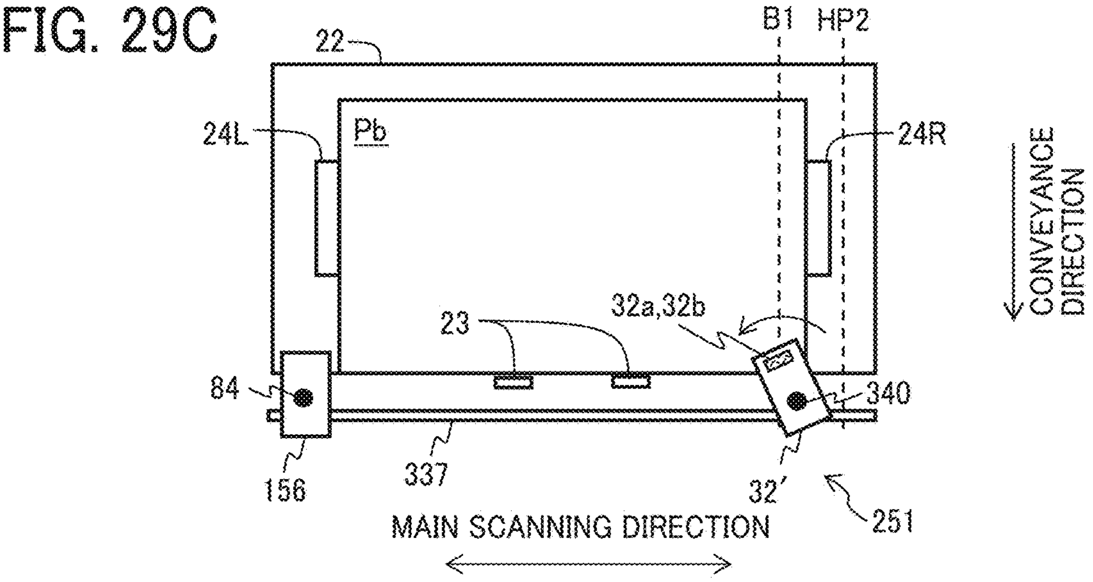

As illustrated in FIGS. 29A to 29C, the edge binder 251 includes the crimper 32'. As illustrated in FIG. 29, the crimper 32' and the staple binder 156 are disposed downstream from the internal tray 22 in the conveyance direction. In addition, the crimper 32' and the staple binder 156 are located to face a downstream end, in the conveyance direction, of the sheet bundle Pb placed on the internal tray 22 and is movable in the main scanning direction.

Further, the crimper 32' and the staple binder 156 are respectively rotatable in the forward and reverse directions about a crimper shaft 340 and a stapler shaft 84 both extending in the thickness direction of the sheet bundle Pb placed on the internal tray 22. In other words, the crimper 32' and the staple binder 156 bind, at a desired angle, a desired position in the main scanning direction on the sheet bundle Pb placed on the internal tray 22 in, for example, corner oblique binding, parallel one-point binding, or parallel two-point binding.

The crimper 32' presses and deforms the sheet bundle Pb with the serrate upper crimping teeth 32_a_ and the serrate lower crimping teeth 32_b_ to bind the sheet bundle Pb. In the following description, such a binding way may be referred to as "crimp binding." In other words, the crimper 32' crimps and binds the sheet bundle Pb or performs the crimp binding on the sheet bundle Pb.

On the other hand, the staple binder 156 passes the staple through a binding position on the sheet bundle Pb placed on the internal tray 22 to staple the sheet bundle Pb.

Each of FIGS. 29A to 29C is a view of the internal tray 22 in the thickness direction of the sheet bundle Pb.

Figure 30:
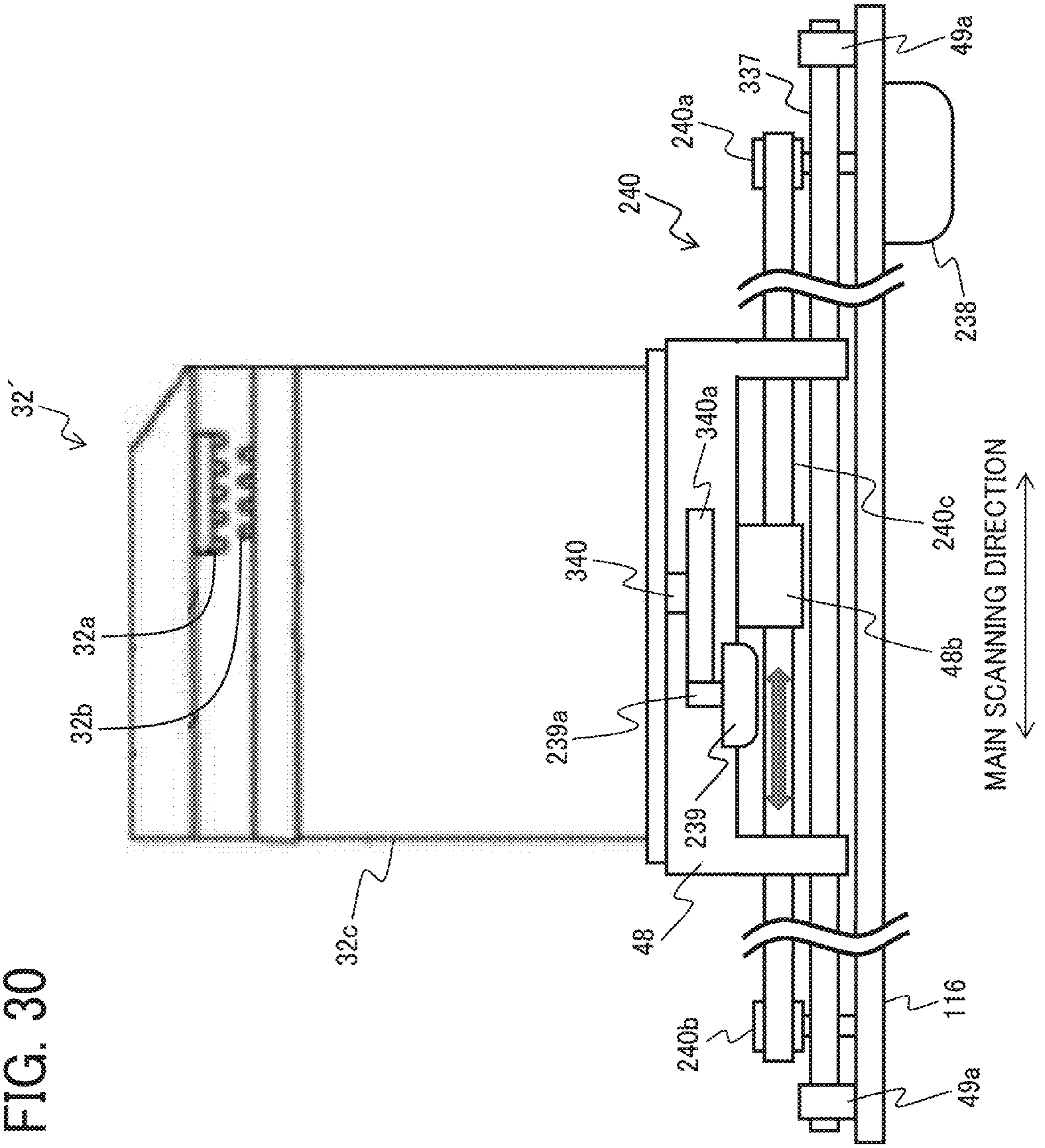
FIG. 30 is a schematic view of a downstream side of a crimper of the post-processing apparatus of FIG. 23 in a conveyance direction.

FIG. 30 is a schematic diagram illustrating a downstream side of the crimper 32' in the conveyance direction.

As illustrated in FIG. 29, the crimper 32' and the staple binder 156 are disposed downstream from the internal tray 22 in the conveyance direction. The crimper 32' is movable in the main scanning direction along the surface of the sheet bundle Pb placed on the internal tray 22. Further, the crimper 32' is rotatable in the forward and reverse directions about a crimper shaft 340 extending in the thickness direction of the sheet bundle Pb placed on the internal tray 22.

Similarly, the staple binder 156 is movable in the main scanning direction of the sheet bundle Pb. Further, the staple binder 156 is rotatable in the forward and reverse directions about a stapler shaft 84 extending in thickness direction of the sheet bundle Pb. The other components of the staple binder 156 are similar to, even if not the same as, those of the staple binder 155 (see FIG. 9) of the post-processing apparatus 3 according to the first embodiment. For this reason, a detailed description thereof is omitted.

As illustrated in FIG. 30, the crimper 32' includes a guide rail 337 extending in the main scanning direction at a position downstream from the internal tray 22 in the conveyance direction. The crimper 32' includes a crimper movement motor 238 as a driving source. The base 48 supporting the crimping frame 32_c_ has a fastening portion 48_b_ for fastening the timing belt 240_c_ at the bottom of the base 48. The driving force of the crimper movement motor 238 is transmitted to the base 48 by the drive transmission assembly 240 that includes the pullies 240_a_ and 240_b_, the timing belt 240_c_, and the fastening portion 48_b_. By so doing, the crimper 32' is moved in the main scanning direction along the surface of the sheet bundle Pb placed on the internal tray 22, in other words, along the guide rail 337. The crimper shaft 340 provided with a drive transmission gear 340_a_ is fixed to a bottom face of the crimping frame 32_c_ that holds the components of the crimper 32'.

The crimper shaft 340 and the drive transmission gear 340_a_ are held by a base 48 on which the crimping frame 32_c_ is disposed, so as to be rotatable in the forward and reverse directions. The drive transmission gear 340_a_ meshes with an output gear 239_a_ of a crimper pivot motor 239. The crimper 32' is rotated in the forward and reverse directions on the base 48 about the crimper shaft 340 extending in the thickness direction of the sheet P placed on the internal tray 22, by a driving force transmitted from the crimper pivot motor 239 to the crimper shaft 340 via the output gear 239_a_ and the drive transmission gear 340_a_. The guide rail 337, the crimper movement motor 238, the crimper pivot motor 239, the crimper shaft 340, and the drive transmission assembly 240 construct a driving assembly of the crimper 32'.

The crimper 32' is movable between a standby position HP2 illustrated in FIG. 29A and a position where the crimper 32' faces the first binding position B1 illustrated in FIGS. 29B and 29C. The standby position HP2 is away in the main scanning direction from the sheet bundle Pb placed on the internal tray 22. For example, in FIGS. 21A to 21C, the standby position HP is distanced to the right of the sheet bundle Pb along the main scanning direction.

The binding position B1 is a position on the sheet bundle Pb placed on the internal tray 22. However, the specific position of the binding position B1 is not limited to the position illustrated in FIGS. 29B and 29C. The binding position B1 may be one or more positions along the main scanning direction at the downstream end, in the conveyance direction, of the sheet P.

The posture of the crimper 32' changes between the parallel binding posture illustrated in FIG. 29B and the oblique binding posture illustrated in FIG. 29C. In other words, the crimper 32' is rotatable in the forward and reverse directions about the crimper shaft 340. The parallel binding posture is a posture of the crimper 32' in which the length of the upper crimping teeth 32*a* and the lower crimping teeth 32*b* (in other words, a rectangular crimp binding trace) is along the main scanning direction. The oblique binding posture is a posture of the crimper 32' in which the length of the upper crimping teeth 32*a* and the lower crimping teeth 32*b* (in other words, the rectangular crimp binding trace) is inclined with respect to the main scanning direction.

The rotational angle, which is an angle of the upper crimping teeth 32*a* and the lower crimping teeth 32*b* with respect to the main scanning direction, in the oblique binding posture is not limited to the angle illustrated in FIG. 29C. The rotational angle in the oblique binding posture may be any angle provided that the upper crimping teeth 32*a* and the lower crimping teeth 32*b* face the sheet bundle Pb placed on the internal tray 22.

The post-processing apparatus 3A includes the liquid applier 131 and a hole punch 132 serving as a processing device. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19.

Figure 36:
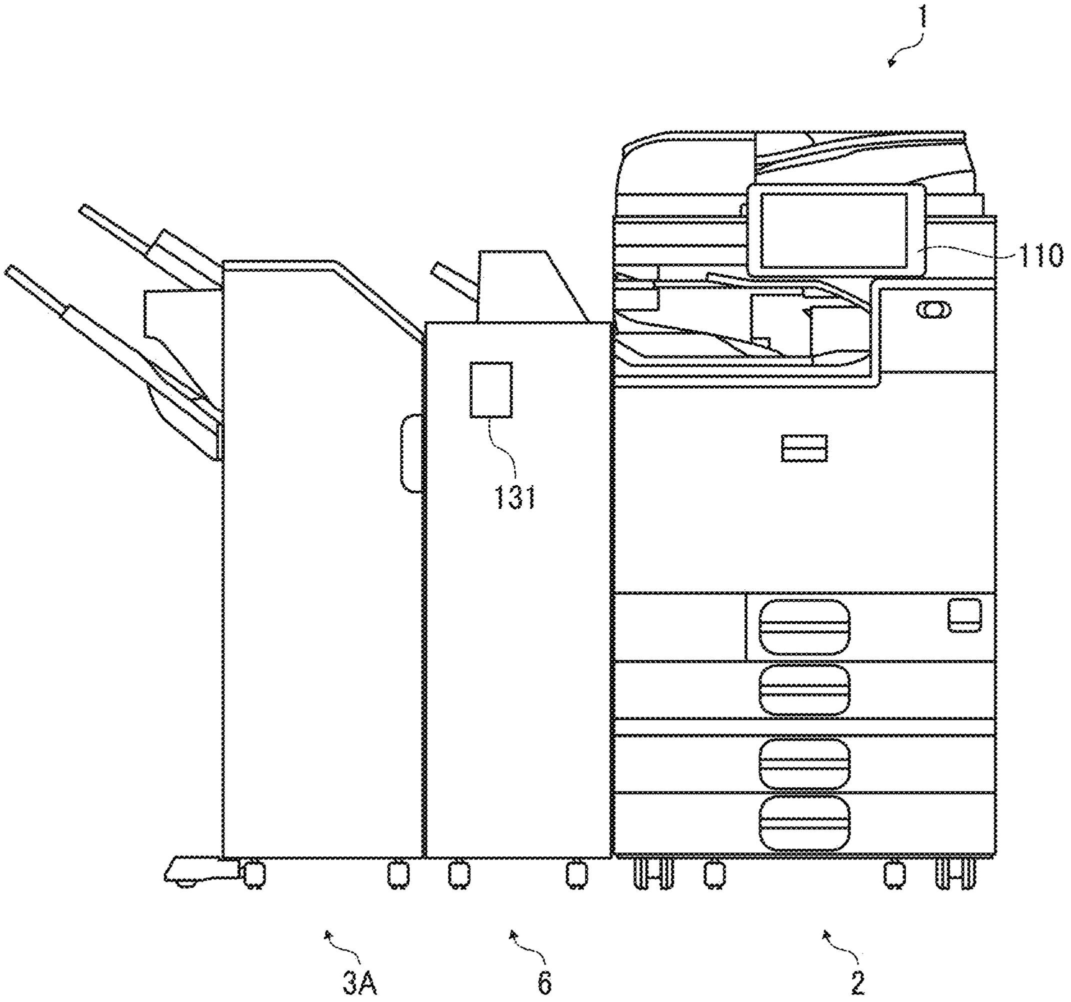
FIG. 36 is a diagram illustrating the overall configuration of an image forming system according to a modification of the embodiment illustrated in FIG. 1.

The liquid applier 131 and the hole punch 132 according to the present embodiment are disposed between the conveyance roller pairs 10 and 11. However, the arrangement of the liquid applier 131 is not limited to the example of FIG. 28. For example, in a case where an inserter 6 is disposed between the image forming apparatus 2 and the post-processing apparatus 3A as illustrated in FIG. 36, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 31A:
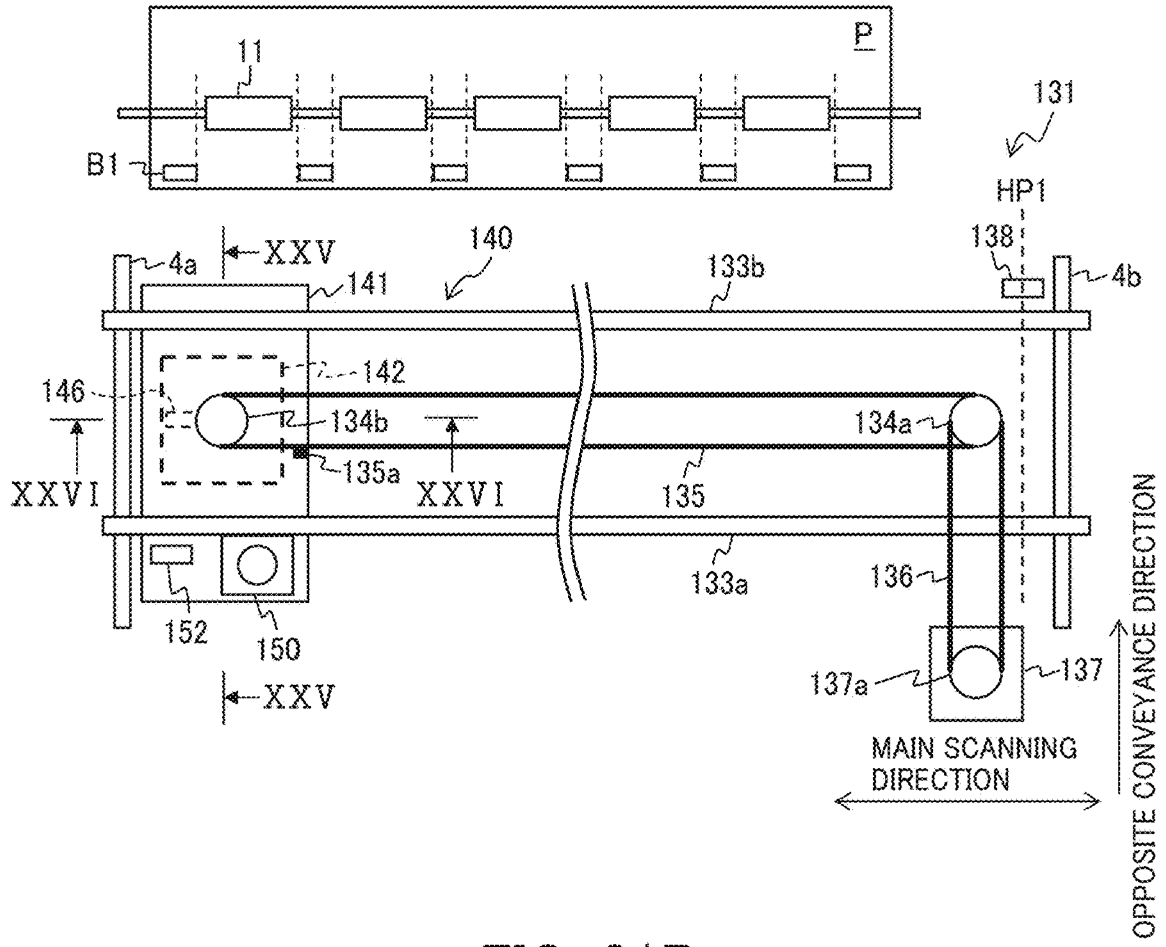
FIGS. 31A and 31B are views of a liquid applier according to the second embodiment, in the thickness direction of the sheet.

As illustrated in FIG. 31A, the conveyance roller pair 11 is located so as not to overlap, in the main scanning direction, the liquid application position B1 on the sheet P to which the liquid is applied by a liquid application head 146 of the liquid applier 131. This arrangement is to prevent the amount of liquid at the liquid application position B1 from decreasing due to the multiple roller pairs pressing the liquid application position B1 when the conveyance roller pair 11 conveys the sheet P. As a result, when the sheet P reaches the crimper 32' disposed downstream from the liquid applier 131 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 (corresponding to the binding position B1) while the sheet P is conveyed.

In addition, the multiple roller pairs of the conveyance roller pair 11 that is located so as not to overlap the liquid application position B1 on the sheet P in the main scanning direction prevents the conveying performance of the sheet P from being worse due to the adhesion of liquid to the multiple roller pairs and further prevents a conveyance jam caused by the worsened conveying performance of the sheet P.

Although only the conveyance roller pair 11 has been described above, the multiple roller pairs of the conveyance roller pairs 14 and 15 are preferably located so as not to overlap the liquid application position B1 on the sheet P in the main scanning direction, like the multiple roller pairs of the conveyance roller pair 11.

The liquid applier 131 applies liquid to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processing device disposed near the liquid applier 131 is not limited to the hole punch 132. Alternatively, the processing device may be an inclination corrector that corrects an inclination or skew of the sheet P that is conveyed by the conveyance roller pairs 10 and 11.

Figure 31B:
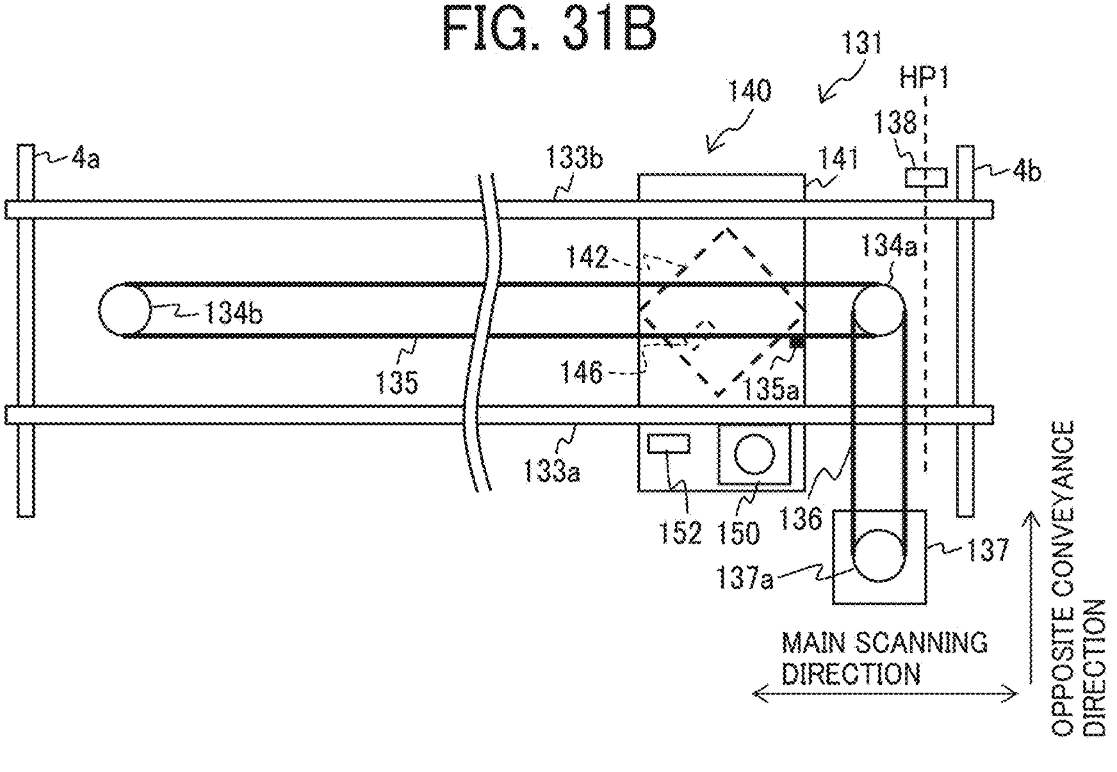

FIGS. 31A and 31B are views of the liquid applier 131 in the thickness direction of the sheet P, according to the second embodiment of the present disclosure.

Figure 32A:
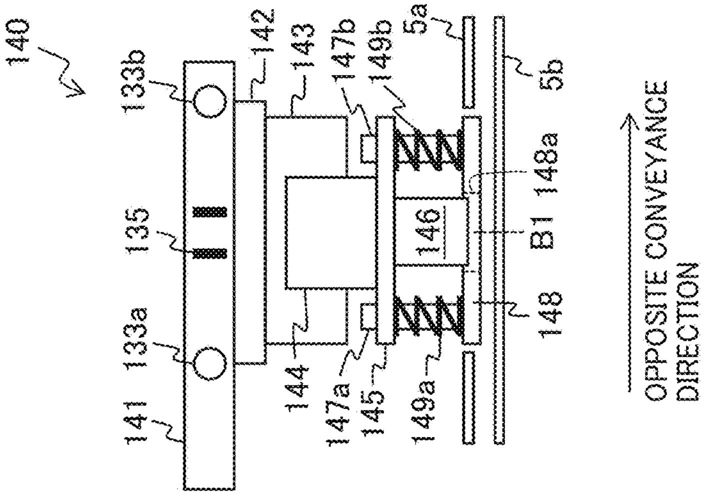
FIGS. 32A, 32B, and 32C are cross-sectional views of a liquid application unit of the liquid applier according to the second embodiment, taken along a line XXV-XXV of FIG. 31A.
Figure 32B:
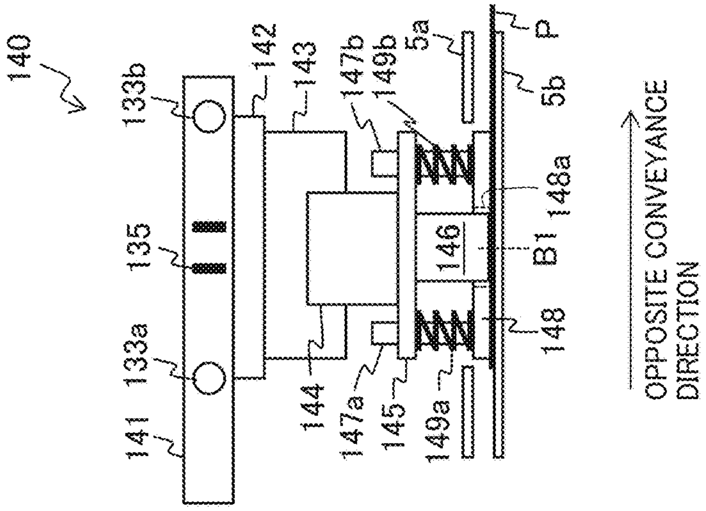
Figure 32C:
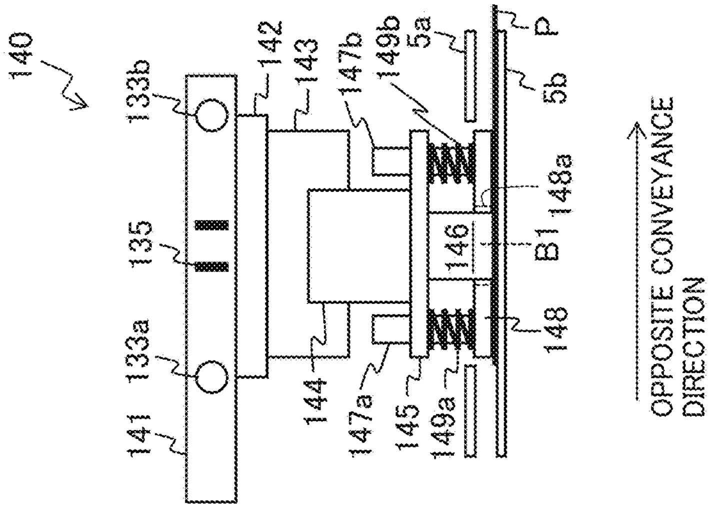

FIGS. 32A, 32B, and 32C are cross-sectional views of the liquid applier 131 taken along line XXV-XXV of FIG. 31A.

Figure 33C:
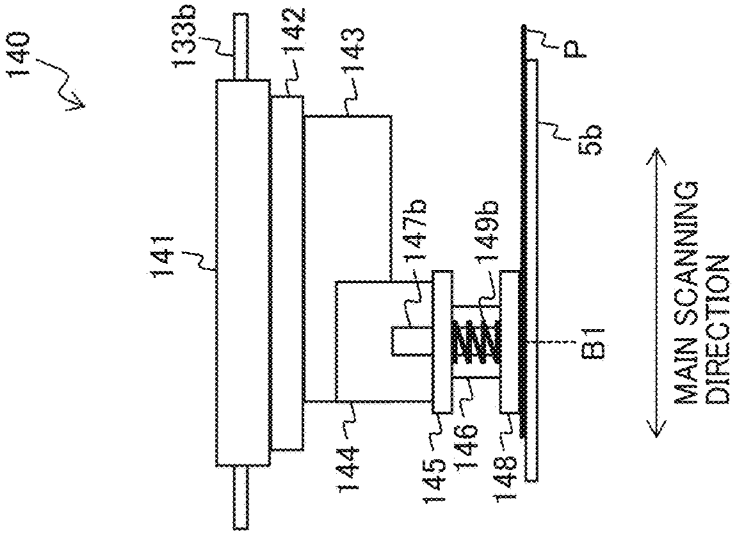
FIGS. 33A, 33B, and 33C are cross-sectional views of the liquid application unit of the liquid applier according to the second embodiment, taken along a line XXVI-XXVI of FIG. 31A.
Figure 33B:
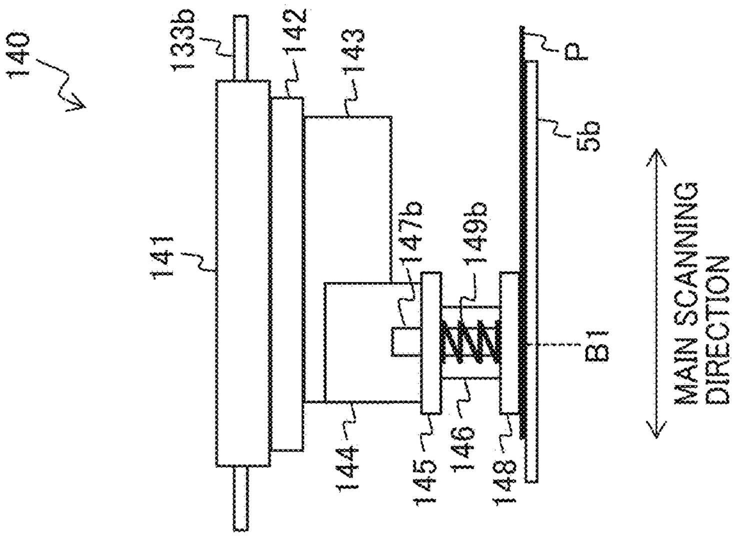
Figure 33A:
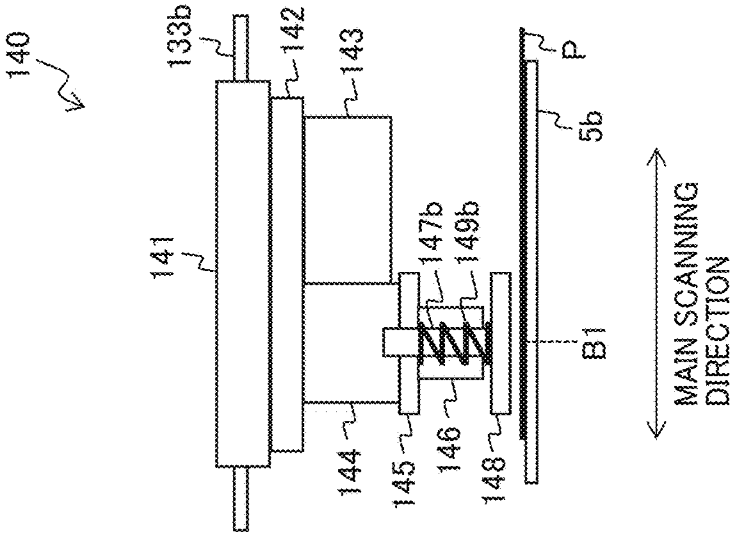

FIGS. 33A, 33B, and 33C are cross-sectional views of the liquid applier 131 taken along line XXVI-XXVI of FIG. 31A.

As illustrated in FIGS. 31A to 33C, the liquid applier 131 includes a pair of guide shafts 133*a* and 133*b*, a pair of pulleys 134*a* and 134*b*, endless annular belts 135 and 136, a liquid applier movement motor 137, a standby position sensor 138, and the liquid application unit 140.

The guide shafts 133*a* and 133*b*, each extending in the main scanning direction, are spaced apart from each other in the opposite conveyance direction. The pair of guide shafts 133*a* and 133*b* are supported by a pair of side plates 4*a* and 4*b* of the post-processing apparatus 3A. The pair of guide shafts 133*a* and 133*b* support the liquid application unit 140 such that the liquid application unit 140 can move in the main scanning direction.

The pair of pulleys 134*a* and 134*b* is disposed between the pair of guide shafts 133*a* and 133*b* in the opposite conveyance direction. The pair of pulleys 134*a* and 134*b* are spaced apart from each other in the main scanning direction. The pair of pulleys 134*a* and 134*b* are supported by a frame of the post-processing apparatus 3A so as to be rotatable in the forward and reverse directions about the respective shafts extending in the thickness direction of the sheet P.

The endless annular belt 135 is looped around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the liquid applier movement motor 137 being switched.

The standby position sensor 138 detects that the liquid application unit 140 has reached a standby position HP1 (see FIGS. 31A and 31B) in the main scanning direction. The standby position sensor 138 then outputs a standby position signal indicating the detection result to the controller 100*b*, which will be described below with reference to FIG. 34. The standby position sensor 138 is, for example, an optical sensor including a light emitter and a light receiver. The liquid application unit 140 at the standby position blocks an optical path between the light emitter and the light receiver. The standby position sensor 138 outputs the standby position signal in response to the light output from the light emitter not being received by the light receiver. The specific configuration of the standby position sensor 138 is not limited to the configuration described above.

As illustrated in FIGS. 32A to 32C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 is disposed to face the conveyance passage (a position at which the liquid application unit 140 is to face the sheet P conveyed along the conveyance passage) through the opening of the upper guide plate 5*a*.

Figure 34:
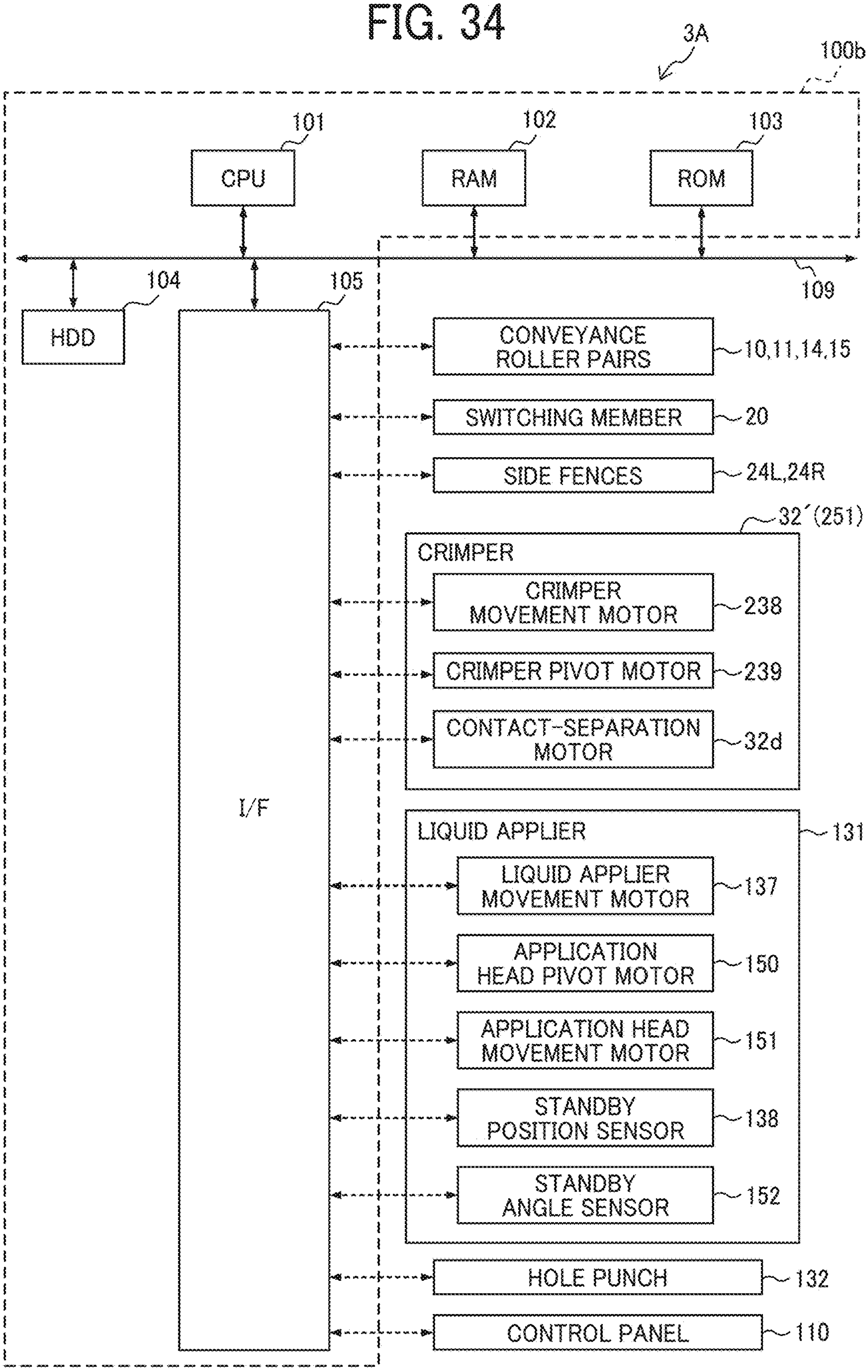
FIG. 34 is a control block diagram illustrating a hardware configuration of the post-processing apparatus according to the second embodiment.

As illustrated in FIGS. 31A to 33C, the liquid application unit 140 includes a base 141, a rotary bracket 142, a liquid storage tank 143, an application head mover 144, a holder 145, the liquid application head 146, columns 147*a* and 147*b*, a pressure plate 148, coil springs 149*a* and 149*b*, the application head pivot motor 150, the application head movement motor 151 (see FIG. 34), and a standby angle sensor 152 (see FIG. 34).

The base 141 is supported by the pair of guide shafts 133*a* and 133*b* so as to be slidable in the main scanning direction. The base 141 is coupled to the endless annular belt 135 by the connection 135*a*. The base 141 supports the components of the liquid application unit 140 such as the rotary bracket 142, the liquid storage tank 143, the application head mover 144, the holder 145, the liquid application head 146, the columns 147*a* and 147*b*, the pressure plate 148, the coil springs 149*a* and 149*b*, the application head pivot motor 150, the application head movement motor 151, and the standby angle sensor 152.

The rotary bracket 142 is attached to the lower face of the base 141 so as to be rotatable in the forward and reverse directions about an axis extending in the thickness direction of the sheet P. The rotary bracket 142 is rotated with respect to the base 141 by a driving force transmitted from the application head pivot motor 150. The rotary bracket 142 retains the liquid storage tank 143, the application head mover 144, the holder 145, the liquid application head 146, the columns 147*a* and 147*b*, the pressure plate 148, and the coil springs 149*a* and 149*b*.

The standby angle sensor 152, which is also illustrated in FIG. 34, detects that the rotary bracket 142 has reached a standby angle. The standby angle sensor 152 then outputs a standby angle signal indicating the detection result to the controller 100*b*. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. The standby angle sensor 152 outputs the standby angle signal in response to the light output from the light emitter not being received by the light receiver. The specific configuration of the standby angle sensor 152 is not limited to the configuration described above.

FIG. 31A illustrates the rotary bracket 142 in a position for the parallel binding that is performed by the crimper 32' disposed downstream from the liquid applier 131 in a direction in which the sheet P is conveyed.

FIG. 31B illustrates the rotary bracket 142 in a position for the oblique binding (i.e., corner binding) that is performed by the crimper 32' disposed downstream from the liquid applier 131 in the direction in which the sheet P is conveyed.

The liquid storage tank 143 stores liquid to be applied to the sheet P. The application head mover 144 is attached by the liquid storage tank 143 so as to be movable (e.g., up and down) in the thickness direction of the sheet P. The application head mover 144 is moved with respect to the liquid storage tank 143 by a driving force transmitted from the application head movement motor 151. The holder 145 is attached to a lower end of the application head mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (e.g., sponge or fiber).

The columns 147*a* and 147*b* project downward from the holder 145 around the liquid application head 146. The columns 147*a* and 147*b* are movable relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 in a direction away from the holder 145.

As illustrated in FIGS. 32A and 33A, before the sheet P is conveyed to the position where the sheet P faces the opening of the upper guide plate 5*a*, the pressure plate 148 is positioned at or above the opening. Subsequently, when the sheet P that is conveyed by the conveyance roller pairs 10 and 11 stops at a position where the liquid application position B1 on the sheet P faces the opening, the application head movement motor 151 is rotated in a first direction. As a result, the application head mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the binding position B1 to be crimped and bound by the edge binder 251, specifically, the crimper 32'.

As the application head movement motor 151 keeps rotating in the first direction after the pressure plate 148 contacts the sheet P, the coil springs 149*a* and 149*b* are compressed to further move down the application head mover 144, the holder 145, the liquid application head 146, and the columns 147*a* and 147*b*. As a result, as illustrated in FIGS. 32B and 33B, a lower face of the liquid application head 146 contacts the sheet P through the through hole 148*a*. As a result, the liquid contained in the liquid application head 146 is applied to the sheet P.

Further rotation of the application head movement motor 151 in the first direction further strongly presses the liquid application head 146 against the sheet P as illustrated in FIGS. 32C and 33C. Accordingly, the amount of liquid that is applied to the sheet P increases. In other words, the liquid applier 131 changes the pressing force of the liquid application head 146 against the sheet P to adjust the amount of liquid to be applied to the sheet P.

On the other hand, the rotation of the application head movement motor 151 in the second direction opposite to the first direction moves up the application head mover 144, the holder 145, the liquid application head 146, the columns 147*a* and 147*b*, the pressure plate 148, and the coil springs 149*a* and 149*b* together. As a result, as illustrated in FIGS. 32A and 33A, the liquid application head 146 and the pressure plate 148 are separated from the sheet P. In other words, the liquid applier 131 includes the liquid application head 146 that can be separated from the sheet P.

FIG. 34 is a block diagram illustrating a hardware configuration of the control block of the post-processing apparatus 3A to control the operation of the post-processing apparatus 3A according to the second embodiment of the present disclosure.

As illustrated in FIG. 34, the post-processing apparatus 3A includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3A.

The RAM 102 is a volatile storage medium that allows data to be read and written at high speed. The CPU 101 uses the RAM 102 as a work area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, the HDD 104, and the I/F 105 constitute at least part of a controller 100*b* serving as a control device that controls the operation of the post-processing apparatus 3A.

The I/F 105 is an interface that connects the conveyance roller pairs 10, 11, 14, and 15, the switching member 20, the side fences 24L and 24R, the crimper movement motor 238, the crimper pivot motor 239, a contact-separation motor 32*d*, a liquid applier movement motor 137, an application head pivot motor 150, an application head movement motor 151, a standby position sensor 138, a standby angle sensor 152, a hole punch 132, and a control panel 110 to the common bus 109.

The controller 100*b* controls, via the I/F 105, the operations of the conveyance roller pairs 10, 11, 14, and 15, the switching member 20, the side fences 24L and 24R, the crimper movement motor 238, the crimper pivot motor 239, the contact-separation motor 32*d*, the liquid applier movement motor 137, the application head pivot motor 150, the application head movement motor 151, and the hole punch 132. The controller 100*b* acquires detection results from the standby position sensor 138 and the standby angle sensor 152 through the I/F 105.

Although FIG. 34 illustrates the components of the liquid applier 131 and the edge binder 251 (the crimper 32') that executes the edge binding, the components of the saddle binder 28 that executes the saddle binding are controlled by the controller 100*b* like the components of the liquid applier 131 and the edge binder 251 (the crimper 32') that executes the edge binding.

As illustrated in FIG. 36, the image forming apparatus 2 includes the control panel 110. The control panel 110 includes an operating device that receives instructions input by a user and a display serving as a notifier that notifies the user of information. The control panel 110 includes, for example, physical input buttons and a touch screen overlaid on a display. The control panel 110 acquires information from the user through the operation unit and provides the information to the user through the display. The post-processing apparatus 3A may include a control panel 110 similar to the above-described control panel 110 of the image forming apparatus 2.

Figure 35:
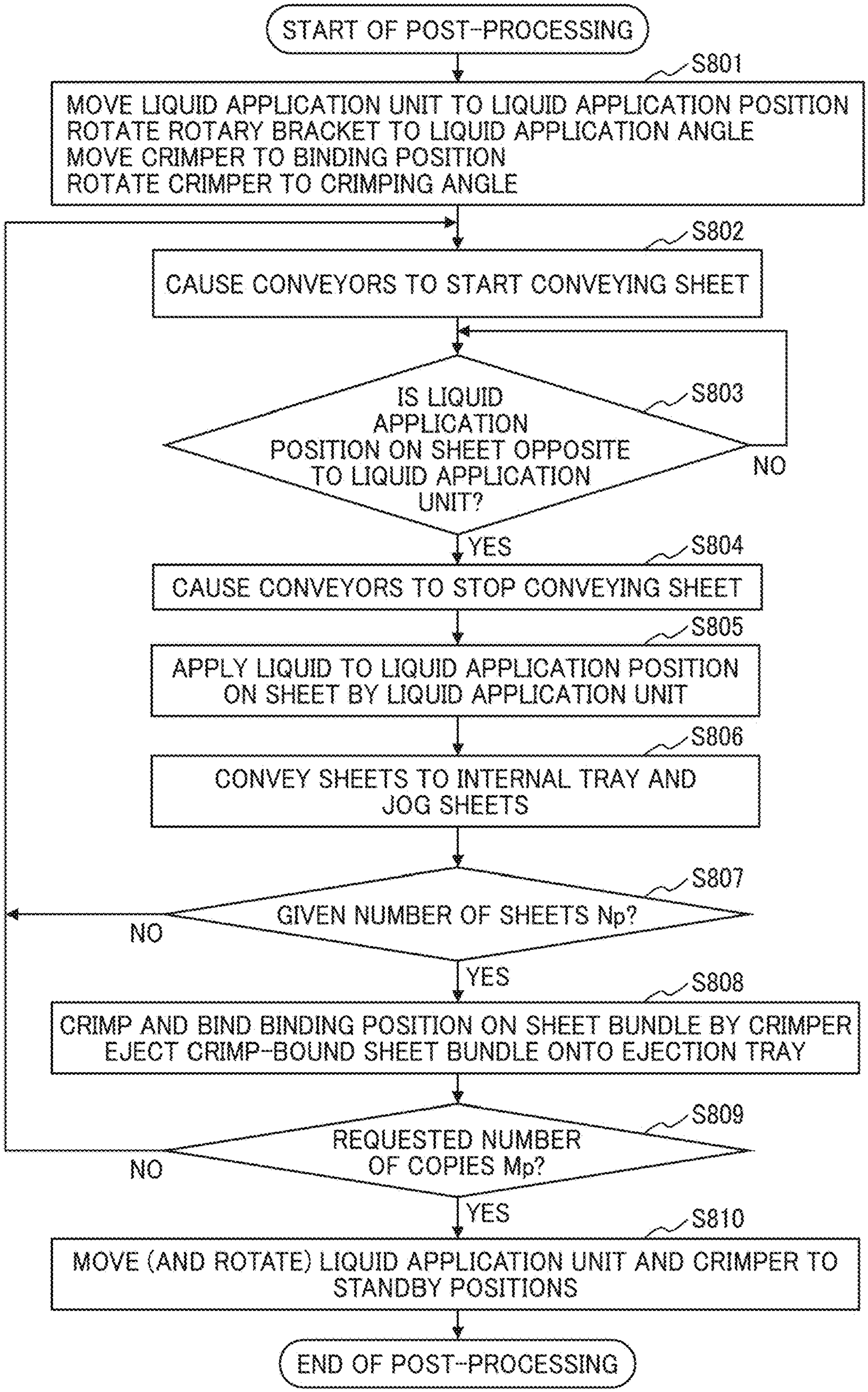
FIG. 35 is a flowchart of post-processing performed by the post-processing apparatus according to the second embodiment.

FIG. 35 is a flowchart of post-processing performed by the post-processing apparatus 3A according to the second embodiment.

Specifically, FIG. 35 is a flowchart of a process to execute the one-point binding illustrated in FIGS. 29A to 29D.

For example, the controller 100*b* executes the post-processing illustrated in FIG. 35 when the controller 100*b* acquires an instruction to execute the post-processing from the image forming apparatus 2. In the following description, the instruction to execute the post-processing may be referred to as a "post-processing command." The post-processing command includes, for example, the number of sheets P of the sheet bundle Pb (referred to as "given number of sheet Np"), the number of sheet bundles Pb to be subjected to binding process (referred to as "requested number of copies Mp"), the binding position B1 (corresponding to the liquid application position B1), the angle of the binding position B1 (corresponding to the angle of the liquid application position B1), the type of binding process (parallel binding process or oblique binding process), and a process that is executed in parallel with the liquid application process (i.e., punching a hole in the present embodiment). At the start of the post-processing, the liquid application unit 140 is at the standby position HP1 illustrated in FIGS. 31A to 31C whereas the rotary bracket 142 is held at the standby angle (corresponding to the parallel binding posture).

First, in step S801, the controller 100*b* drives the liquid applier movement motor 137 to move the liquid application unit 140 (corresponding to a liquid applier) in the main scanning direction such that a liquid application head 146 moves from the standby position HP1 to a position where the liquid application head 146 can face the liquid application position B1 (see FIG. 31B, the position corresponding to the binding position B1 illustrated in FIGS. 29A to 29C). (skip) If the type of the binding process instructed by the post-processing command is "oblique binding process," in step S801, the controller 100*b* drives the application head pivot motor 150 to rotate the rotary bracket 142. Thus, the liquid application head 146 is rotated from the standby angle to the liquid application angle corresponding to the "oblique binding posture." It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the application head pivot motor 150 that the liquid application head 146 has reached the liquid application angle. If the type of the binding process instructed by the post-processing command is "parallel binding process", the controller 100*b* omits the above-described operation of rotating the rotary bracket 142. In other words, the liquid application unit 140 moves in the main scanning direction while holding the rotary bracket 142 at the standby angle.

Further, in step S801, the controller 100*b* drives the crimper movement motor 238 to move the crimper 32' from the standby position HP2 to the position where the crimper 32' can face the binding position B1 as illustrated in FIGS. 29A and 29B. Alternatively, if the type of the binding process instructed by the post-processing command is "oblique binding process," in step S801, the controller 100*b* drives the crimper pivot motor 239 to rotate the crimper 32' from the standby angle to the crimping angle corresponding to the "oblique binding posture." It is ascertained based on a pulse signal output from a rotary encoder of the crimper movement motor 238 that the crimper 32' has reached the position where the crimper 32' can face the binding position B1. Similarly, it is ascertained based on a pulse signal output from a rotary encoder of the crimper pivot motor 239 that the crimper 32' has reached the crimp binding angle. If the type of the binding process instructed by the post-processing command is "parallel binding process," the controller 100*b* omits the above-described operation of rotating the crimper 32'. In other words, the crimper 32' moves in the main scanning direction while maintaining the standby angle.

Subsequently, in step S802, the controller 100*b* drives the conveyance roller pairs 10 and 11 to start conveying the sheet P on which an image is formed by the image forming apparatus 2. The controller 100*b* determines whether the liquid application position B1 on the sheet P faces first the liquid application unit 140 (more specifically, the liquid application head 146) (step S803). In other words, the controller 100*b* determines whether the liquid application unit 140 has faced the first liquid application position B1 on the sheet P. When the liquid application position B1 on the sheet P has not faced the liquid application head 146 (NO in step S803), the controller 100*b* repeats the determination in step S803. In other words, the controller 100*b* continues driving the conveyance roller pairs 10 and 11 until the first liquid application position B1 on the sheet P faces the liquid application head 146. The controller 100*b* determines whether the liquid application position B1 on the sheet P has faced the liquid application unit 140 (more specifically, the liquid application head 146) (step S803). In other words, the controller 100*b* determines whether the liquid application unit 140 has faced the liquid application position B1 on the sheet P. When the liquid application position B1 on the sheet P has not faced the liquid application head 146 (NO in step S803), the controller 100*b* repeats the determination in step S803. In other words, the controller 100*b* continues driving the conveyance roller pairs 10 and 11 until the liquid application position B1 on the sheet P faces the liquid application head 146. When the controller 100*b* determines that the liquid application position B1 on the sheet P has faced the liquid application head 146 (YES in step S803), the controller 100*b* causes the conveyance roller pairs 10 and 11 (step S804) to stop conveying the sheet P. It is ascertained, based on a pulse signal output from a rotary encoder of a motor that drives the conveyance roller pairs 10 and 11, that the liquid application position B1 on the sheet P has faced the liquid application head 146.

The controller 100*b* causes the liquid application unit 140 to execute the process of applying liquid to the liquid application position B1 on the sheet P (step S805). More specifically, the controller 100*b* rotates the application head movement motor 151 in the first direction to bring the liquid application head 146 into contact with the liquid application position B1 on the sheet P. The controller 100*b* changes the pressing force of the liquid application head 146 (i.e., the amount of rotation or rotation speed of the application head movement motor 151) depending on the amount of liquid to be applied to the sheet P.

The amount of liquid that is applied to the sheet P may be the same for all the sheets P of the sheet bundle Pb or may be different for each sheet P. For example, the controller 100*b* may decrease the amount of liquid applied to a sheet P conveyed later. The amount of rotation of the application head movement motor 151 may be ascertained based on a pulse signal outputted from a rotary encoder of the application head movement motor 151.

In step S806, the controller 100*b* drives the conveyance roller pairs 10, 11, 14, and 15 to place a sheet P on the internal tray 22. The controller 100*b* moves the side fences 24L and 24R to align the position of the sheet P or the sheet bundle Pb placed on the internal tray 22 in the main scanning direction (step S806). In short, the controller 100*b* performs so-called jogging.

The controller 100*b* determines whether the number of sheets P placed on the internal tray 22 has reached the given number of sheets Np indicated by the post-processing command (step S807). When the controller 100*b* determines that the number of sheets P placed on the internal tray 22 has not reached the given number of sheets Np (NO in step S807), the controller 100*b* executes the operations of steps S802 and S803 again until the number of sheets P placed on the internal tray 22 reaches the given number of sheets Np (YES in step S807).

By contrast, when the controller 100*b* determines that the number of sheets P that are placed on the internal tray 22 has reached the given number of sheets Np (YES in step S807), the controller 100*b* causes the crimper 32' to crimp the binding position B1 (corresponding to the liquid application position B1) on the sheet bundle Pb to which the liquid has been applied by the liquid application unit 140 (step S808). In addition, in step S808, the controller 100*b* rotates the conveyance roller pair 15 to eject the crimped sheet bundle Pb to the ejection tray 26.

The controller 100*b* determines whether the number of sheet bundles Pb thus ejected to the ejection tray 26 has reached the requested number of copies Mp indicated by the post-processing command (step S809). When the controller 100*b* determines that the number of the sheet bundles Pb ejected to the ejection tray 26 has not reached the requested number of copies Mp (NO in step S809), the controller 100*b* repeats the processing of steps S802 to S809 until the number of the sheet bundles Pb ejected to the ejection tray 26 reaches the requested number of copies Mp (YES in step S809).

When the controller 100*b* determines that the number of sheet bundles Pb ejected to the ejection tray 26 reaches the requested number of copies Mp (YES in step S809), the controller 100*b* drives the liquid applier movement motor 137 to move the liquid application unit 140 to the standby position HP1 (see FIG. 31) and drives the crimper movement motor 238 to move the crimper 32' to the standby position HP2 (see FIG. 29) (step S810). When the posture that is instructed by the post-processing command is the "oblique binding posture," the controller 100*b* drives the application head pivot motor 150 and the crimper pivot motor 239 to rotate the liquid application unit 140 and crimper 32' and the parallel binding posture (standby angle) into the parallel binding posture (step S810). By contrast, when the posture that is instructed by the post-processing command is the "parallel binding posture," the controller 100*b* skips the aforementioned operation of rotating the liquid application unit 140 and the crimper 32' to the parallel binding posture (standby angle). In steps S801 and S809, the execution order of the movement in the main scanning direction and the rotation in the forward and reverse directions of the liquid application unit 140 and the crimper 32' is not limited to the aforementioned order and may be reversed.

The embodiments of the present disclosure are applied to the edge binder 25 that executes the edge binding as described above. However, the embodiments of the present disclosure may be applied to the saddle binder 28 that executes the saddle binding.

The controller 100*b* of the post-processing apparatus 3A according to the second embodiment illustrated in FIG. 28 is provided separately from the controller 100*a* of the image forming apparatus 2 as in the configuration of FIG. 1. However, embodiments of the present disclosure are not limited to the above-described configuration. For example, as illustrated in FIG. 37A, the controller 100*b* of the post-processing apparatus 3A may be disposed in the image forming apparatus 2. Further, as in the configuration of FIG. 37B, the controller 100*b* of the post-processing apparatus 3A may be integrated with the controller 100*a* of the image forming apparatus 2.

As in the configuration of FIG. 38A, the controller 100*b* of the post-processing apparatus 3A may be divided into a controller 100*b*1 (e.g., a driver system such as a motor) and a controller 100*b*2 (a detector such as a sensor) according to the function, and the controller 100*b*2 of the post-processing apparatus 3A may be disposed in the image forming apparatus 2. Further, as in the configuration of FIG. 38B, the controller 100*b*2 of the post-processing apparatus 3A disposed in the image forming apparatus 2 may be integrated with the controller 100*a* of the image forming apparatus 2.

As described above, the control method by the controller 100*b* described above is implemented by cooperation between hardware resources of a computer and a program as computer software. In other words, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Embodiments of the present disclosure are not limited to the above-described embodiments, and numerous additional modifications and variations are possible in light of the teachings within the technical scope of the appended claims. It is therefore to be understood that the above-described embodiments of the present disclosure may be practiced otherwise by those skilled in the art than as specifically described herein. Such embodiments and variations thereof are included in the scope and gist of the embodiments of the present disclosure and are included in the embodiments described in claims and the equivalent scope thereof.

Aspects of the Present Disclosure

A description is given below of some aspects of the present disclosure.

Aspect 1

In Aspect 1, a medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a mover (for example, the liquid applier movement assembly 35), and a liquid supplier (for example, the liquid supply passage 45, the liquid supply pump 46). The liquid applier applies liquid to at least one medium (for example, the sheet P) of a bundle of media (for example, the sheet bundle Pb) for a number of times as a liquid application process. The post-processing device performs a given process on the bundle of media including the at least one medium on which the liquid is applied by the liquid applier as a post-processing process. The liquid storage unit stores the liquid to be used for the liquid application process. The mover causes the liquid applier to move in a reciprocating direction orthogonal to a conveyance direction in which the at least one medium is conveyed to the liquid applier. The liquid supplier supplies the liquid from the liquid storage unit to the liquid applier. The liquid supplier includes an extensible member (for example, the elastic tube 453) having an elastic cylindrical shape on at least a part of the liquid supplier. The extensible member is disposed in the reciprocating direction of the mover.

Aspect 2

In Aspect 2, according to Aspect 1, the extensible member is a cylindrical tube (for example, the elastic tube 453) including an elastic member.

Aspect 3

In Aspect 3, according to Aspect 1, the extensible member is a coil tube (for example, the coil tube 455) including an elastic member wound in a spiral.

Aspect 4

In Aspect 4, according to any one of Aspects 1 to 3, the extensible member is disposed in the reciprocating direction of the mover with a pulling force being applied to cause a shortest length of the extensible member to be longer than a natural length of the extensible member, in a reciprocating movement of the liquid applier.

Aspect 5

In Aspect 5, according to any one of Aspects 1 to 3, a natural length of the extensible member is a shortest length of the extensible member. The extensible member is disposed in the reciprocating direction of the mover such that a longest length of the extensible member is two times or more the natural length of the extensible member with a pulling force being applied to cause the length longer than the longest length of the extensible member, in a reciprocating movement of the liquid applier.

Aspect 6

In Aspect 6, according to any one of Aspects 1 to 3, the extensible member has a natural length as a shortest length, and a length two times or more the shortest length, as a longest length. The liquid applier is disposed at a standby position in the reciprocating movement closer to a position of the shortest length of the extensible member, than an intermediate position between a position of a length with a pulling force being applied to be longer than the natural length of the extensible member and a position of a length two times or more the shortest length.

Aspect 7

In Aspect 7, a medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a mover (for example, the liquid applier movement assembly 35), and a liquid supplier (for example, the liquid supply passage 45, the liquid supply pump 46). The liquid applier applies liquid to at least one medium (for example, the sheet P) of a bundle of media (for example, the sheet bundle Pb) for a number of times as a liquid application process. The post-processing device performs a given process on the bundle of media including the at least one medium on which the liquid is applied by the liquid applier as a post-processing process. The liquid storage unit stores the liquid to be used for the liquid application process. The mover causes the liquid applier to move in a reciprocating direction orthogonal to a conveyance direction in which the at least one medium is conveyed to the liquid applier. The liquid supplier supplies the liquid from the liquid storage unit to the liquid applier. The liquid supplier includes a winder (for example, the winder 481) in which a cylindrical tube is concentrically wound to be pulled out, on at least a part of the liquid supplier. The cylindrical tube is disposed in the reciprocating direction of the mover.

Aspect 8

In Aspect 8, according to any one of Aspects 1 to 7, the post-processing device includes a crimper to bind the bundle of media by pressing and deforming the bundle of media.

Aspect 9

In Aspect 9, according to any one of Aspects 1 to 8, the post-processing device includes a stapler (for example, the stapler 62).

Aspect 10

In Aspect 10, an image forming system (for example, the image forming system 1) includes an image forming apparatus (for example, the image forming apparatus 2) and the medium processing apparatus (for example, the post-processing apparatus 3) according to any one of Aspects 1 to 9. The image forming apparatus forms an image on a medium (for example, the sheet P). The medium processing apparatus performs the process on a bundle of media (for example, the sheet bundle Pb) including the medium on which the image is formed by the image forming apparatus.

Aspect 11

In Aspect 11, a medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a mover (for example, the liquid applier movement assembly 35), and a liquid supplier (for example, the liquid supply passage 45, the liquid supply pump 46). The liquid applier applies liquid to at least one medium (for example, the sheet P) of a bundle of media (for example, the sheet bundle Pb), conveyed in a conveyance direction, for a number of times. The post-processing device performs a given process on the bundle of media including the at least one medium on which the liquid is applied by the liquid applier. The liquid storage unit stores the liquid to be supplied to the liquid applier. The mover causes the liquid applier to move in a reciprocating direction orthogonal to the conveyance direction. The liquid supplier supplies the liquid from the liquid storage unit to the liquid applier. The liquid supplier includes an extensible member (for example, the elastic tube 453) having an elastic cylindrical part on at least a part of the liquid supplier. The extensible member extends in the reciprocating direction of the mover.

Aspect 12

In Aspect 12, according to Aspect 11, the extensible member includes an elastic cylindrical tube (for example, the elastic tube 453).

Aspect 13

In Aspect 13, according to Aspect 11, the extensible member includes an elastic coil tube (for example, the coil tube 455) wound in a spiral.

Aspect 14

In Aspect 14, according to any one of Aspects 11 to 13, wherein a shortest length of the extensible member (for example, the extensible tube 453) in a reciprocating movement of the liquid applier (for example, the liquid applier 31) is a length of the extensible member applied with a pulling force to be longer than a natural length of the extensible member.

Aspect 15

In Aspect 15, according to any one of Aspects 11 to 13, a longest length of the extensible member (for example, the extensible tube 453) in a reciprocating movement of the liquid applier (for example, the liquid applier 31) is a length two times or more of a shortest length of the extensible member, and the shortest length of the extensible member in the reciprocating movement of the liquid applier is a length of the extensible member applied with a pulling force to be longer than a natural length of the extensible member.

Aspect 16

In Aspect 16, according to any one of Aspects 11 to 15, the extensible member (for example, the elastic tube 453) at a standby position (for example, the standby position HP) is disposed between a first position at which the extensible member is in the shortest state and a second position at which the extensible member is in the longest state. The extensible member is at the standby position is closer to the first position than the second position in the reciprocating movement of the liquid applier (for example, the liquid applier 31).

Aspect 17

In Aspect 17, according to any one of Aspects 11 to 16, the post-processing device (for example, the crimper 32) includes a crimper (for example, the crimper 32) to bind the bundle of media (for example, the sheet bundle Pb) by pressing and deforming the bundle of media.

Aspect 18

In Aspect 18, according to any one of Aspects 11 to 17, the post-processing device includes a stapler (for example, the stapler 62).

Aspect 19

In Aspect 19, an image forming system (for example, the image forming system 1) includes an image forming apparatus (for example, the image forming apparatus 2) and the medium processing apparatus (for example, the post-processing apparatus 3) according to any one of Aspects 11 to 18. The image forming apparatus forms an image on a medium (for example, the sheet P). The medium processing apparatus performs the process on a bundle of media (for example, the sheet bundle Pb) including the medium on which the image is formed by the image forming apparatus.

Aspect 20

In Aspect 20, a medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a mover (for example, the liquid applier movement assembly 35), and a liquid supplier (for example, the liquid supply passage 45, the liquid supply pump 46). The liquid applier applies liquid to at least one medium (for example, the sheet P) of a bundle of media (for example, the sheet bundle Pb), conveyed in a conveyance direction, for a number of times. The post-processing device performs a given process on the bundle of media including the at least one medium on which the liquid is applied by the liquid applier. The liquid storage unit stores the liquid to be supplied to the liquid applier. The mover causes the liquid applier to move in a reciprocating direction orthogonal to the conveyance direction. The liquid supplier supplies the liquid from the liquid storage unit to the liquid applier. The liquid supplier includes a cylindrical tube (for example, the elastic tube 453), and a winder (for example, the winder 481) to concentrically wind the cylindrical tube. The cylindrical tube is extendable in the reciprocating direction of the mover.

Aspect 21

In Aspect 21, an image forming system (for example, the image forming system 1) includes an image forming apparatus (for example, the image forming apparatus 2) and the medium processing apparatus (for example, the post-processing apparatus 3) according to Aspect 20. The image forming apparatus forms an image on a medium (for example, the sheet P). The medium processing apparatus performs the process on the bundle of media (for example, the sheet bundle Pb) including the at least one medium on which the image is formed by the image forming apparatus.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium processing apparatus comprising:
a liquid applier to apply liquid to at least one medium;
a post-processing device to perform a given process on a bundle of media including the at least one medium on which the liquid is applied by the liquid applier;
a liquid storage unit to store the liquid to be supplied to the liquid applier;
a mover to cause the liquid applier to move in a first direction orthogonal to a conveyance direction of the at least one medium and a second direction opposite to the first direction; and
a liquid supplier to supply the liquid from the liquid storage unit to the liquid applier,
the liquid supplier including an extensible member having an elastic cylindrical part on at least a part of the liquid supplier,
the extensible member configured to extend and contract in the first direction and the second direction, and
the extensible member including an elastic coil tube wound in a spiral.

2. The medium processing apparatus according to claim 1, wherein the extensible member includes an elastic cylindrical tube.

3. The medium processing apparatus according to claim 1, wherein a shortest length of the extensible member in a reciprocating movement of the liquid applier is a length of the extensible member applied with a pulling force to be longer than a natural length of the extensible member.

4. The medium processing apparatus according to claim 1, wherein a longest length of the extensible member in a reciprocating movement of the liquid applier is a length two times or more of a shortest length of the extensible member, and
the shortest length of the extensible member in the reciprocating movement of the liquid applier is a length of the extensible member applied with a pulling force to be longer than a natural length of the extensible member.

5. The medium processing apparatus according to claim 1, wherein a standby position of the liquid applier is closer to a liquid replenishment unit than to a middle position in a depth direction of the medium processing apparatus.

6. The medium processing apparatus according to claim 1, wherein the post-processing device includes a crimper to bind the bundle of media by pressing and deforming the bundle of media.

7. The medium processing apparatus according to claim 1, wherein the post-processing device includes a stapler.

8. An image forming system comprising:
an image forming apparatus to form an image on a medium; and
the medium processing apparatus according to claim 1 to perform the given process on a bundle of media including the medium on which the image is formed by the image forming apparatus.

9. A medium processing apparatus comprising:

a liquid applier to apply liquid to at least one medium;

a post-processing device to perform a given process on a bundle of media including the at least one medium on which the liquid is applied by the liquid applier;

a liquid storage unit to store the liquid to be supplied to the liquid applier;

a mover to cause the liquid applier to move in a first direction orthogonal to a conveyance direction of the at least one medium and a second direction opposite to the first direction; and a liquid supplier to supply the liquid from the liquid storage unit to the liquid applier, wherein the liquid supplier includes:

a cylindrical tube; and a winder to concentrically wind the cylindrical tube, and the cylindrical tube is extendable in the first direction and the second direction.

10. An image forming system comprising:

an image forming apparatus to form an image on a medium; and the medium processing apparatus according to claim 9 to perform the given process on the bundle of media including the at least one medium on which the image is formed by the image forming apparatus.

* * * * *